US011795591B2

(12) United States Patent
Bokeloh et al.

(10) Patent No.: US 11,795,591 B2
(45) Date of Patent: Oct. 24, 2023

(54) METHOD AND DEVICE FOR PRODUCING A RIBBON AND A THREAD OF BAMBOO FIBER

(71) Applicant: BBF IP B.V., Amsterdam (NL)

(72) Inventors: Marcus Anton Hubertus Bokeloh, Amsterdam (NL); Robertus Martinus Van Opdorp, Amsterdam (NL)

(73) Assignee: BBF IP B.V., Amsterdam (NL)

( * ) Notice: Subject to any disclaimer, the term of this patent is extended or adjusted under 35 U.S.C. 154(b) by 410 days.

(21) Appl. No.: 16/763,309

(22) PCT Filed: Nov. 13, 2018

(86) PCT No.: PCT/NL2018/050758

§ 371 (c)(1),
(2) Date: May 12, 2020

(87) PCT Pub. No.: WO2019/093898

PCT Pub. Date: May 16, 2019

(65) Prior Publication Data

US 2020/0308740 A1 Oct. 1, 2020

(30) Foreign Application Priority Data

Nov. 13, 2017 (NL) ...................................... 2019892
Jun. 29, 2018 (NL) ...................................... 2021216

(51) Int. Cl.
*B27J 1/00* (2006.01)
*B29K 311/10* (2006.01)
(Continued)

(52) U.S. Cl.
CPC ................ *D04H 1/425* (2013.01); *B27J 1/00* (2013.01); *B29C 70/226* (2013.01); *D01B 1/22* (2013.01);
(Continued)

(58) Field of Classification Search
CPC ..... B27J 1/00; B27N 3/04; B27N 3/12; B27N 3/143; B27N 3/18; B27N 3/183;
(Continued)

(56) References Cited

U.S. PATENT DOCUMENTS 565,783 A 8/1896 Oberg
3,675,409 A * 7/1972 Rosenstein ............ D02G 3/385 57/15
(Continued)

FOREIGN PATENT DOCUMENTS

CN 1191172 A 8/1998
CN 103963134 A 8/2014
(Continued)

OTHER PUBLICATIONS

International Search Report and Written Opinion dated Jul. 15, 2019, corresponding to Application No. PCT/NL2018/050758.
(Continued)

*Primary Examiner* — Michael A Tolin
(74) *Attorney, Agent, or Firm* — Patterson + Sheridan, LLP

(57) ABSTRACT

The present invention relates to a method of producing a ribbon comprising bamboo fibers. The method comprises positioning the fibers on a conveyor and conveying the fibers in a transport direction, interconnecting the fibers by covering the fibers with thread and/or particles of a sticky material with at least one web forming device which is positioned above and/or below the conveyor and which ejects thread and/or particles. The formed thread and/or particles attaches to the fibers and forms a web which interconnects the fibers in order to form the ribbon and/or stitching the fibres together with at least one stitching device which is configured to stitch the individual fibers together in order to form the ribbon.

6 Claims, 57 Drawing Sheets

(51) Int. Cl.

| | |
|---|---|
| ***D01B 1/22*** | (2006.01) |
| ***D01B 1/32*** | (2006.01) |
| ***D01B 1/34*** | (2006.01) |
| ***D02G 3/02*** | (2006.01) |
| ***D07B 1/02*** | (2006.01) |
| ***D07B 1/16*** | (2006.01) |
| ***D07B 5/06*** | (2006.01) |
| ***D04H 1/425*** | (2012.01) |
| ***B29C 70/22*** | (2006.01) |
| ***D01D 5/00*** | (2006.01) |
| ***D04H 1/559*** | (2012.01) |
| ***D04H 1/593*** | (2012.01) |
| ***D04H 1/64*** | (2012.01) |
| ***D04H 1/728*** | (2012.01) |
| ***D04H 1/74*** | (2006.01) |
| ***D04H 3/015*** | (2012.01) |
| ***D04H 3/04*** | (2012.01) |

(52) U.S. Cl.
CPC ................. *D01B 1/32* (2013.01); *D01B 1/34* (2013.01); *D01D 5/0007* (2013.01); *D02G 3/02* (2013.01); *D04H 1/559* (2013.01); *D04H 1/593* (2013.01); *D04H 1/64* (2013.01); *D04H 1/728* (2013.01); *D04H 1/74* (2013.01); *D04H 3/015* (2013.01); *D04H 3/04* (2013.01); *D07B 1/02* (2013.01); *D07B 1/162* (2013.01); *D07B 5/06* (2013.01); *B29K 2311/10* (2013.01); *D07B 2201/2089* (2013.01); *D10B 2201/10* (2013.01)

(58) Field of Classification Search
CPC ......... B29B 15/12; B29C 53/18; B29C 70/18; B29C 70/20; B29C 70/226; B29C 70/386; B29C 70/504; B29C 70/506; B29C 70/52; B29K 2311/10; D01B 1/22; D01B 1/30; D01B 1/32; D01B 1/34; D01B 1/36; D01B 1/38; D01B 1/40; D01B 1/42; D01B 1/50; D01B 9/00; D01D 5/0007; D02G 3/02; D04H 1/425; D04H 1/559; D04H 1/58; D04H 1/593; D04H 1/64; D04H 1/728; D04H 1/74; D04H 3/015; D04H 3/04; D07B 1/02; D07B 1/162; D07B 5/06; D07B 2201/2089; D07B 2201/10; D07B 1/04; D07B 1/06; D07B 1/061
See application file for complete search history.

(56) References Cited

U.S. PATENT DOCUMENTS

| | | | | | |
|---|---|---|---|---|---|
| 5,980,672 | A * | 11/1999 | Ryan | B27D 1/086 156/169 |
| 2005/0048273 | A1* | 3/2005 | Ryan | B29C 44/322 264/237 |
| 2010/0178451 | A1 | 7/2010 | Li | |
| 2011/0086567 | A1 | 4/2011 | Hawkins et al. | |
| 2014/0000761 | A1* | 1/2014 | Peng | D01C 1/00 144/3.1 |
| 2014/0033480 | A1 | 2/2014 | Dilo | |
| 2015/0041081 | A1 | 2/2015 | Banu et al. | |
| 2018/0010298 | A1* | 1/2018 | Slaven, Jr. | B02C 4/32 |

FOREIGN PATENT DOCUMENTS

| | | | | |
|---|---|---|---|---|
| JP | 2008045253 A | | 2/2008 | |
| JP | 2008260238 A | | 10/2008 | |
| WO | WO-2018134324 A1 | * | 7/2018 | B29C 70/20 |

OTHER PUBLICATIONS

Netherlands Search Report dated Oct. 3, 2018, corresponding to Application No. 2019892.
Netherlands Search Report dated Apr. 12, 2019, corresponding to Application No. 2021216.

* cited by examiner

METHOD AND DEVICE FOR PRODUCING A RIBBON AND A THREAD OF BAMBOO FIBER

FIELD OF THE INVENTION

The present invention relates to a method and device for producing a ribbon comprising bamboo fibers. The present invention further relates to ribbon produced with the method and device and to a composite product made with the ribbon. The present invention further relates to a method and device for splitting bamboo into fibers. The present invention further relates to a method of forming a product from the ribbon and to the product which is formed from the ribbon.

In a further aspect, the present invention relates to method and device for making a thread comprising bamboo fibers. The present invention further relates to the thread produced with the method and device and to a composite product made with the thread.

BACKGROUND OF THE INVENTION

Bamboo is known as a construction material. Composite products which are made from bamboo parts or from bamboo fibers are also known.

However, it remains quite difficult to divide bamboo stems into fibers and to use these fibers in products. In the prior art, a "wet" extraction process is known in which bamboo parts are cut into short segments. The segments are immersed (drenched) in water. Pulp is formed which is somewhat similar to viscose. Subsequently, the fibers are formed in an elaborate process. A disadvantage of this process is that the fibers become wet. In the further downstream process, the fibers need to be dry. For this reason, a drying operation is required which requires a large amount of energy to dry the pulp.

A "dry" process is also known in which bamboo stems are crushed or cracked into smaller pieces which are then used in further processing and converted into products. This process works, but has as a disadvantage that the individual bamboo pieces have a varying size and shape, which makes the processing difficult. Furthermore, the crushing or cracking has a result that at least a part of the individual bamboo fibers of which the bamboo stems are formed are broken, which results in smaller pieces having a decreased strength. Furthermore, the fibers may have different lengths and may be difficult to align.

In a further, second aspect, it was recognized that thread is a base material for manufacturing many composite products. The insight was developed that it would provide many benefits if a thread can be made of bamboo fibers. The thread can for instance be woven into a flat piece (or ply) which can subsequently be used to manufacture the composite product, for instance with wet layup or dry layup. The thread can also be used in a filament winding manufacturing process or in a pultrusion or pull-winding process. Many other production methods are possible. These are known manufacturing processes which are carried out with a thread of carbon fiber or glass fiber or a different material. However, to date there exists no possibility of carrying out such manufacturing processes with bamboo, because a thread of mechanically produced bamboo fibers simply does not exist, as far as the applicant knows.

WO2005/010082 discusses the challenge of forming composite products from bamboo and discloses a method and device for forming composite products from bamboo. FIGS. 1E and 1F disclose that bamboo tapes of ¾ inch wide (roughly 18-19 mm wide) and 1/16 inch thick (roughly 1.5 mm thick) and having a length of 8 feet (roughly 2.4 m) are fed side by side to a slitter assembly 156, see FIG. 1E and page 13 lines 3-18. The bamboo tapes are fed in a single layer in the vertical direction.

The slitter assembly slices these tapes into filaments of ⅛ inch wide (~3 mm) and 1/16 inch thick (~1.5 mm). With reference to the description on page 14 and FIG. 1G, the filaments then travel into an alignment tunnel that forces the filaments more closely, and then into a coating die fed by an extruder. The coating die spreads a ribbon of molten plastic on both the upper and lower surfaces of the filaments. The result is a sandwich of molten plastic, bamboo filaments and molten plastic of approximately 5 inch (12.5 cm) wide. The sandwich is subsequently squeezed flat with chill rolls into a ribbon which is wider than 5 inch width, see page 14, lines 17-18.

The ribbon is processed with further processing steps into products, see in particular FIGS. 7A-7C of WO2005/010082, in particular by processing the ribbon in layers, see page 8, lines 1-3.

OBJECT OF THE INVENTION

It is an object of the invention to provide a better method and device for splitting bamboo parts into thin bamboo fibers which are suitable to be used in a further process.

It is a further object of the present invention to provide a method and device for interconnecting these bamboo fibers into a ribbon or ply, which is suitable for producing fibre reinforced products.

It is a further object of the present invention to provide a method and device for producing flakes comprising interconnected bamboo fibers.

It is a further object of the present invention to provide fiber reinforced products comprising bamboo fibers, made from the ribbon, mat or flakes.

It is an object of the present invention to provide a method and device for making a thread of bamboo fibers, to provide the thread itself and to provide flat pieces comprising multiple thread sections.

It is a further object of the present invention to provide composite products which are manufactured from the bamboo thread.

It is a further object of the present invention to provide a method and device for making a ribbon and/or a thread comprising bamboo fibers which is not based on pulp but uses a dry process.

SUMMARY OF THE INVENTION

First Aspect

In order to achieve at least one object, a method of producing a ribbon comprising bamboo fibers is provided, the method comprising:

- positioning the fibers on a conveyor and conveying the fibers in a transport direction,
- interconnecting the fibers by:
  - covering the fibers with thread and/or particles of a sticky material with at least one web forming device which is positioned above and/or below the conveyor and which ejects thread and/or particles, wherein the formed thread and/or particles attaches to the fibers and forms a web which interconnects the fibers in order to form the ribbon, and/or stitching the fibres together with at least one stitching device which is configured to stitch the individual fibers together in order to form the ribbon, and/or covering the fibers with a resin in solid form, and subsequently melting and curing the resin, thereby interconnecting the fibers and forming the ribbon, or covering the fibers with a resin in liquid form and subsequently curing the resin, thereby interconnecting the fibers and forming the ribbon.

With the method, bamboo fibers can be arranged and interconnected into a ribbon. The ribbon can be used for producing fiber reinforced products having bamboo fibers.

The words "sticky material" are intended to refer to a resin which is not in solid form or in liquid form but which is softened to the extent that it directly sticks to the bamboo fibers.

The present invention further relates to a ribbon forming device for forming a ribbon comprising bamboo fibers, the ribbon forming device comprising:

at least one conveyor for conveying the fibers in a transport direction, a depositing station where fibers are deposited onto the conveyor, at least one of the following:

a web forming device positioned above and/or below the conveyor downstream of the depositing station for covering the fibers with thread and/or particles of a sticky material, wherein the thread and/or particles form at least one web which interconnects the fibers into a ribbon, and/or a stitching device positioned downstream of the depositing station, wherein the at least one stitching device is configured to stitch the individual fibers together and/or a resin application station positioned downstream from the depositing station for applying a resin on the fibers, and a curing station for curing the resin.

The device provides the same advantages as the method.

The resin application station may be configured for applying the resin in solid form or in liquid form. If the resin is applied in liquid form, the device is configured for melting the resin prior to the curing of the resin. The melting station may be integrated with the curing station in order to melt and cure the resin, or may be separate in the form of a heating device upstream of the curing station.

The present invention further relates to a ribbon comprising bamboo fibers, wherein the bamboo fibers are interconnected by thread and/or particles which are interconnected and form a web and/or are interconnected by stitches.

The present invention further relates to a ribbon in the form of a roll. The ribbon may be rolled onto itself or may be rolled on a bobbin.

The ribbon may be cut to a required width, in particular prior to being rolled into a roll. The parts which are cut from the right and/or left side of the ribbon may be processed into flakes and form a semi-manufactured product. The flakes may be used as intermediate products to manufacture further composite products in a further downstream process.

The present invention further relates to a method of manufacturing a fiber reinforced product from the ribbon, the method comprising:

forming the ribbon, a piece which is cut from the ribbon or the flakes into a predefined shape, in particular by positioning the ribbon, piece or flakes on a mandrel or in a mould, impregnating the ribbon or flakes with resin, letting the resin harden.

The resin may be any resin known in the field of the art, e.g. a thermoplastic or thermosetting resin such as, polycarbonate, polyester resin, vinyl ester resin, epoxy resin, phenolic resin, urethane. Obviously, many more resins are known in the field of the art.

The present invention further relates to a fiber reinforced product comprising the ribbon according to the invention or flakes obtained with the method according to the invention and/or the flakes obtained with the device according to the invention, wherein the ribbon is impregnated with resin which is cured.

The present invention further relates to a fiber forming device for splitting a bamboo part into fibers, wherein the fiber forming device is in particular configured to be used in the method according to the invention and in the ribbon forming device according to the invention, the fiber forming device comprising:

a bamboo part splitting device configured for splitting a flat piece of bamboo from a bamboo part, the bamboo part splitting device comprising:

at least a first rotary member and a second rotary member for guiding the bamboo part between them, at least one splitting edge positioned downstream from the first and second rotary member for splitting a flat piece of bamboo from the bamboo part, a flat piece splitting device for splitting each flat piece which exits the bamboo part splitting device into fibers.

The fiber forming device advantageously allows the forming of thin fibers from bamboo parts. The fibers are a formed along the natural fiber direction, resulting in fibers of a predefined length, width and height (or thickness). The device was found to be reliable and suitable for efficient production of the fibers, with a limited loss of material. The fibers are separate from each other, in other words are not attached to one another.

Moreover, in this way bamboo fibers can be created without a pulp step in which bamboo fibers are immersed and converted to pulp. This saves time and energy for drying the pulp and prevents the bamboo fibers from becoming entangled. In pulp, the bamboo fibers may be curved and become an entangled "spaghetti soup". After drying, the "spaghetti" needs to be untangled which is cumbersome. The present invention does not have this disadvantage because it is based on a dry process. Some methods of the prior art are based on treatment with steam. This is also considered a wet process. The present invention disclosed herein is dry in the sense that it works without steam.

The fibers which exit the flat piece splitting device are substantially parallel and exit the flat piece splitting device as a group (or bundle) of aligned fibers which are arranged parallel and adjacent one another. The fibers have front ends which are substantially aligned and rear ends which are substantially aligned. The fibers are ready for further processing. The fibers are in particular ready to be deposited onto the conveyor of the ribbon forming device according to the present invention. The flat piece splitting device may advantageously separate the fibers from wood parts which are located between the fibers. These wood parts can be removed.

In one possible embodiment, the fiber forming device may comprise an upstream module positioned upstream from the bamboo part splitting device. The upstream module is configured for creating the flat pieces of bamboo which are fed to the bamboo part splitting device from a tubular bamboo segment. The upstream module may comprise a rolling mill for dividing the tubular bamboo segment in an axial direction thereof into tube segments. The splitting device of the upstream module is configured to split the tube segments into flat pieces of bamboo which can be fed to the bamboo part splitting device. Such an upstream module is known from the prior art and does not form part of the present invention by itself.

The present invention further relates to a method of splitting a bamboo part into multiple fibers, the method comprising:

- inserting a bamboo part into the fiber forming device according to the invention,
- splitting a flat piece from the bamboo part with the bamboo part splitting device,
- splitting the flat piece into multiple fibers with the flat piece splitting device.

The method provides the same advantages as the fiber forming device according to the invention.

The fibers are separate from each other, in other words are not attached to one another.

The present invention further relates to a flat piece splitting device for splitting a flat piece of bamboo into a plurality of fibers, the flat piece splitting device comprising:

- a first rotary element configured for rotation about a first axis, and
- a second rotary element configured for rotation about a second axis, the first and second axis being parallel, wherein the first rotary element comprises a plurality of first splitting members having a first diameter (D1) and a plurality of second splitting members having a second, different diameter (D2), wherein the first and second splitting members are alternately positioned along the first rotation axis, wherein the second rotary element comprises a plurality of third splitting members having a third diameter and a plurality of fourth splitting members having a fourth diameter which is different from the third diameter, wherein the third and fourth splitting members are alternately positioned along the second rotation axis, wherein the first, second, third and fourth splitting members comprise a circumferential splitting surface, wherein the first splitting members are positioned opposite the third splitting members and the second splitting members are positioned opposite the fourth splitting members, wherein a first series of passages are defined between the first and third splitting members and a second series of passages are defined between the second and fourth splitting members, wherein the first and second series are located at a passage distance from one another.

It was found that the flat piece splitting device allows splitting of a flat piece of bamboo into individual fibers in an effective and reliable way, allowing high throughput with limited loss of material. The splitting occurs at a distance upstream of the first and second rotary elements. As a result, the fibers are advantageously split according to their natural fiber direction, resulting in fibers of a predetermined length, width and height. In addition the fibers may be separated from wood parts which are located between the fibers.

During the splitting of the flat piece, the fibers which are formed and which are located adjacent one another are pulled away from one another because a first fiber to be formed is forced to travel through a first passage being part of the first series of passages. An adjacent second fiber to be formed is forced to travel through a second passage being part of the second series of passages. Because the first and second passage are spaced apart, the fibers are pulled away from one another. The fibers are split at a distance upstream of the first and second rotary element as a result of this. This effectively results in a splitting along the natural direction of the fibers themselves, with the beneficial consequence that the fibers stay intact over their length. Ultimately, this results in a stronger composite end product.

The present invention further relates to a fiber cleaning device for cleaning bamboo bamboo fibers, comprising: a first rotary cleaning member and a second rotary cleaning member which define a passageway between them. The cleaning device may form part of the flat piece splitting device or may stand on its own.

Second Aspect—Thread

In a second aspect, the present invention relates to a method of manufacturing a thread comprising bamboo fibers, the method comprising:

- arranging the bamboo fibers into an elongate strand of bamboo fibers, wherein each cross-section of the strand comprises multiple bamboo fibers, wherein in each cross section of the strand a plurality of bamboo fibers are staggered in the longitudinal direction of the strand relative to a plurality of other bamboo fibers in said cross section,
- interconnecting the bamboo fibers into a thread by:
  - providing a web (212) around the strand, wherein the web has an open structure and comprises multiple openings, and/or
  - applying a coating or resin onto the fibers and/or
  - winding a binding thread around the strand WO2005/010082 discloses the manufacturing of a ribbon of about 5 inch (12.5 cm) wide but lacks the insight that a thread comprising bamboo fibers would be a product having a wide variety of applications in particular for filament winding, pulltrusion, pullwinding, manufacturing of sheets (woven or unidirectional) for subsequent processing.

The formed thread may serve as a base material for manufacturing composite products. Many different applications are possible, e.g. parts of cars, airplanes, boats, sports products and many other products. Basically, most products which are currently made of carbon fibre or Glassfibre, aluminium, steel and other construction materials can be made from this new base material.

Although thread is known to be made from other natural fibers such as hemp or flax, the applicant is not aware of the existence of any thread which is made from bamboo fibers. A reason for this is believed to be that bamboo is much more difficult to process into thread than hemp. One of the reasons may be that—at least until the present invention—it was difficult to obtain fibers from bamboo which are thin enough to process into a thread and maybe also that prior to the present invention it was difficult to process these bamboo fibers into a thread.

Apart from not disclosing a method and device for making a thread comprising bamboo fibers, WO2005/010082 also does not disclose many of the further novel and inventive features set out below.

The staggering of the fibers on the longitudinal direction of the strand increases the strength of the thread, because end portions of each fibers will lie against one or more adjacent fibers which are staggered in the longitudinal direction relative to said fiber. This end portion then forms an area of overlap with each of these fibers. Each fiber may for instance form three, four, five or six overlap areas with three, four, five or six surrounding fibers. Some of the overlap areas may coincide to a significant extent in the longitudinal direction. In other words, the overlap areas of one end portion of a fibre may not be staggered in the longitudinal direction. This may be in particular the case when the fibers are grouped into groups, wherein the groups are staggered and wherein the fibers within each group are not staggered relative to one another.

However, it is also possible that the fibers are distributed in the longitudinal such that the fibers do not form groups of non-staggered fibers and wherein also the overlap areas which are present in a cross-section of the thread surrounding the end portion of each fibre are staggered, at least to a significant extent.

In an embodiment, the bamboo fibers may be deposited on bamboo fibre guiding device, in particular a gutter or a tapered guide and form a strand on the bamboo fibre guiding device, wherein the bamboo fibers are moved along the bamboo fibre guiding device, wherein the bamboo fibre guiding device has an end, and wherein the bamboo fibers are moved over the end of the bamboo fibre guiding device, wherein the web engages the strand at an engagement area downstream of the end of the bamboo fibre guiding device. This allows an effective and reliable formation of the strand.

In an embodiment, the web may be formed as at least one elongate strip of web material which engages the strand at the engagement area. This allows a reliable production process with a high throughput.

In an embodiment, the strand may be moved continuously in a transport direction during the engagement of the web with the strand. The continuous movement allows a production at a constant and high quality.

In an embodiment, the average length of overlap of each fibre in the thread may be similar to the average length of the fibers, or at least 90 percent of the average length of the fibers. This is advantageous because it results in a strong thread. This percentage of overlap may be created in various arrangements of the bamboo fibers in the strand.

In an embodiment, a folding member is positioned at the engagement area or downstream from the engagement area and wherein the folding member folds the web around the strand. The folding member ensures a proper folding of the web around the strand.

In an embodiment, the folding member may extend around a main transport axis along which the strand is moved. This is a simple and reliable solution for the folding step.

In an embodiment, a heating device may be positioned downstream from the engagement area, and in particular downstream of the folding member, wherein the web is at least partially melted during the heating, thereby connecting the web to the strand. This was found to be a very effective way of connecting the web to the strand, resulting in a high quality connection between the web and the strand.

In an embodiment, the elongate strip of web material may comprise at least a first material having a first melting temperature and a second material having a second melting temperature, wherein the first melting temperature is lower than the second material melting temperature, and wherein the heating is performed at or above the first melting temperature but below the second melting temperature, wherein the first material melts but the second material does not melt, and wherein the first material connects the second material to the strand of bamboo fibers. In this way it is not necessary to insert a separate adhesive between the web and the strand. The first material itself forms the adhesive.

In an embodiment, the first melting temperature may be between 60 and 180 degrees Celsius, preferably between 110 and 180 degrees, more preferably between 120 and 150 degrees Celsius and wherein the second melting temperature is between 130 and 250 degrees, preferably between 160 and 200 degrees Celsius. It was found that this results one the one hand in a thread which can be easily further processed while at the same time being sufficiently strong at room temperature to stay intact during transport and handling.

In an embodiment, the elongate strip of web material may comprise a first layer and a second layer, the first layer comprising the first material and the second layer comprising the second material. It was found that the multiple layers make it possible to form the web around the strand and to connect the web to the strand.

In an embodiment, the first layer may form an inner layer and the second layer forms an outer layer around the strand, at least prior to melting of the first layer. In this way, the first layer which connects the second layer to the strand is automatically positioned in the required position, i.e. between the second layer and the strand.

In an embodiment, a compression device may be positioned downstream of the heating device, wherein the compression device compresses the thread. The compression device improves the connection between the web and the strand and may make the strand of bamboo fibres, and the resulting thread, more compact.

In an embodiment, the compression device flattens the thread, and to this end comprises in particular at least one pair of rollers which are pressed against one another and wherein the strand is conveyed between the rollers. A flat thread may have advantages in forming flat pieces (also called plies) of multiple thread sections, the flat pieces may become flatter with flattened threads allowing a larger surface and a better stacking of multiple flat pieces. The rollers are a simple and effective way of flattening the strand.

In an embodiment, the cross-sectional area of each bamboo fiber may be between 0.005 and 0.1 mm2, more in particular between 0.01 and 0.03 mm2 and wherein the length of the bamboo fibers is between 2 and 50 cm, in particular between 4 and 30 cm, more in particular between 7 and 25 cm. It was found that these dimensions result in thread which is suitable for further processing into composite products.

In an embodiment, the individual bamboo fibers have a width of 50-400 μm, in particular 100-200 μm, more in particular about 150 μm.

In an embodiment, the bamboo fibers have a substantially square, rectangular, round or flat cross sectional shape, wherein in case of a rectangular or flat shape the width of the fibres may be more than 3 times a height, in particular as a result of a flattening step with a flattening device for flattening the individual bamboo fibers.

In an embodiment, the formed thread has a cross-sectional area of 0.1-100 mm2, preferably 0.2-40 mm2, more preferably 0.5-20 mm2, and wherein the cross-sectional area of the strand (in any location) comprises between 10 and 500 bamboo fibers. It was found that these dimensions provide a very effective thread for further processing into composite products.

In an embodiment, downstream of the engagement area, in particular downstream of the heating device, and more in particular downstream of the compression device, the thread may be conveyed through a bath of liquefied material, wherein the thread is impregnated with the liquefied material in the bath. The liquefied material functions as a resin in the further processing of the thread into composite products.

The liquefied material (or resin) may comprise a thermoplastic material or a thermosetting material. In an embodiment, the thermoplastic material is chosen from a group comprising: polyethylene and polypropylene, PA6, PA12 and bio-based thermoplastics, e.g. Solany, PLA, lignine, pectine, cellulose, polylactocapron. These materials were found to be very suitable in further processing steps of manufacturing composite products. Examples of thermosetting materials may be polyester, vinylester, epoxy. The skilled person will understand that many other materials may be used.

In an embodiment, the formed thread may be wound onto itself or onto on a spool. This provides an efficient unit for further processing operations.

In an embodiment, the gutter has a V-shape, a U-shape or a generally concave shape. These shapes allow reliable formation of the strand.

In an embodiment, the web may be wrapped around the strand during a movement of the strand in a longitudinal direction thereof. The wrapping in combination with the movement of the strand results in a high quality thread.

In an embodiment, the web may be manufactured with electro-spinning. It was found that electro-spinning allows production of an extremely light-weight web with an extremely open structure, allowing the resin to easily enter the strand, i.e. to enter the spaces between the bamboo fibers. In this embodiment, the web is non-woven.

In another embodiment, the web may be a woven web, in particular made from very fine thread having an open structure.

In an embodiment, the web may be formed as an elongate strip of web material prior to the wrapping step and in a separate process. It was found that this allows a fast production process. The manufacturing of the web may be carried out offline and outside the critical path, which reduces downtime in the production of the thread. If suitable elongate strips of web material are commercially available, these may be purchased.

In an embodiment, a width of the elongate strip may be greater than a circumference of the strand, and wherein during the wrapping of the web around the strand a central portion of the elongate strip contacts the strand and a right side and a left side of the elongate strip of the web contact one another and are subsequently folded onto the strand. This was found to be a simple way of completely enveloping the strand with the web.

In an embodiment, the web may be formed by multiple elongate strips of web material, which are pressed against different sides of the strand and are connected to one another via overlap portions, and wherein the overlap portions are in particular folded against the strand. This was also found to be a simple and effective way of completely enveloping the strand with the web.

In an embodiment, the web may be formed by two elongate strips of web material, which are pressed against opposite sides of the strand, wherein the width of the elongate strips is greater than half of the circumference of the strand, wherein two overlap portions are formed and wherein the overlap portions are folded against the strand.

In an alternative embodiment, the at least one elongate strip or a binding thread may be wound around the strand in a helical manner.

In an embodiment, at least a significant portion of the bamboo fibers in the thread may not be braided or twisted.

In an embodiment, the bamboo fibers are straight and extend parallel to the main longitudinal direction of the thread. A significant portion in this context means, at least 30 percent, preferably at least 50 percent, more preferably at least 90 percent.

Preferably, none of the bamboo fibers may be braided or twisted. In thread made from hemp or flax or other natural fibers, the fibers are generally braided or twisted. However, in the present invention the bamboo fibers (or at least a significant portion of the bamboo fibers) are straight and parallel to the main longitudinal direction of the thread. extend alongside one another and are not braided or twisted. This makes the depositing step easier and still results in a thread having a sufficiently high strength for handling and processing an resulting in composite products having a sufficiently high strength and stiffness.

The non-braiding and non-twisting actually improves the strength of the thread, because if a braided or twisted thread is put under a tensile force, the individual fibers (which are curved) tend to straighten, thereby exerting lateral pressure on the resin which interconnects the fibers. This may cause breaking of the resin. When the fibers are not braided or twisted and extend parallel to the main longitudinal direction of the thread, this effect does not occur. The bamboo fibers are already straight and do not straighten when the thread is put under tensile force.

In an embodiment, the bamboo fibers in the strand and consequently in the thread extend substantially parallel (i.e. unidirectional) to one another. This makes the arranging of the bamboo fibers into a strand easy.

In an embodiment, the thread is formed as an endless thread in a continuous process. This production method allows a high throughput and a reliable production process.

In an embodiment, the fibers may have different lengths. The step of making the fibers by splitting, flattening and cleaning (e.g. by combing) bamboo parts may result in fibers having different lengths. In an embodiment it is not required to select only a small portion of these fibers having a certain, same length. Rather, all these fibers or at least a large portion of the obtained fibers may be used.

In an embodiment, the fibers may have an average length L, and the lengths of the fibers may vary according to a distribution pattern, the distribution pattern having a standard deviation a of less than 0.3*L.

In an embodiment, prior to the step of arranging the fibers into a strand, bamboo parts are split into individual bamboo fibers with a fiber forming device, wherein the bamboo fibers have a cross-sectional area (A) and a length (L). The splitting makes it possible to start with bamboo parts as a base material for making the thread.

In an embodiment, after the splitting step, the bamboo fibers may be flattened with a flattening device. The flattening device contributes to opening and separating the splitted bamboo fibers and results in relatively flat bamboo fibers which were found to result in a higher strength and overall high quality of the thread and the resulting composite products.

In an embodiment, after the splitting step, and in particular after the flattening step, the bamboo fibers are cleaned with a cleaning device. The bamboo fibers may have wooden parts (parenchyma) attached to them. These parts do not contribute to the strength and removing these parts results in a higher quality of the thread.

In an embodiment of the method, resin is supplied to the strand or to the bamboo fibers which are to form the strand at a resin supply location upstream of the heating device, wherein the resin is subsequently heated by the heating device and wherein the heated resin flows between the bamboo fibers. The heated resin flows in the interspaces between the individual bamboo fibers. The heated resin is distributed over the surface area of the individual bamboo fibers.

In an embodiment resin is supplied to the strand or to the bamboo fibers which are to form the strand at a resin supply location upstream of the compression device. By applying both heat and compressive forces, the resin is distributed between the bamboo fibers very well.

The resin content in the thread may be above 40 percent, possibly above 50 percent by mass.

The thread will be relatively stiff as a result of the resin. This results in a thread which is very easy to process in subsequent processing steps, because the bamboo fibers are already surrounded by resin. This process also has an advantage over providing resin on the outside of the thread after the heating step, because in that case the resin will only flow between the bamboo fibers to a limited extent.

In an embodiment of the method, the resin may be supplied to the strand downstream from the end of the bamboo fibre guiding device. In this area, the strand has been formed. A risk of sticking of the strand to a guide or other piece of equipment due to the supplied resin is relatively small.

In an embodiment, the resin is supplied to the strand at the engagement area. At the engagement area, the web material also contacts the strand. Therefore, three flows merge in this embodiment in the engagement area: the strand, the web material and the resin.

In an embodiment, the resin is supplied to the strand at the engagement area where the web engages the strand or directly upstream or directly downstream of the engagement area. The resin may be supplied to the strand directly upstream from the engagement area where the web contacts the strand. In this area, the bamboo fibers which form the strand are still relatively loose, and the resin can easily be supplied between the bamboo fibers. Directly downstream from the area where the web engages the strand, the web has not yet been folded around the strand, and the strand is still accessible for the resin. The bamboo fibers are also still relatively loose, and the resin can be supplied between the bamboo fibers. This increases the chance that all bamboo fibers are surrounded by resin, which improves further processing of the formed thread in a further downstream steps.

In an embodiment, the resin is supplied to the strand by depositing one or more threads of resin on the strand, by spraying or by adding fibers of resin to the strand. These were found to be very effective ways of letting as much of the surface area of the individual bamboo fibers as possible come into contact with the resin.

The resin may be supplied to the strand from above. The web may engage the strand from below at the engagement area.

In another embodiment, a mixture of bamboo fibers and resin fibers or particles is supplied to the receiving area and subsequently formed into the strand. It was found that this is a suitable alternative which also result in effective distribution of the resin over the combined surface areas of the bamboo fibers.

The resin may be supplied continuously, for instance as one or more resin threads or as a continuous flow of resin fibers or particles.

In an embodiment, the device is configured to:

fold the web around the bamboo fibers and the resin, and/or wind the binding thread around the bamboo fibers and the resin, and/or apply the coating to the bamboo fibers and the resin.

In the second aspect, the present invention further relates to a device for manufacturing a thread comprising bamboo fibers, the device comprising:

a strand forming device for arranging the bamboo fibers into an elongate strand of bamboo fibers, wherein each cross-section of the strand comprises multiple bamboo fibers, wherein in each cross section of the strand a plurality of bamboo fibers are staggered in the longitudinal direction of the strand relative to a plurality of other bamboo fibers in said cross section, an interconnecting device configured for interconnecting the fibers in the strand, thereby forming a thread, wherein the interconnecting device is chosen from a group comprising:

a web application device configured for applying a web on the strand, wherein the web application device is positioned downstream from the arranging device, and wherein the web which is applied on the strand by the web application device has an open structure and comprises multiple openings, and/or a coating/impregnating device configured for applying a coating or resin onto the strand, and/or a winding device configured for winding a binding thread around the strand The device provides essentially the same advantages as the method (of the second aspect).

In an embodiment, the device may be configured for moving the formed strand continuously in a transport direction, wherein the web application device is configured for applying the web onto the strand in an engagement area during the moving of the strand in the transport direction.

In an embodiment, the web application device may comprise a web guiding device which moves the web in the transport direction and guides the web against the strand in the engagement area. This is a reliable way of forming the web around the strand.

The coating/impregnating device may be provide in addition to the web application device or winding device as an alternative. The winding device may also be provided in addition to the coating/impregnating device or web application device or as an alternative.

In an embodiment, the web may be formed as at least one elongate strip of web material, wherein the web guiding device moves the at least one elongate strip of web material in the transport direction and guides the at least one elongate strip of web material web against the strand in the engagement area.

In an embodiment, the strand forming device may be configured to move the formed strand continuously in a transport direction during the engagement of the web with the strand. This was found to be a reliable and effective way of creating the thread.

In an embodiment, the strand forming device may comprise a receiving area for receiving the bamboo fibers and a bamboo fibre guiding device for guiding the bamboo fibers into a more compact configuration, wherein the bamboo fibre guiding device has an end, and wherein the bamboo fibers are moved as a strand over the end of the bamboo fibre guiding device, and wherein the web application device applies the web in engagement area which is at least partially downstream of the end of the bamboo fibre guiding device. The bamboo fibers which are moved as a strand over the end are accessible from all sides, and the web can easily be wrapped or formed around the full circumference of the strand.

In an embodiment, the bamboo fibre guiding device may be a gutter or a tapered guide. This was found to allow efficient arrangement of the bamboo fibers into a strand and allows reliable wrapping of the web around the strand.

In an embodiment, the bamboo fibre guiding device may be oriented downwards and guides the bamboo fibers downward, in particular at an angle of 1-90 degrees to the horizontal, more in particular at an angle of 1-20 degrees. In this way, it is easy to let the bamboo fibers move under the influence of gravity in the transport direction.

In an embodiment, the device may comprise a vibrating device for vibrating the bamboo fibre guiding device. Vibration may be used for effectively moving the bamboo fibers in the transport direction.

In an embodiment, the web guiding device may comprise a folding member which is positioned at the engagement area or downstream from the engagement area, wherein the folding member folds the at least one elongate strip of web material around the strand. This was found to e a simple and reliable way of providing the web around the strand.

In an embodiment, the folding member may extend partially or wholly around a main transport axis along which the strand is moved.

In an embodiment, the device may comprise a heating device which is positioned downstream from the engagement area, wherein the heating device is configured to at least partially melt the applied web, in particular the elongate strip of web material, during the heating, thereby connecting the web to the strand. The heating device creates a good and strong connection between the strand and the web resulting in a high quality thread.

In an embodiment, the heating device may be configured to at least partially melt the applied web at a temperature of between 60 and 180 degrees Celsius, preferably between 120 and 150 degrees Celsius. This results in a thread which is sufficiently strong at room temperature to be handled and processed, yet easy to process into composite products in further downstream operations.

In an embodiment, the device may comprise a compression device which is positioned downstream of the heating device, wherein the compression device compresses the strand with the applied web, now called a thread. The compression device improves the connection between the web and the strand and may make the thread more compact.

In an embodiment, the compression device may be configured to flatten the thread, and to this end comprises in particular at least one pair of rollers wherein the rollers are pressed against one another and wherein the thread is conveyed between the rollers. The flattening of the strand may have advantages in the further processing of the thread into composite products.

In an embodiment, the device may comprise a bath which is positioned downstream of the engagement area, in particular downstream of the heating device, and in particular downstream of the compression device, wherein the bath holds a liquefied material, wherein the device comprises one or more guides to guide the strand with the applied web through the bath in order to impregnate the strand and the applied web with the liquefied material in the bath. In this way, the thread can be manufactured for fast and easy use in processing operation further downstream in order to form composite products from the thread. In particular pre-preg flat pieces can be made from the impregnated thread.

The liquefied material may comprise a thermoplastic material or a thermosetting material. The thermoplastic material may be chosen from a group comprising: polyethylene, polypropylene, PA6, PA12 and bio-based thermoplastics, e.g. Solany, PLA, lignine, pectine, cellulose, polylactocapron. These materials are very suitable for making composite products.

Other materials than thermoplastic or thermosetting materials may also be possible, for instance an adhesive which hardens by drying.

The device may comprises a spooling device for winding the thread onto itself or onto on a spool. This results in a unit which can be processed efficiently further downstream.

In a further embodiment, the bamboo fibre guiding device may have a V-shape, a U-shape, a generally concave shape or a tapered shape.

In a further embodiment, the web guiding device may be configured to wrap the web around the strand during a movement of the strand in a longitudinal direction thereof. This was found to be very reliable.

In an embodiment the device may comprise an electro-spinning device for electro-spinning the web, wherein the electro-spinning device is arranged separately from the strand forming device and the web application device and is configured to form the web as an elongate strip of web material prior to the wrapping step, wherein the electro-spinning device comprises a spooling device for spooling the web onto a spool or onto itself. The electro-spinning creates a lightweight and very open web. The separate production of the web makes the overall process more reliable resulting in less downtime.

In an embodiment, the web application device may comprise an unspooling device for unspooling the web prior to engagement with the strand of bamboo fibers. This allows a simple and reliable application of the web on the strand.

In an embodiment, the device may comprise a fiber forming device as disclosed herein for splitting a bamboo part into fibers, the fiber forming device being positioned upstream of the strand forming device, wherein the splitting device is configured for splitting the bamboo parts into bamboo fibers having a cross-sectional area (A) and a length (L), wherein the cross-sectional area of each bamboo fiber is between 0.005 and 0.1 mm2, more in particular between 0.01 and 0.03 mm2, and wherein the length of the bamboo fibers is between 2 and 50 cm, in particular between 4 and 30 cm, more in particular between 7 and 25 cm.

In an embodiment the device may be configured to press at least two elongate strips of web material against the strand at the engagement area and to fold the at least to elongate strips around the strand of bamboo fibers.

In an embodiment, the web application device may be configured to wind at least one elongate strip or at least one binding thread around the strand in a helical manner.

In an embodiment, the device may be configured to provide the strand with a cross-sectional area of 0.1-100 mm2, preferably 0.2-40 mm2, more preferably 0.5-20 mm2.

In an embodiment, the device may be configured to provide between 10 and 500 bamboo fibers in a cross-sectional area of the strand.

In an embodiment, the device may comprise a resin supply device configured to supply resin the strand or to the bamboo fibers which are to form the strand at a resin supply location upstream of the heating device, wherein the resin is subsequently heated by the heating device and wherein the heated resin flows between the bamboo fibers.

In an embodiment the resin supply device is located upstream of the compression device. By applying both heat and compressive forces, the resin is distributed between the bamboo fibers very well.

The resin content in the thread may be above 40 percent, possibly above 50 percent by mass.

The thread will be relatively stiff as a result of the resin.

In an embodiment, the resin supply device may be located downstream from the end of the bamboo fibre guiding device.

In an embodiment, the resin supply device may be located at the engagement area.

In an embodiment, the resin supply device may be located at the engagement area where the web engages the strand or directly upstream or downstream of the engagement area.

In an embodiment, the resin supply device is configured to depositing one or more threads of resin on the strand, or configured to spray resin on the strand or configured to add fibers of resin or resin particles to the strand. The resin particles may be so small that the resin is in the form of powder.

In an embodiment, the device is configured to supply a mixture of bamboo fibers and resin fibers or resin particles supplied to the receiving area and subsequently formed into the strand. To this end, the device may comprise multiple supply tubes, one or more for the bamboo fibers and one or more for the resin fibers or resin particles. Alternatively or additionally, the device may comprise a hopper which holds both bamboo fibers and resin particles or resin fibers, and the mixture may be supplied to the receiving area via one or more supply tubes which extend from the hopper to the receiving area.

In an embodiment, the resin supply device is positioned above the trajectory followed by the strand and configured to supply the resin to the strand from above.

In an embodiment, the web guiding device is configured to let the web engage the strand from below.

In an embodiment, the device comprises:

- a web application device configured to wrap or wind a web around the bamboo fibers and the resin, and/or
- a winding device configured to wind a binding thread around the bamboo fibers and the resin, and/or
- a coating device configured to apply a coating the bamboo fibers and the resin.

In the second aspect, the present invention further relates to a thread comprising a plurality of bamboo fibers, wherein the bamboo fibers have a cross-sectional area (A) and a length (L), wherein the bamboo fibers are grouped into an elongate strand of bamboo fibers, wherein each cross-section of the strand comprises multiple bamboo fibers, wherein in each cross section of the strand a plurality of bamboo fibers are staggered in the longitudinal direction of the strand relative to a plurality of other bamboo fibers in said cross section, and wherein the thread comprises a web which extends around the strand, wherein the web has an open structure and comprises multiple openings.

The thread may be used as a base material for making composite products, as indicate above in connection with the method. The thread can be used in filament winding, pultrusion, pullwinding or different manufacturing methods or for making flat pieces comprising multiple thread sections as discussed below.

Multiple threads may be grouped, or intertwined together into a single, thicker thread.

In an embodiment, the cross-sectional area of the thread may comprise between 5 and 500 bamboo fibers, in particular between 10 and 300 bamboo fibers.

In an embodiment, the cross-sectional area of each bamboo fiber may be between 0.005 and 0.1 mm2, more in particular between 0.01 and 0.03 mm2.

In an embodiment, the individual bamboo fibers may have a width of 50-400 μm, in particular 100-200 μm, more in particular about 150 μm.

In an embodiment, the length of the bamboo fibers in the strand may be between 2 and 50 cm, in particular between 4 and 30 cm, more in particular between 7 and 25 cm.

In an embodiment, the thread may have a cross-sectional area of 0.1-100 mm2, preferably 0.2-40 mm2, more preferably 0.5-20 mm2, and in particular between 1 and 5 mm2.

In an embodiment, the thread may have a diameter of 0.5-5 mm, preferably 1-4 mm.

In an embodiment, the web may be manufactured with electrospinning.

In an embodiment, the thread may be flat.

In an embodiment, the thread may be impregnated, in particular with a thermoplastic material or a thermosetting material.

In an embodiment, the thread may be impregnated with a thermoplastic material which liquefies at a temperature greater than 100 degrees Celsius, in particular greater than 140 degrees Celsius.

In an embodiment, the thermoplastic material is chosen from a group comprising:

polyethylene, polypropylene, PA6, PA12 and bio-based thermoplastics e.g. Solany, PLA, lignine, pectine, cellulose, polylactocapron.

In an embodiment, the web is formed from at least one elongate strip of web material which is wrapped around the bamboo fibers or wound around the bamboo fibers.

In an embodiment, the web is formed by two elongate strips of web material, which are pressed against opposite sides of the strand, wherein the width of the elongate strips is greater than half the circumference of the strand, wherein two overlap portions are formed and wherein the overlap portions are folded against the strand.

In an embodiment, the web is connected to the bamboo fibers via a molten material.

In an embodiment, at least 30 percent, preferably at least 50 percent, more preferably at least 90 percent of the bamboo fibers, and even more preferably all of the bamboo fibers in the thread are not braided or twisted, and in particular extend substantially parallel to one another.

In an embodiment, the bamboo fibers may be straight and may extend parallel to the main longitudinal direction of the thread.

In an embodiment, the bamboo fibers have a substantially square, rectangular or flat cross sectional shape.

In an embodiment, the bamboo fibers may have an average length L, and the lengths of the bamboo fibers may vary according to a distribution pattern, the distribution pattern having a standard deviation $\sigma$ of less than 0.3*L. This allows a stronger and a more homogenous thread.

In an embodiment, the average number of fibers in a cross-section of the thread is An, and the number of fibers in any cross-section of the thread is An+/−30 percent, preferably An+/−20 percent, more preferably An+1-10 percent. This results in a homogenous thread having a homogenous strength and cross-section (e.g. diameter).

In an embodiment, the average length of overlap Lo of each fiber relative to at least one adjacent fiber is at least 10 percent of the average length L of the bamboo fibers, more preferably at least 20 percent of the average length L.

The overlap areas may have different lengths. Alternatively, the overlap areas may have a substantially same, predefined length. This may be realized by depositing the bamboo fibers according to a predefined pattern.

In an embodiment, the bamboo fibers are randomly staggered in the longitudinal direction of the strand.

In an embodiment, the fibers are staggered in a pattern in the longitudinal direction of the thread.

In an embodiment, the thread comprises resin which is present between the bamboo fibers.

In an embodiment the resin content may be above 40 percent, possibly above 50 percent by mass.

The thread will be relatively stiff as a result of the resin.

In an embodiment of the thread, the web surrounds the bamboo fibers and the resin.

In an embodiment of the thread, a helical binding thread is wound around the bamboo fibers and the resin and, if present, the web.

In an embodiment of the thread, a coating is applied onto the bamboo fibers and the resin and, if present, the web/ and/or helical binding thread.

In an embodiment of the thread, more than 80 percent by weight, preferably more than 90 percent by weight and more preferably more than 99 percent by weight of the fibers, in particular 100 percent, are bamboo fibers.

The present invention further relates to a web material for manufacturing a thread comprising bamboo fibers, the web material having an open structure and comprising multiple openings.

In an embodiment, the web material is provided as an elongate strip of web material.

In an embodiment, the elongate strip of web material comprises at least a first material having a first melting temperature and a second material having a second melting temperature, wherein the first melting temperature is lower than the second material melting temperature.

In an embodiment, the first melting temperature is between 60 and 180 degrees Celsius, preferably between 120 and 150 degrees Celsius and wherein the second melting temperature is between 130 and 250 degrees, preferably between 160 and 200 degrees Celsius.

In an embodiment, the elongate strip of web material comprises a first layer and a second layer, the first layer comprising the first material and the second layer comprising the second material.

In the second aspect, the present invention further relates to a flat piece comprising multiple sections of thread, wherein the threads are connected to one another. The threads may be directly connected to one another, or indirectly, for instance via a foil. The flat piece may also be referred to as a mat. The flat piece can be used to manufacture composite products. Multiple flat pieces can be stacked to form the composite product.

The flat pieces may be flexible to allow bending into the required shape.

In an embodiment, the sections of thread may be woven and extend in different directions, or the sections of thread may extend unidirectionally. Both variants may have their specific advantages when making a composite product. The flat pieces with unidirectional thread sections are especially suitable for making product which require a high stiffness in a single direction, whereas the flat pieces with multidirectional fibers are more suitable for making composite products which require a high strength and stiffness in multiple directions.

In an embodiment of the flat piece the threads are impregnated and wherein the flat piece forms a pre-preg piece. The pre-preg piece can be used to make composite products without further addition of resin. In case the flat piece is not impregnated, composite products can for instance be made with infusion as is known from carbon products.

In an embodiment, the thread sections are impregnated with a hot melt material. In this way, composite products can be made by applying heat to the flat pieces and by subsequently letting the flat pieces cool off.

In an embodiment, the sections of thread may be connected to one another with a foil or other connecting member. In case of a foil, the foil itself may for instance be of a thermoplastic or thermosetting material and form the resin when the product is made. The foil or other connecting method may also advantageously allow flat pieces with unidirectional thread sections.

In the second aspect, the present invention further relates to a method of manufacturing a composite product from the thread, the method comprising:

- forming a shape with multiple sections of thread, in particular with a mandrel or mould,
- letting the shape harden.

This may be filament winding, pulltrusion, pullwinding or other production methods as discussed below.

In an embodiment, the method may comprise impregnating the thread with resin, wherein the resin enters the thread via the openings in the web, and wherein the resin enters spaces between the individual bamboo fibers, and letting the resin harden, wherein the resin binds the individual fibers together and binds the thread sections together. This may for instance be carried out by infusion in combination with vacuum as is known from the production of carbon products.

The method may comprise heating the shape.

In an embodiment of the method, the elongate strip of web material comprises:

- a first substance which melts when heated at a first temperature,
- a second substance which melts when heated at a second temperature, wherein the second temperature is higher than the first temperature wherein after the shape has been formed, the shape is heated to the second temperature, thereby melting the second substance, wherein subsequently the temperature is lowered again, thereby hardening the second substance, wherein the hardened second substance interconnects the multiple sections of thread in the shape.

In an embodiment of the method, one or more flat pieces may be used to form the shape, each flat piece comprising multiple thread sections.

In an embodiment of the method, at least a part of the flat pieces may be woven from multiple sections of thread prior to the forming of the shape, and wherein the shape is formed with one or more flat pieces. This provides basically endless possibilities of making products, such as body parts or the chassis of a car, frames for bikes, hulls for boats or other boat parts, airplane parts, tennis rackets and other sports articles, furniture, building and construction materials etc.

In an embodiment of the method, one or more flat pieces have unidirectional fibers.

In an embodiment of the method, the flat pieces may be pre-preg flat pieces, i.e. flat pieces including a thermoplastic or thermosetting material.

In an embodiment of the method the flat pieces have flattened thread sections. Such flat pieces may be very flat, which may make the production process easier.

In an embodiment of the method a foil may be attached to at least one side of the thread sections of one or more flat pieces.

In an embodiment of the method, multiple flat pieces are stacked.

In an embodiment a foil may be attached to at least one side of the thread sections.

In an embodiment, the method may comprise using one of the following production methods:

- dry layup of flat pieces, in particular hand layup,
- wet layup of flat pieces, in particular hand layup,
- filament winding,
- resin infusion, in particular vacuum infusion, resin transfer moulding (RTM), vacuum-assisted resin transfer molding (VARTM), reaction-injection moulding (RIM), Resin film infusion (RFI), open moulding,
closed moulding,
compression moulding,
injection moulding,
cast moulding,
tube rolling,
pulltrusion,
pull winding,
automated fiber placement (AFP),
automated tape laying (ATL),
centrifugal casting, or
extrusion.

Basically, the thread according to the present invention can be used in a wide variety of production methods.

In the second aspect, the present invention further relates to a composite product, manufactured with the method of manufacturing a composite product from the thread.

These and other aspects of the invention will be more readily appreciated as the same becomes better understood by reference to the following detailed description and considered in connection with the accompanying drawings in which like reference symbols designate like parts.

SHORT DESCRIPTION OF THE FIGURES

FIG. 1C shows an example of the manufacturing of another product with the ribbon according to the invention, the fibers having a fixed overlap and multiple directions.

DETAILED DESCRIPTION OF THE FIGURES

First Aspect of the Invention

Ribbon Forming Method and Device

Figure 1A:
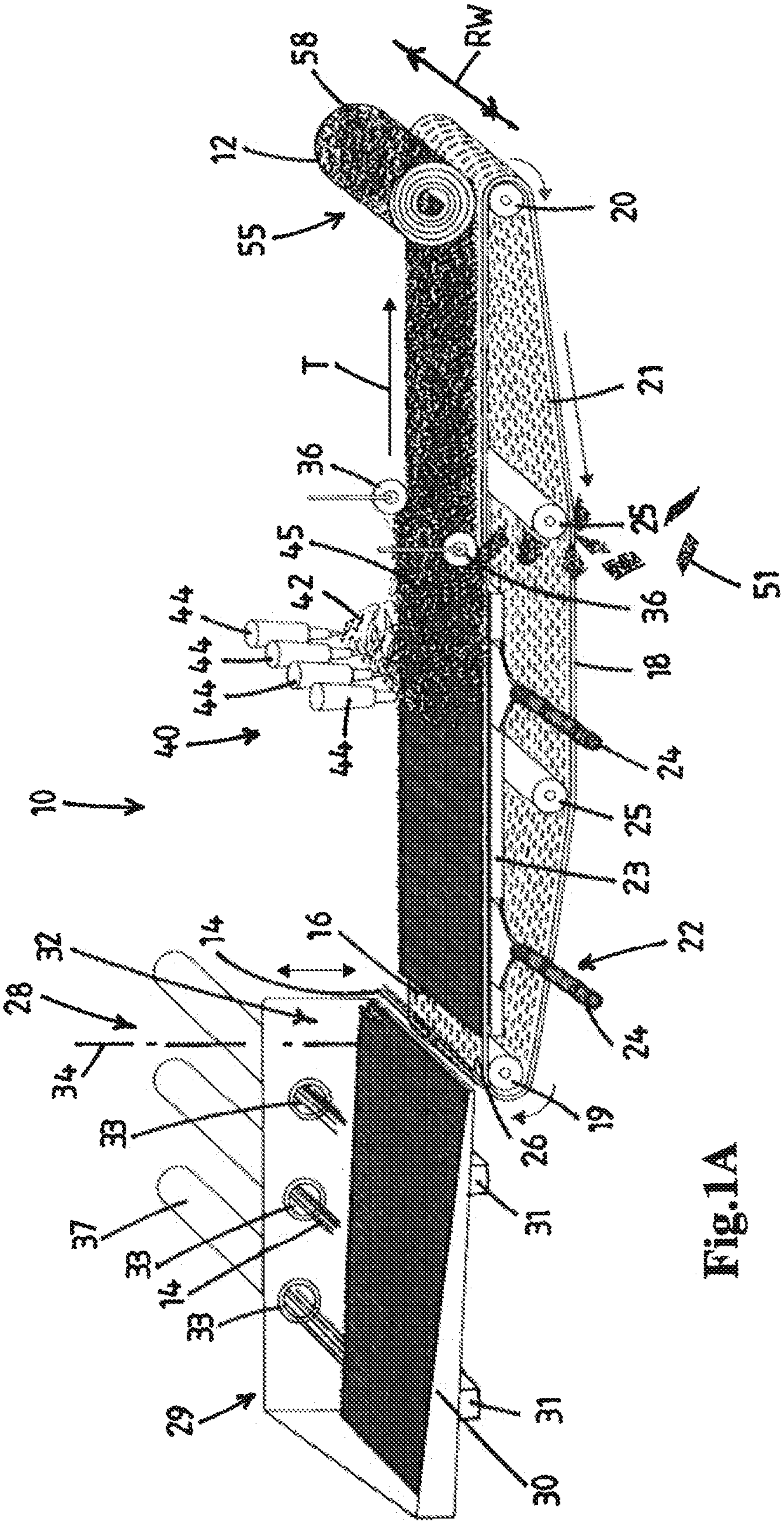
FIG. 1A shows an isometric view of a ribbon forming device according to the invention.

Turning to FIG. 1A, a ribbon forming device 10 is shown for forming a ribbon 12 comprising fibers 14 of bamboo. The fibers 14 may in particular be bamboo fibers. The ribbon 12 may have a ribbon width (Rw) of between 50 mm and 500 mm. The ribbon forming device comprises a conveyor 16 for conveying the fibers in a transport direction (T).

The conveyor 16 may comprise an endless belt 18 which is supported by an upstream roller 19 and a downstream roller 20. The belt may comprise suction holes 21, which may have any suitable shape and size. The belt 18 may be of a thermally conductive material (e.g. copper) or may comprise thermally conductive covering elements. The conveyor may comprise a suction system 22 comprising a manifold 23 positioned below the belt 18 and a suction tube 24 which is connected to a suction pump which is known per se and not considered to form part of the invention. One or more additional support rollers 25 may be present.

The conveyor 16 will typically be horizontal in the sense that it present an upwardly facing horizontal surface 26. The conveyor will typically move in a horizontal transport direction T. However, an inclined orientation of the surface and an inclined orientation of the transport direction are conceivable.

The ribbon forming device 10 comprises a depositing station 28 located at an upstream part of the conveyor 16 where the bamboo fibers 14 are deposited onto the conveyor 16. The depositing station 28 comprises a positioning device 29. In the shown embodiment, the positioning device comprises an inclined chute 30. One or more supply openings 33 at the end of respective one or more supply tubes 37 are provided for supplying the individual fibers 14 to the chute 30. The chute 30 may be provided with a controllable vibration device 31 for vibrating the chute. In this way, the fibers are spread evenly over the chute. Further the vibrating device may control the rate of discharge of the fibers 14 onto the conveyor. The chute 30 has a downstream end 32 where the fibers drop from the chute onto the conveyor 16.

The chute may be adjustable in order to position the fibers at a predefined angle relative to the transport direction, in particular at any angle between 20-90 degrees relative to the transport direction. To this end, the chute may be pivotable about a vertical pivot axis 34 located at the downstream end 32, in particular in the centre of the chute. The chute also has the function of a buffer and stores a number of fibers in order to create a constant flow of fibers onto the conveyor.

In this document, an angle of 90 degrees of the fibers 14 relative to the transport direction of the conveyor means a direction orthogonal to the transport direction T of the conveyor.

The fibers 14 may be deposited in contact with one another or may have a small gap between them, for instance a gap of between 0.1 and 0.5 mm. The fibers are deposited side by side and in an orderly manner, i.e. with the front and rear ends being aligned.

Figure 2A:
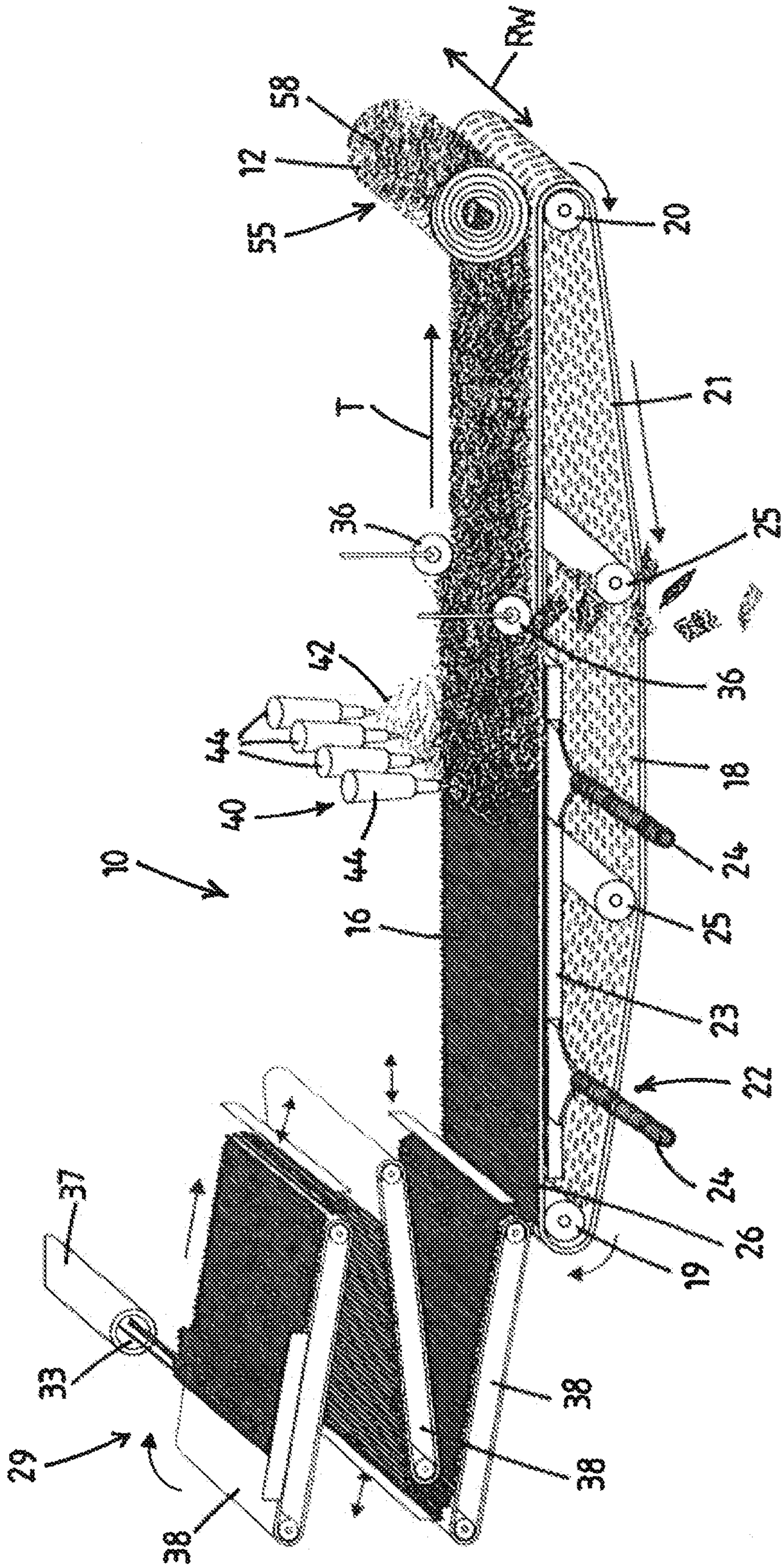
FIG. 2A shows an isometric view of yet another embodiment of a ribbon forming device according to the invention.

Turning to FIG. 2A, other ways of depositing the fibers 14 onto the conveyor 16 are also possible. In this embodiment, the positioning device comprises one or more supply conveyors 38 which may be arranged in series. The supply conveyors 38 may be driven by a controllable drive for controlling the flow of fibers 14. At the downstream end of the supply conveyors, one or more controllable vibration devices 31 may be provided for further controlling the flow of the fibers. The supply conveyors also have the function of a buffer and stores a number of fibers 14, in order to ensure a constant flow of fibers onto the conveyor 16.

Figure 1B:
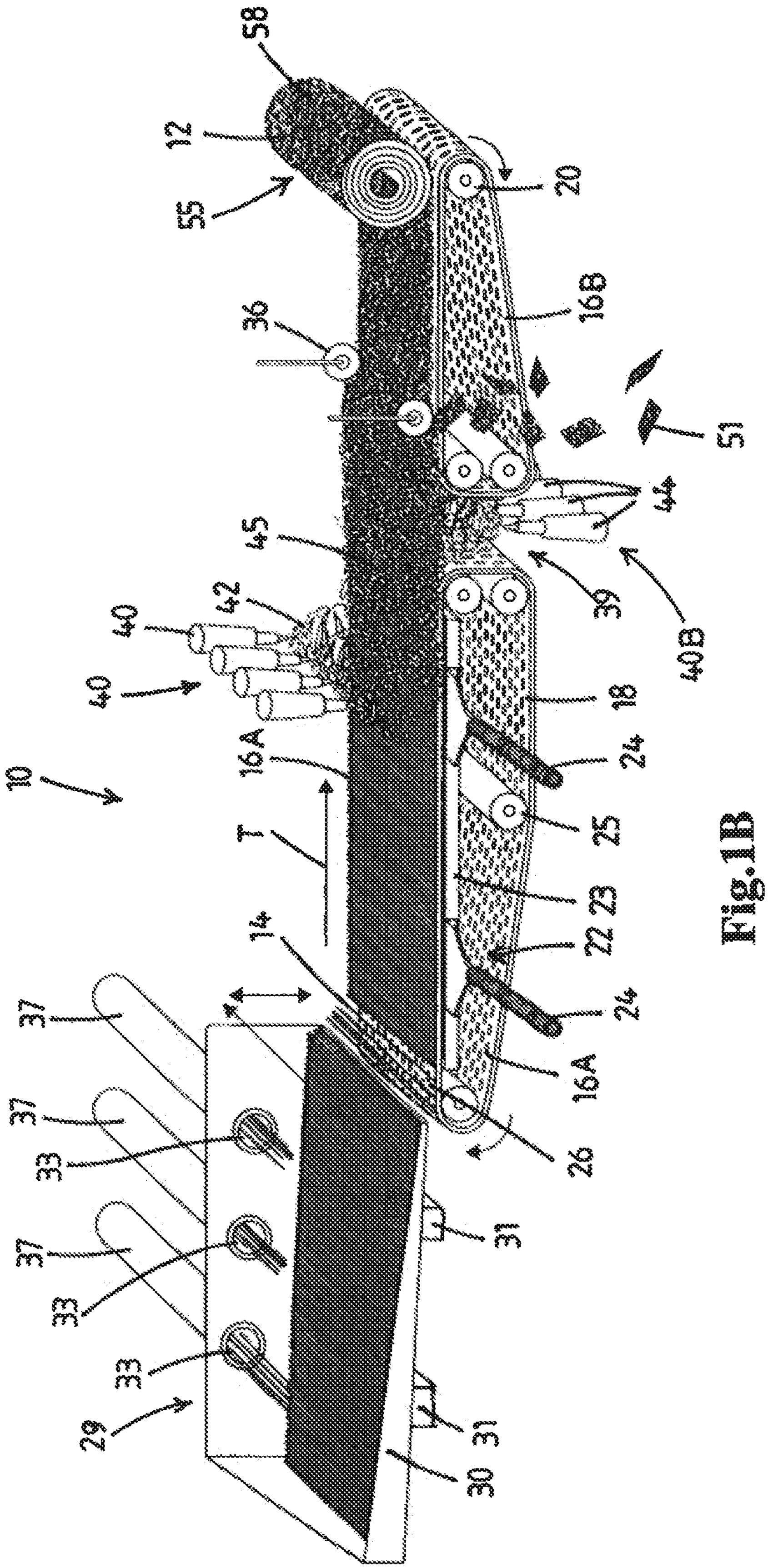
FIG. 1B shows an isometric view of another embodiment of a ribbon forming device according to the invention.
Figure 1C:
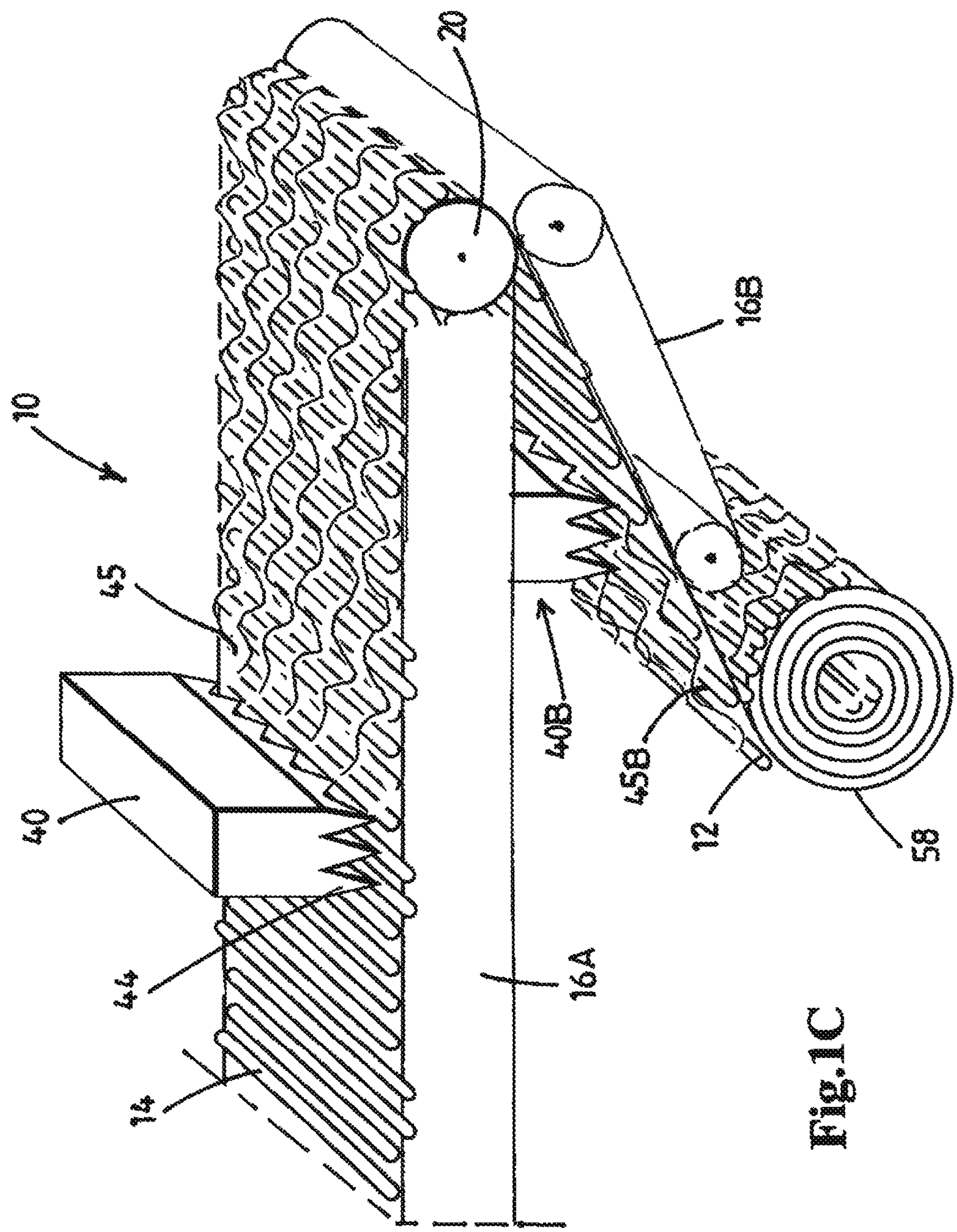
FIG. 1C shows an isometric view of a further possible embodiment of a ribbon forming device according to the invention.
Figure 1D:
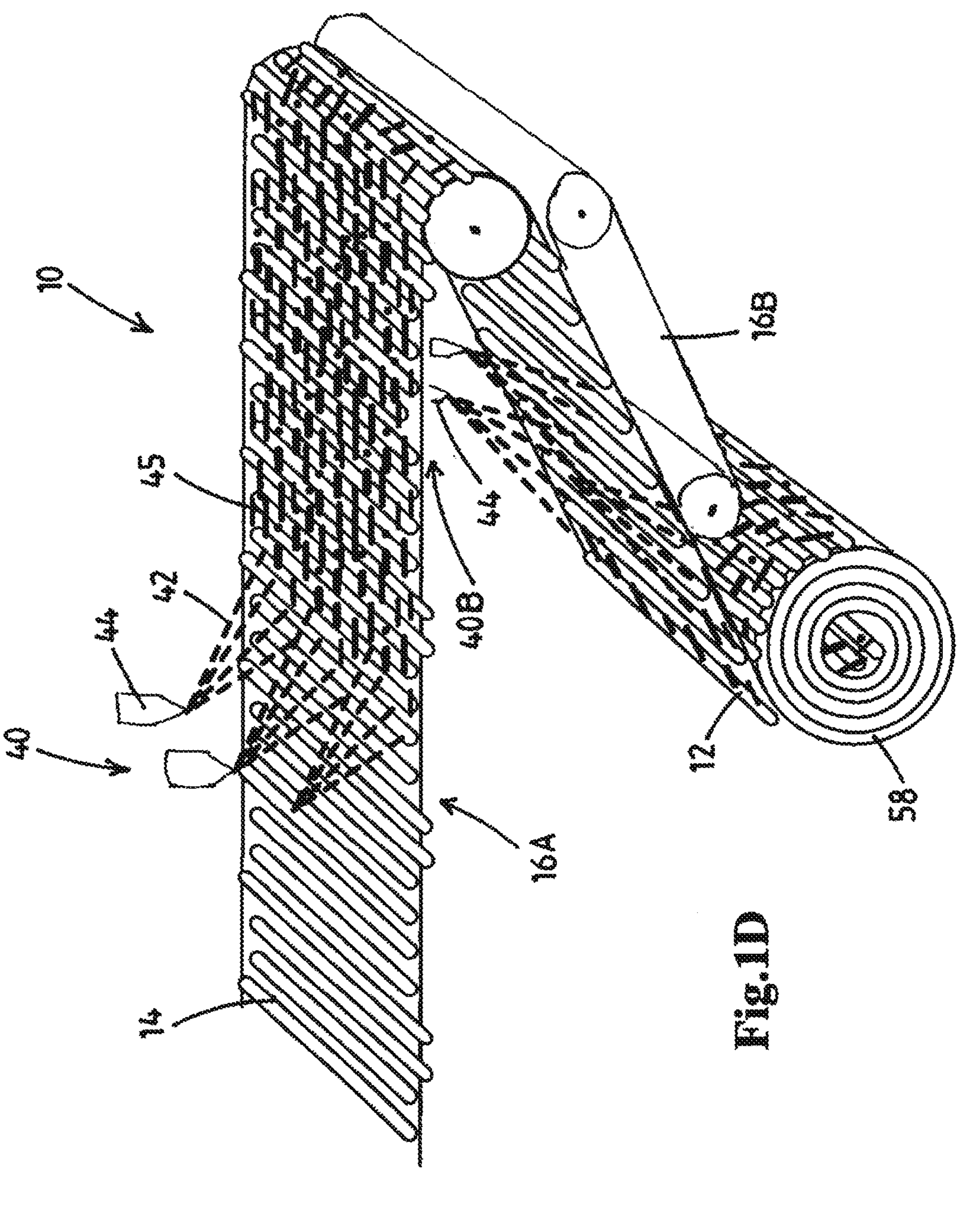
FIG. 1D shows an isometric view of yet a further possible embodiment of a ribbon forming device according to the invention.
Figure 1E:
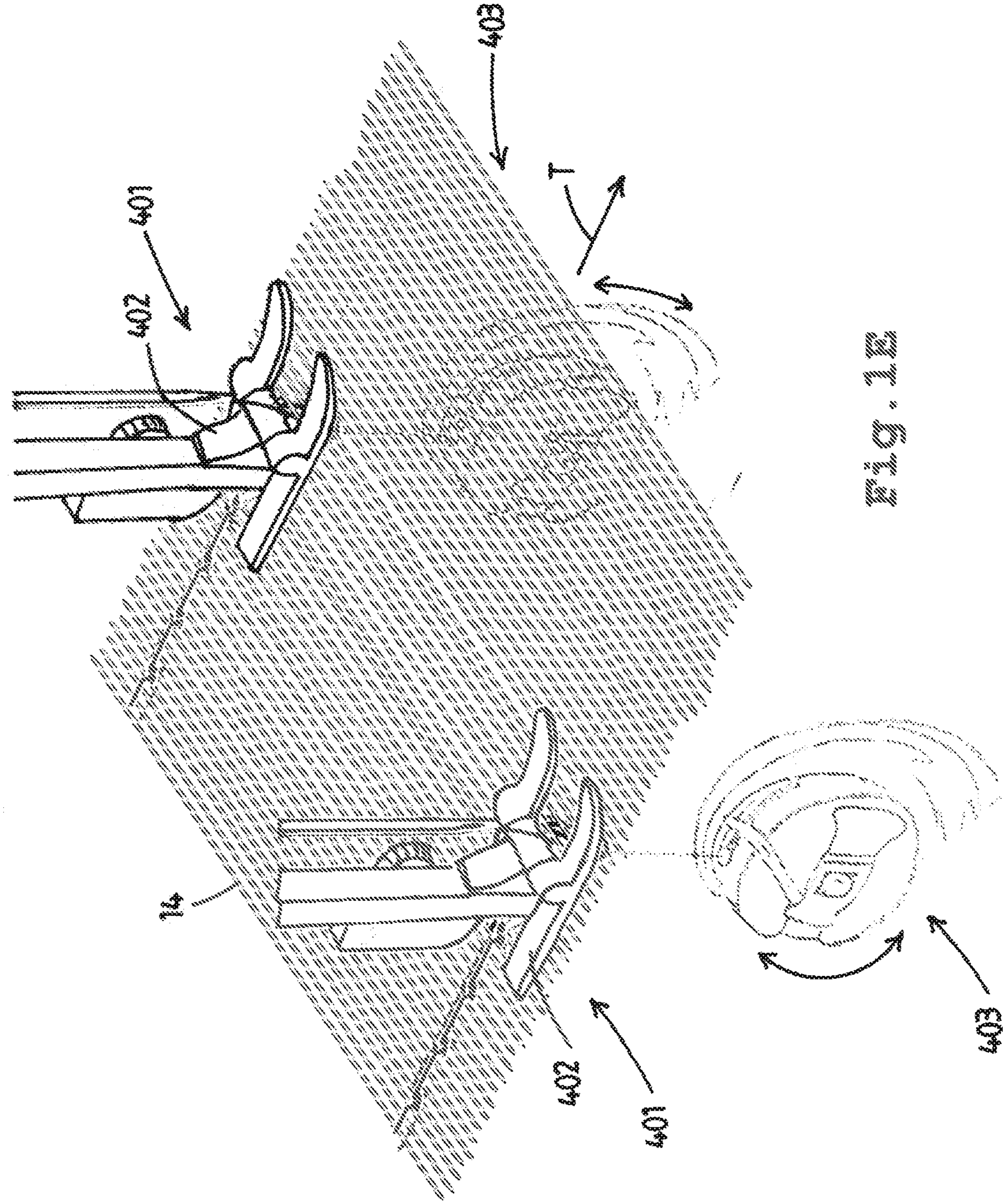
FIG. 1E shows a partial view of again a further possible embodiment of a ribbon forming device according to the invention.
Figure 2B:
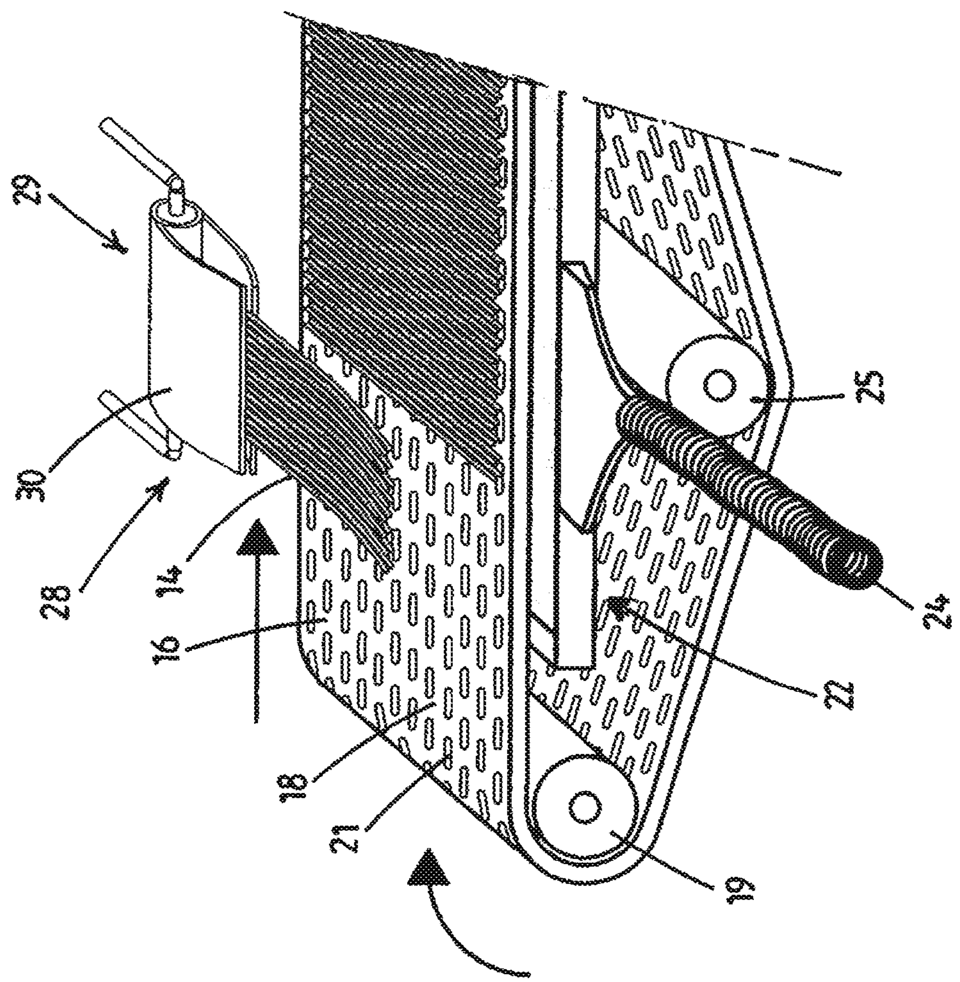
FIG. 2B shows a partial isometric view of an embodiment of a ribbon forming device according to the invention comprising a pick and place robot.

Turning to FIG. 2B, in another embodiment, instead of the chute 30 or the supply conveyor(s) 38 the positioning device 29 comprises a pick-and-place robot which is provided at the upstream part of the conveyor 16. The pick and place robot may comprise a gripper. Only a part of the conveyor is shown. It will be clear for the skilled person that the rest of the ribbon forming device may be as is shown in any of FIGS. 1A-1E.

The gripper is configured for holding a plurality of unidirectional fibers 14, for instance 5-500 fibers, in particular between 10 and 300 bamboo fibers. The gripper may position the fibers 14 as a group of unidirectional fibers onto the conveyor and at a predetermined angle of 0-90 degrees to the transport direction. 0 degrees means a direction which is parallel to the transport direction To of the conveyor. 90 degrees means a direction orthogonal to the transport direction T of the conveyor.

The gripper may be positioned on the free end of a robot arm having six degrees of freedom. Such robot arms are known in the field of the art. It may be possible to use a robot arm having less degrees of freedom, depending on the specific configuration.

With reference to FIG. 1A and FIG. 2A, in an embodiment the ribbon forming device 10 comprises a web forming device 40 positioned above the conveyor at a location downstream of the depositing station 28 for covering the fibers with thread 42 of a sticky material. The thread 42 forms a web 45 and interconnects the fibers into a ribbon. The thread typically is deposited in a curved manner and may extend in random orientations and intersects itself in multiple locations. Because the thread is sticky, it forms connections at the intersections and also adheres to the fibers 14, thereby forming the web. 24. It will be clear that when the web is formed, the stickiness will reduce significantly and generally no longer be present or only to a limited extent. In the ribbon, the stickiness well be absent or substantially reduced.

The web forming device 40 may comprise one or multiple thread forming elements 44. The thread forming elements 44 may be stationary but may also be movable, for instance in a horizontal plane (XY plane).

The thread 42 which is formed with the web forming device may be synthetic, e.g. polyamide (nylon), polyester-derivatives, polycarbonate, polyacrylonitrile, polyvinylbutyral. The thread may also be a bio-based material e.g. pullulan (starch derivative), polycaprolactone, polylactic acid, polyoxazoline, cellulose-acetate, Chitosan/chitosine, gelatine, keratine.

The web forming device 40 may in particular be an electrospinning device. Electrospinning devices are known in the field of the art and are based on a voltage difference between a nozzle from which the thread emerges and a target location (the conveyor) onto which the thread is to be deposited. The fibers may be a polymer material and may be very thin, in the order of hundreds of nanometers. The polymer is liquefied and charged. A so-called Taylor cone is formed at the nozzle. If the molecular cohesion is sufficiently high, the polymer forms a thread which dries in mid-air and travels toward the conveyor, more in particular to the fibers which lie on the conveyor. Various polymers may be used.

It was found that an electrospinning device has advantages when making a ribbon comprising bamboo fibers. In particular, the web which is formed is very open. This allows the bamboo fibers to be impregnated with resin in an easy manner. Also, the web is lightweight and relatively strong. Further the web may be flexible, and in case a gap is provided between the individual fibers, the web allows the ribbon to be compressed or expanded in a harmonica style, i.e. by curving the web and reducing or increasing the distance (or gap) between the fibers 14.

At the downstream end 55 of the conveyor, a spooling device 56 may be provided. The spooling device 56 is configured for rolling the formed ribbon 12 onto itself as a roll 58. The roll may be rolled on a bobbin or simply onto itself without a bobbin.

One or more cutting devices 36 may be provided downstream of the web forming device 40 for cutting the ribbon to a required width Rw, thereby advantageously creating straight right and left sides of the ribbon. The pieces 51 which are cut off may be used as flakes in the production of other composite products.

With reference to FIGS. 1B, 1C and 1D, it is also possible to provide a web forming device 40 on both sides of the fibers, i.e. on the top side and on the bottom side. This results in a stronger ribbon.

In the embodiment of FIG. 1B, the conveyor 16 is divided in two separate conveyors, i.e. an upstream conveyor 16A and a downstream conveyor 16B, with a gap 39 in between them. A second web forming device 40B which forms a web on the bottom side of the fibers 14 is positioned in the gap. The second web forming device is positioned at a distance downstream from the first web forming device 40. In this way, the web formed by the first web forming device 40 has hardened sufficiently and prevents the fibers 14 from falling downward though the gap 39 between the upstream and downstream conveyors.

The thread 42 which is formed in the web forming device travels upwards as a result of the difference in voltage between the thread forming elements 44 and the conveyor.

In the embodiment of FIG. 1C, the web forming device 40 comprises a number of extrusion nozzles which are configured to extrude threads therefrom. The formed ribbon 12 with a web 45 on one side is inverted at the end of the conveyor 16. A second conveyor 16B is provided underneath the conveyor to support the formed ribbon 12 in the inverted position. The formed ribbon with a web on one side is transferred from the first conveyor 16A to the second conveyor 16B during the inversion. The second conveyor 16B may be inclined or partially inclined. A second web forming device 40B may be provided above the second conveyor 16B to provide a second web 45 on the other side of the ribbon 12. Subsequently, the ribbon is rolled into a roll. The extrusion nozzles 44 may also be used in the embodiments of FIGS. 1A and 1B.

Turning to FIG. 1D, this device is largely the same as the device of FIG. 1C, but the web forming device 40 comprises a set of spray nozzles 44. The spray nozzles spray a liquid over the fibers 14. The liquid may be a thread but may also be in the form of liquid particles. The liquid thread or particles hardens on the fibers 14 and forms the web 45 which interconnects the fibers 14. In case of particles, the particles at least partially interconnect when they land on the fibers and form the web. The web 45 is formed on both sides of the ribbon, one side upstream of the inversion and the other side downstream of the inversion of the ribbon. The spray nozzles may also be used in the embodiments of FIGS. 1A and 1B.

However, a single web on one side is also possible in case of spraying or extrusion.

Turning to FIG. 1E in another embodiment, instead of a web forming device 40 one or more stitching devices 401 are used. FIG. 1E does not show the conveyor or the depositing station because these may be the same as shown in the previous examples. FIG. 1E only shows an alternative to the web forming device 40. The stitching device(s) 401 may also be used in addition to the web forming device 40. In the shown embodiment, two stitching devices 401 are used, one on the left side of the ribbon which is to be formed and one on the right side. Each stitching device 401 comprises a needle insertion device 402 above the fibers 14 and a pivotable loop forming device 403 positioned below the fibers. Stitching technology is known technology by itself, for instance for cloth as will be appreciated by the skilled person.

Method of Producing a Ribbon

In use, a method of forming a ribbon comprising bamboo fibers, may comprise positioning the fibers 14 on the conveyor 16 and conveying the fibers or fibers in the transport direction T. Next, the fibers are covered with thread 42 of a sticky material by forming the thread with the web forming device 40 which is positioned above the conveyor. The formed thread 42 drops onto the fibers 14 and forms a web 45 which interconnects the fibers into a ribbon. The fibers 14 may be aligned as unidirectional fibers on the conveyor, wherein the fibers are oriented at an angle (a) of between 0 and 90 degrees relative to a transport direction T of the conveyor.

The fibers 14 may be bamboo fibers, but may also be flax fibers or hemp fibers. The fibers 14 may have a length of between 50 mm and 700 mm. If the fibers are short (50 mm) and are oriented at an angle of for instance 30 degrees to the transport direction of the conveyor, the produced ribbon 12 may have a width of 25 mm (sinus of 30 degrees). If the ribbons are long (700 mm) and are oriented at an angle of 90 degrees to the transport direction, the ribbon may have a width of 700 mm.

In a splitting step upstream of the ribbon forming device 10, the method may comprise:

- supplying bamboo parts 72 to the bamboo splitting device 75 (discussed further below),
- splitting the bamboo parts into flat pieces 74, in particular having a thickness (T) of less than 2.5 mm, preferably less than 1 mm, more preferably between 0.3 and 0.5 mm,
- splitting the flat pieces 74 into elongate fibers 14, in particular having a width (W) of less than 2.5 mm, preferably less than 1 mm, more preferably between 0.3 and 0.5 mm, and
- positioning the fibers 14 onto the conveyor 16.

The fibers 14 may be maintained in position on the conveyor 16 by applying suction via the suction holes.

The formed ribbon may be rolled onto itself as a roll, with or without a bobbin.

Figure 18:
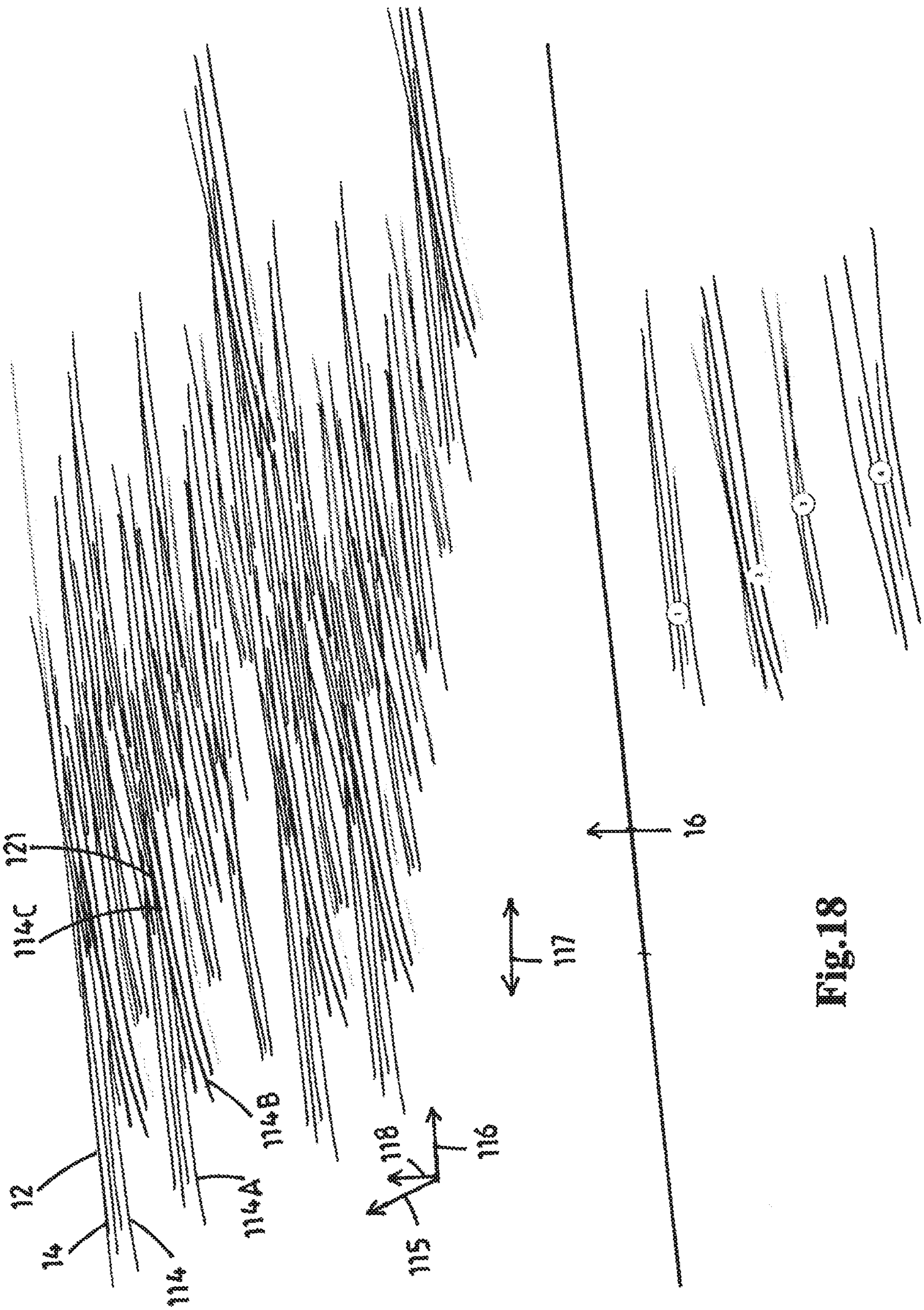
FIG. 18 shows an isometric view of variant of the ribbon.

Turning to FIG. 18, this figure shows a variant of the ribbon, but also shows the arrangement in which the fibers may be deposited on the conveyor 16. Since the arrangement of the fibers on the conveyor results in a same arrangement of the fibers in the ribbon, this can be shown in a single figure. In this variant the ribbon comprises unidirectional fibers 14 which are oriented along the main direction of the ribbon 12. The fibers are arranged in unidirectional bundles 114. Each bundle 114 may comprise fibers 14 having a same length and of which the opposite ends of the fibers are also aligned with one another.

In top view, the bundles 114 are arranged in a staggered manner. In a transverse direction 115 of the ribbon, consecutive (i.e. adjoining) bundles 114 are staggered relative to one another in the main direction 116 of the ribbon 12. In other words, one bundle 114A is offset over a staggering distance 117 along the main direction relative to an adjoining bundle 114B.

Furthermore, the bundles 114 may partially overlap one another. In the main direction, one bundle 114C is partially laid on top of another bundle 114A. A next bundle (in the main direction) partially overlaps the bundle 114C. In this way, regions of overlap 121 are created between the bundles and between the fibers. Hence, the staggered configuration may occur both in the transverse direction 115 and in a vertical direction 118 of the ribbon. This results in a relatively strong ribbon which can effectively be used for producing composite products.

The depositing station 28 may be configured for carrying out the deposition of bundles of fibers on the conveyor 16 in the manner as described above. A robot arm with a gripper may be a suitable device for depositing the fibers in this way, but other methods are readily conceivable on the basis of the chute as disclosed herein.

Alternatively, the depositing station may deposit individual fibers 14 instead of bundles which are aligned with the main direction 116 of the ribbon in a staggered manner. The staggered configuration would be the same both in the transverse direction 115 and the vertical direction 116, but instead of staggered bundles 114 individual fibers 15 would be staggered, both on the conveyor and in the ribbon.

The individual fibers 14 in each bundle may have gaps between them, i.e. they may not be arranged very dense. This allows the web forming device 40 to—in the regions of overlap 121—form the web 45 on one bundle 114C, wherein the web connects the bundle 114C to the bundle 114A which is (partially) underneath it. This creates a ribbon which is strong enough to be processed in further steps. Instead of for bundles this method may also be used with individual fibers which partially overlap one another.

The web forming device also interconnects the adjoining bundles or individual ribbons in the transverse direction 115.

Multiple staggering arrangements are possible similar to the arrangement of bricks in a brick wall. For instance the staggering distance 117 may be one half of the length of the fibers, or more, or less. The staggering distance may the same throughout the ribbon or may vary over the width or length of the ribbon.

Alternative Embodiments for Forming a Ribbon Comprising Bamboo Fibers—I

Figure 3:
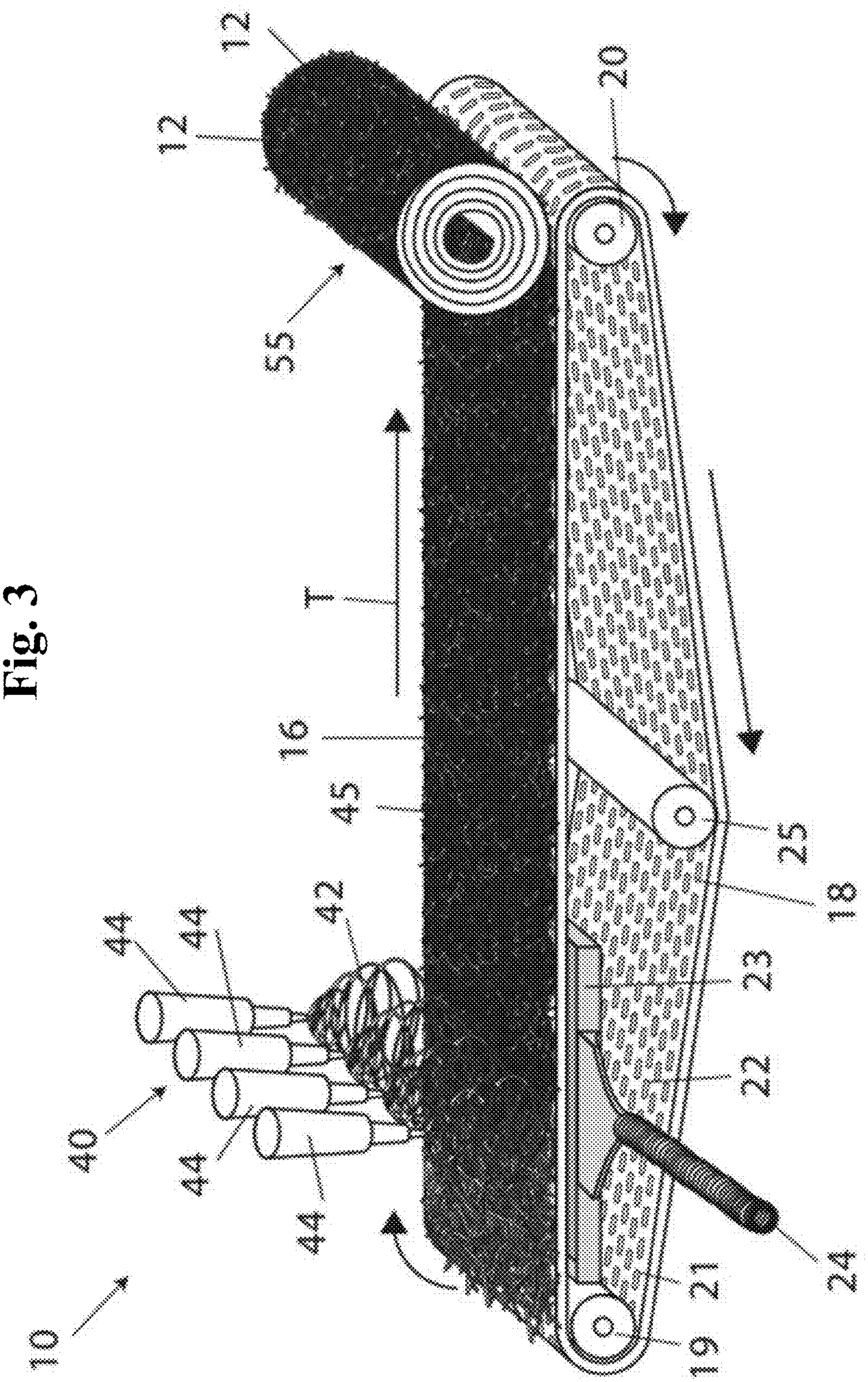
FIG. 3 shows an isometric view of a further embodiment of a ribbon forming device according to the invention.

Turning to FIG. 3, in an alternative embodiment the depositing station 28 may be configured for depositing non-aligned fibers 14 onto the conveyor. Such fibers may for instance be bamboo fibers, flax fibers or hemp fibers. They may have a random direction, sometimes indicated as non-woven in the field of the art. The web forming device 40 forms a web on the non-aligned bamboo fibers in a same fashion as explained in relation to FIGS. 1A, 1B and 2. The fibers may be deposited on the conveyor 16 with a chute or with a hopper or with one or more conveyors according to the embodiment of FIG. 2.

The web forming device 40 may be an electrospinning device.

The ribbon 12 which is formed will comprise bamboo fibers have random orientations.

The ribbon 12 which is formed may be broader than the ribbon for unidirectional fibers, and may have a width of up to 2000 mm, perhaps even 3000 mm.

Figure 4:
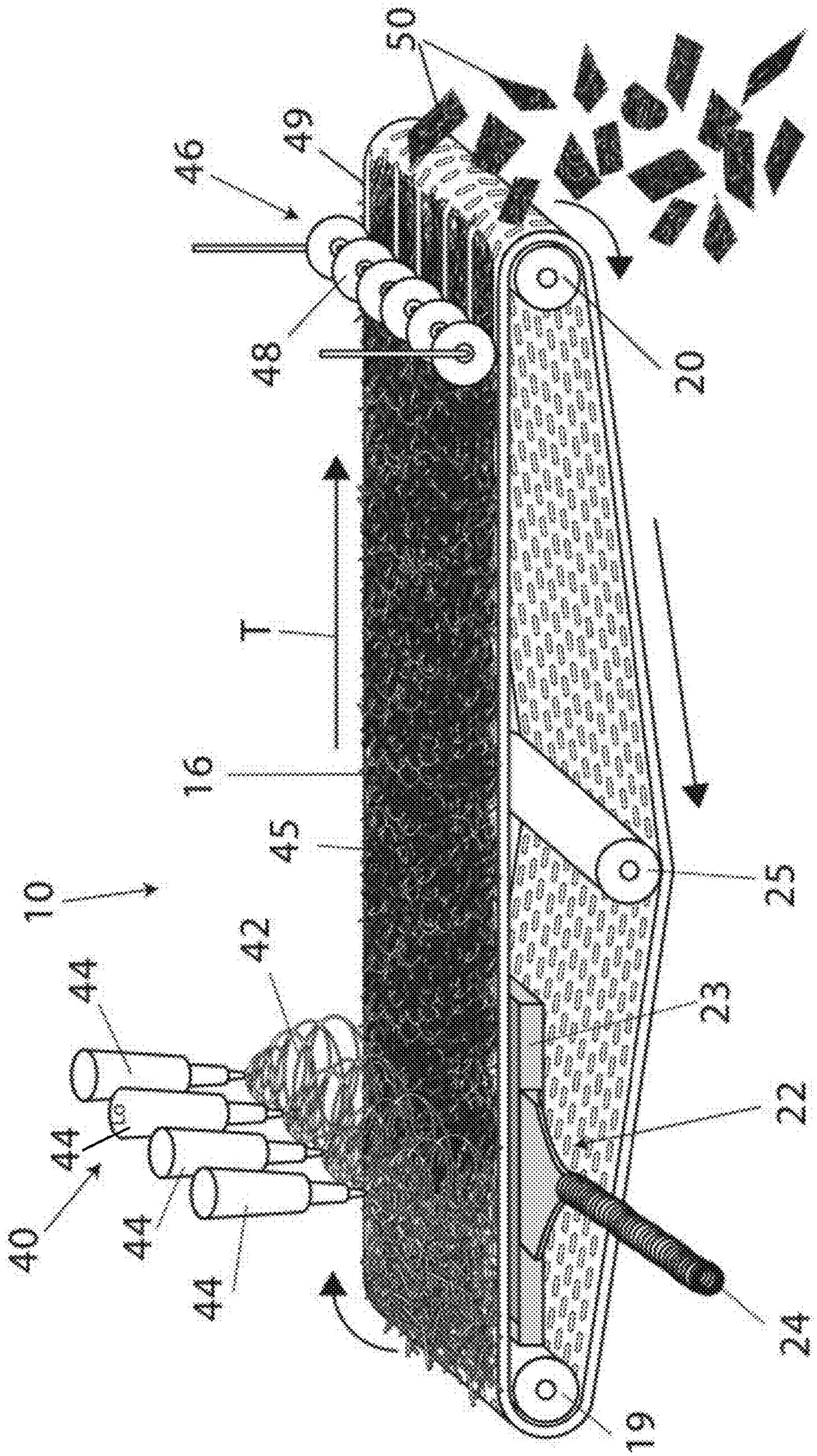
FIG. 4 shows an isometric view of again another embodiment of a flake forming device according to the invention.

Turning to FIG. 4, in yet another embodiment, the device further comprising a flake cutting station 46 positioned downstream of the web forming device. In this embodiment, the web forming device 40 may also be an electrospinning device. The flake cutting station may be configured for cutting the formed ribbon into flakes 50. The flakes may for instance have a length and width of between 5 mm and 200 mm. The flake cutting station may comprise cutting knives 48 for cutting the formed ribbon into longitudinal strips 49. The cutting knives may be rotary knives.

Additionally, the flake cutting station may comprise one or more transverse cutting knives 50 for cutting the strips 49 into flakes. The transverse cutting knives may be positioned downstream of the cutting knives 49. The transverse cutting knife or knives may be a rotary knife which travels in a transverse direction across the conveyor or may be a knife or multiple knives, in particular a long knife or long knives, which moves or move downward onto the conveyor and subsequently upwards in a reciprocal cutting motion. Other ways of cutting the ribbon into flakes 50 are also possible, for instance with a shredder or puncher.

The flakes may have a square, rectangular, general polygon, circular or oval shape or have any other suitable shape. The flakes 50 may drop from the downstream end of the conveyor into a collecting device, e.g. a tray or bag. The flakes 50 which are formed will have bamboo fibers having random orientations.

The flakes 50 were found to be very suitable for producing fiber reinforced products in a further downstream process.

Figure 16:
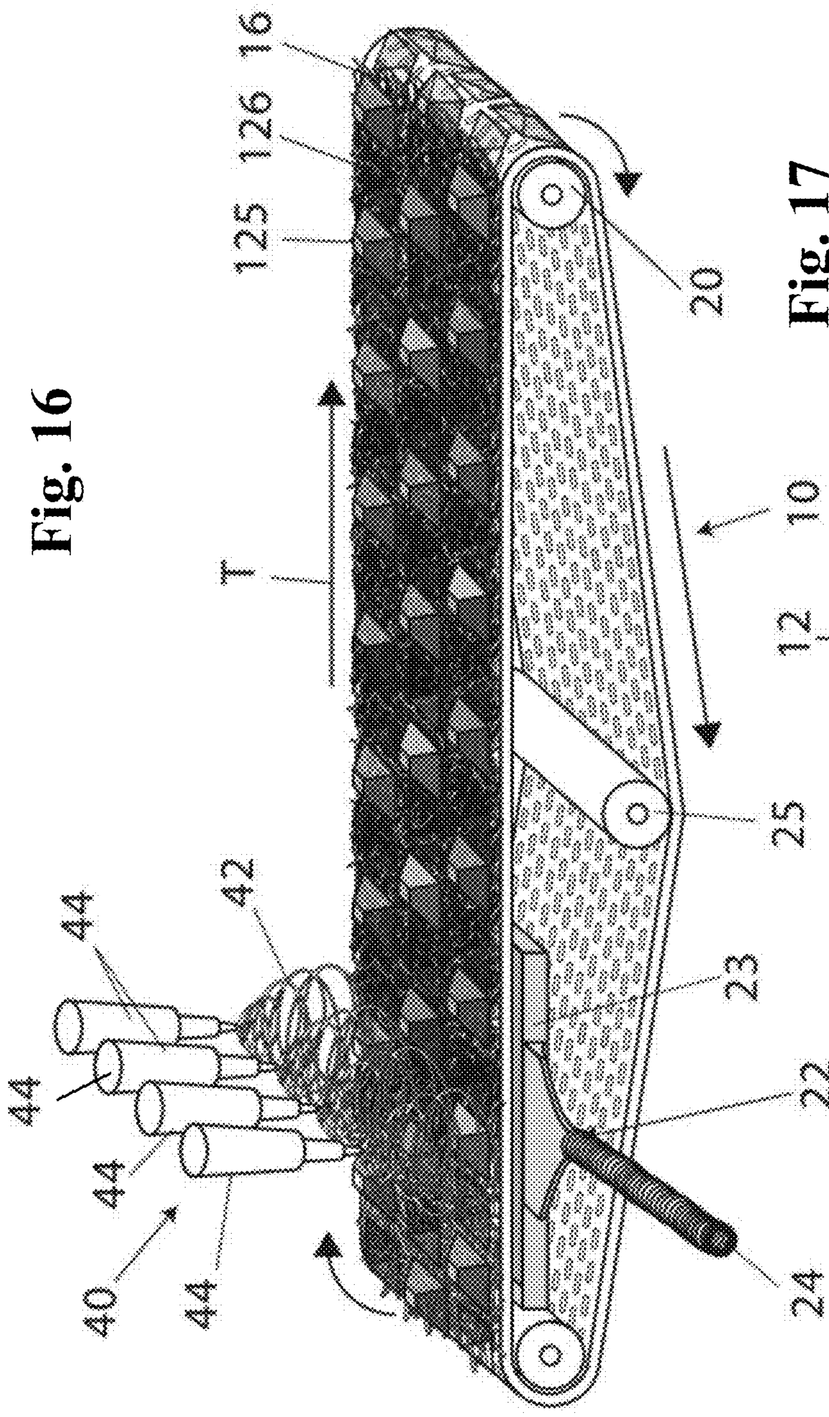
FIG. 16 shows an isometric view of another embodiment of a ribbon forming device according to the present invention.
Figure 17:
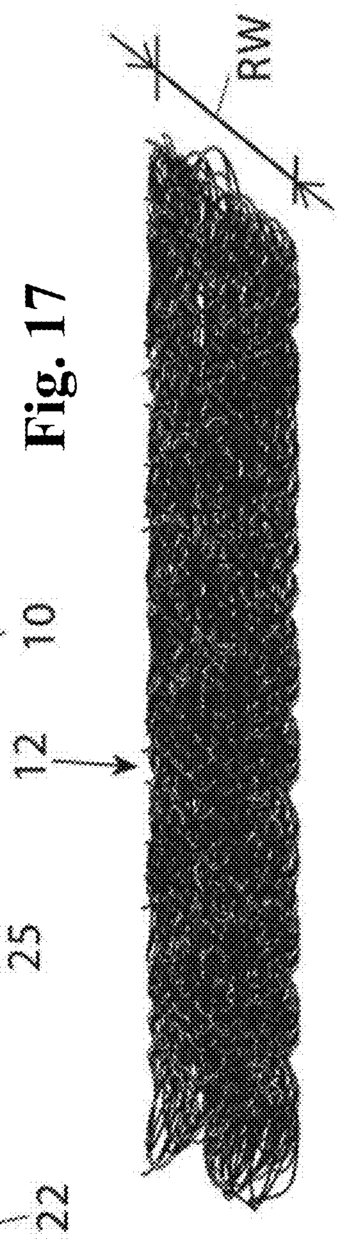
FIG. 17 shows an isometric view of a 3 dimensional preformed ribbon, formed with the device of FIG. 16.

Turning to FIGS. 16 and 17, a further embodiment of the ribbon forming device 10 is shown. The conveyor 16 comprises a belt 18 having projections 125 and/or indentations 126. The ribbon 12 which is formed will be formed with corresponding projections 125 or indentations 126. The projections or indentations may have a shape which is determined by the required shape of the end product, i.e. the composite product which is to be formed. More in general, the conveyor had a 3D shape in order to create a 3D ribbon 12.

It is possible to position 3D metal moulds, or any other material plated with a conductive layer, on the conveyer 16. These moulds can be covered with bamboo fibers or flakes made of bamboo ribbon by simply dropping them onto the surface. By applying an electric charge on the flakes and an opposite charge on the moulds the flakes will be electrostatically attracted by the mould's surface and form an even layer on its surface. When this layer of fibers 14 or flakes 50 is covered by an electrospinned web, the fibers or flakes will form a cohesive shape. This shape can be solidified by applying extra electro spun layers or by spraying or brushing a resin over its surface. The shape can also be inserted into a mould to inject a resin or a thermo-plast against its surface.

In order to achieve a uniform layer on the horizontal surfaces, vertical surfaces and inclined surfaces on the conveyor 16, the electrospinning yarn can be applied by controllably moving the spinning nozzle in a 2D or 3D motion around the shape, e.g. by a robot-arm.

In order to maintain the fibers or flakes firmly in position on the mould, the total force can be increased by providing small suction holes in the moulds in the way this is usually done in vacuum forming moulds. In this way, the fibers or flakes are held in place by both an electrostatic force and by a suction force.

After the forming of the ribbon 12, the ribbon 12 may be cut into flakes 50, wherein one flake 50 comprises a single projection and/or a single indentation, or multiple projections and/or multiple indentations. It is noted that the ribbon 12 may also be formed by dropping flakes onto the conveyor. In other words, the ribbon 12 may be formed by flakes and later cut be cut into flakes again.

Subsequently in the forming of the product, multiple flakes having a same projections or indentation may be stacked and impregnated with resin. This may be carried out in a mould or on a mandrel or without a mould or mandrel. In this way, a strong fibre reinforced product having multiple layers of flakes 50 may be created.

It will be clear that the projections or indentations may have different sizes and/or shapes.

Figure 61:
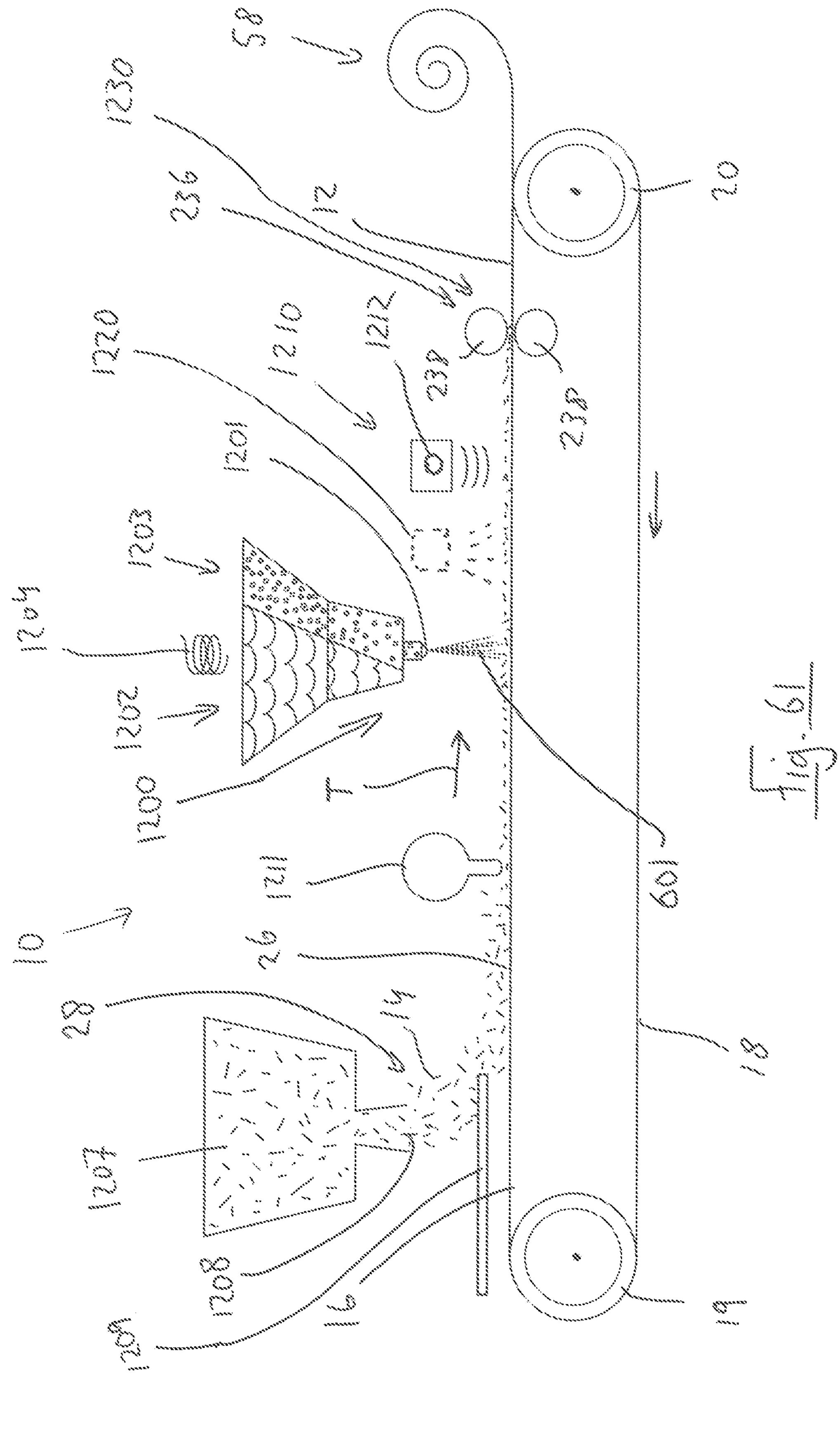
FIG. 61 shows a schematic view of yet another embodiment of a device for manufacturing a ribbon comprising bamboo fibers.

Further Alternative Embodiments for Forming a Ribbon Comprising Bamboo Fibers—II Turning to FIG. 61, in another embodiment, the device 10 for producing a ribbon comprises a depositing station 28 for depositing the fibers 14 onto a conveyor belt 18 of a conveyor 16. The conveyor belt may be endless and move in a horizontal or substantially horizontal transport direction T.

The depositing station 28 may comprises a fiber hopper 1207 having a fiber opening 1208 at a lower end. Under the opening, a spreader device 1209 may be positioned. The spreader device may be positioned at a distance above the conveyor belt and may have the form of a plate or other structure onto which the fibers 14 drop. The fibers may bounce off the spreader device 1209 and may be subsequently spread over the conveyor belt. When viewed from above, the depositing station 28 is configured to deposit the fibers in a random orientation.

The fibers 14 may have a length of 1-4 cm, in particular 2-3 cm.

The fibers may have a diameter of 200-400 μm.

The device 10 of FIG. 61 may be primarily suitable for producing a ribbon 12 comprising bamboo fibers. However, other kinds of fibers, in particular natural fibers, may also be used in the ribbon 12.

A further, separate spreading station 1211 may be positioned downstream from the lower opening and downstream from the first spreader device 1209. This spreader station may comprise a comb-like structure, a plate, a brush or a different kind of suitable structure. The spreading station may in particular be configured for spreading the fibers 14 over the width of the conveyor belt and ensuring that the thickness of the layer of fibers becomes uniform.

The device 10 for producing a ribbon comprises a resin application station 1200 which comprises a hopper 1202 for a meltable or curable resin in the form of powder or small particles. The particles may in particular be smaller than 1 cm. Basically, any thermoplastic or thermosetting resin may be used.

Alternatively or additionally, the resin application station 1200 may comprise a container 1203 for a liquid resin and one or more application nozzles 1201 configured for applying the liquid resin onto the fibers, in particular bamboo fibers. The container 1203 or the hopper 1202 may be heated with a resin heating device 1204. The liquid resin may in particular be curable, for instance with UV light.

The device 10 for producing a ribbon may comprise a curing station 1210. The curing station is positioned downstream from the resin application station 1200. The curing station 1210 may comprise a UV-lamp 1212 for radiating UV-light onto the curable resin. As a result the resin hardens and interconnects the fibres into a ribbon.

Curing with UV light has a number of advantages. It is quite fast and allows good control of a degree of the openness (or closedness) of the formed thread or ribbon. If in a processing step further downstream additional resin needs to enter the produced ribbon, it may be better to keep the ribbon or thread relatively open. If this is not required and for instance the ribbon needs to be used in wet conditions, it may be better to keep the ribbon or thread as closed as possible, in order to prevent ingress of water into the bamboo fibers. This could cause swelling which is undesirable. Curing with UV-light provides this advantage.

Curing with UV light has a further advantage in that it provides a ribbon or thread having a a relatively high strength.

If the resin is a liquid resin, in case a suitable UV-lamp 1212 is used, no additional heating in a heating station 1210 is required. If the resin is a solid resin in powder form or in the form of somewhat large, but still relatively small particles (e.g. smaller than 1 cm), an extra heating station 1220 may be positioned upstream of the curing station 1210 for heating the resin, thereby melting the resin and causing the resin to flow between the fibers 14. The heating station 1220 may be based on radiation or convection or both. Subsequently, the liquefied resin may be cured with UV-light in the curing station 1210.

The resin may also be a thermoplastic or thermosetting resin which hardens by itself and does not need a heating station 1220 or a curing station 1212.

After the curing (or hardening) of the resin, a compression device 236 may compress the formed ribbon 12 in a compression station 1230. As a result of the compression, the formed ribbon becomes more compact and the resin makes better contact with the fibers 14. may become stronger. Downstream of the compression the ribbon may be spooled onto a spool 58.

Alternatively, the compression station 1230 may be integrated with the curing station 1210. In this case the compression and curing device may comprises a pair of rollers or tracks which are pressed against one another and which have one or more UV-lamps inside them. This is quite similar to the embodiment of FIG. 60, but in this case the rollers do not have a groove. This allows the production of a flat ribbon 12 having a thickness which is uniform over the width of the ribbon 12.

In the embodiment of FIG. 61, the compression device 236 comprises an upper roller 238 or upper track positioned above the conveyor belt 18 of the conveyor 16 and a lower roller or lower track positioned below the conveyor belt 18 of the conveyor 16.

The conveyor belt 18 and the ribbon 12 formed on the conveyor belt may for instance have width of 10 cm-2 meter.

Figure 62:
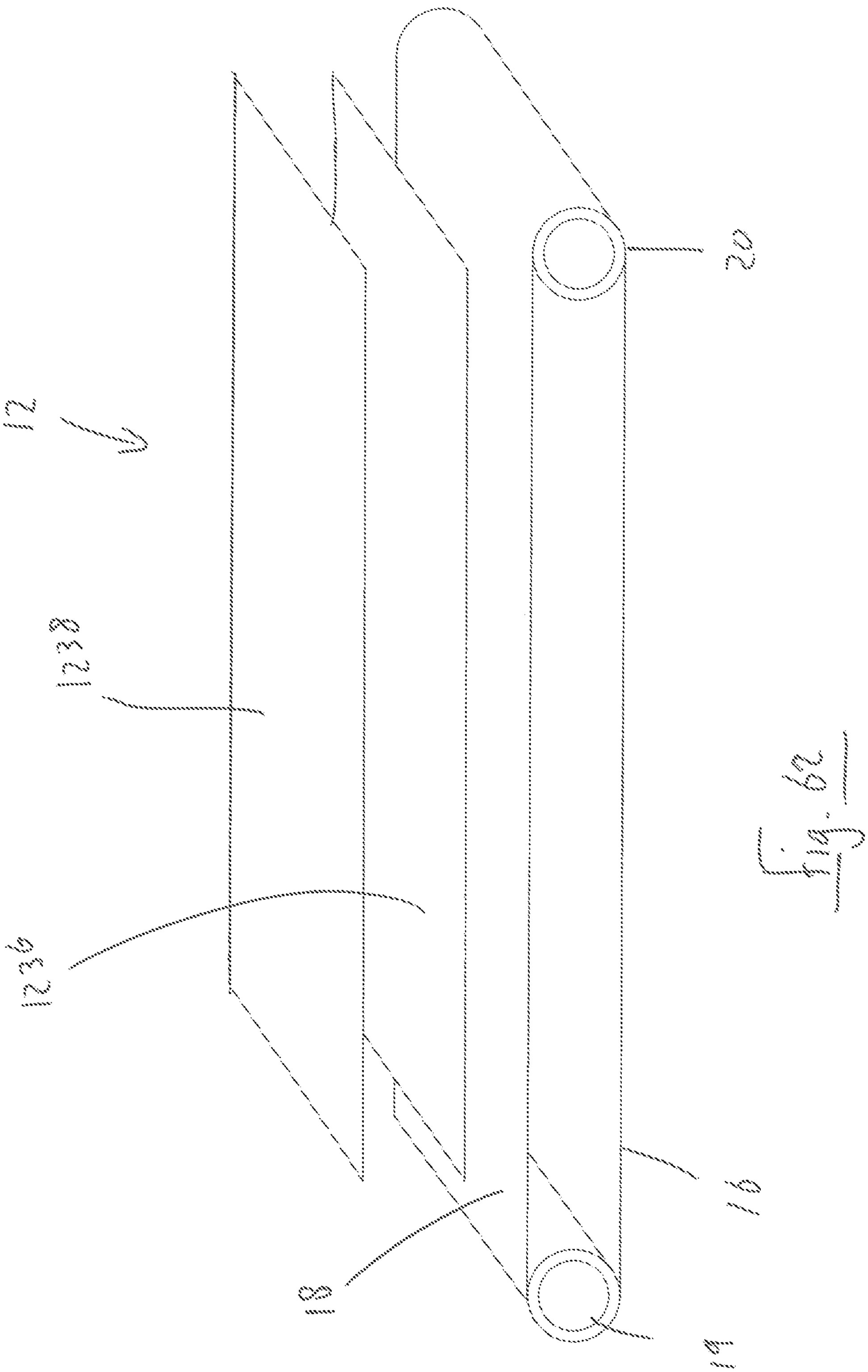
FIG. 62 shows a schematic view of the layers of the ribbon.

Turning to FIG. 62, a schematic view of the ribbon produced with the embodiment of FIG. 61 is provided. The ribbon comprises a layer 1236 of fibers and a layer 1238 of resin.

Figure 63:
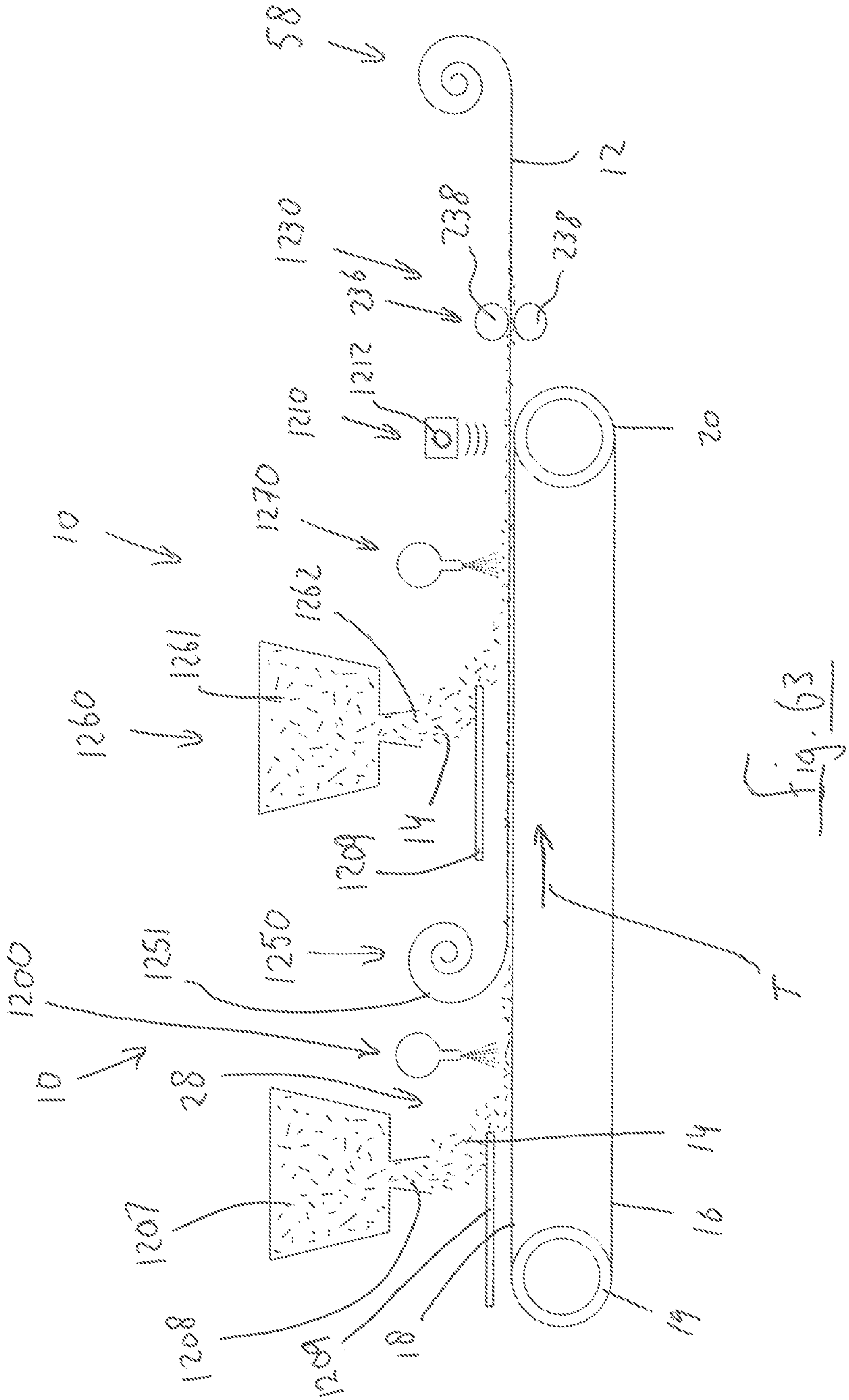
FIG. 63 shows a schematic view of another embodiment of a device for manufacturing a ribbon comprising bamboo fibers.

Turning to FIG. 63, in a further embodiment, the device 10 for producing a ribbon comprises a carrier station 1250 configured for depositing a carrier material, in particular a sheet 1251 of carrier material, on the fibers 14. The carrier material may be unspoiled from a spool and is deposited downstream from the depositing station 28. The carrier material provides strength to the formed ribbon and allows better handling of the formed ribbon in further processing steps, in particular during the manufacturing of a product with the produced ribbon 12.

The carrier station 1250 is located downstream from the resin application station 1200.

It is noted that in an alternative embodiment the fibers 14 may alternatively or additionally be covered with thread 42 (e.g. formed by electro-spinning) or with particles of a sticky material. In such an embodiment, the carrier station is located downstream from the location where the fibers are covered with thread (42) and/or covered with particles of a sticky material.

The device 10 further comprises a downstream fiber depositing station 1260 configured for providing a second layer of fibers onto the carrier material 1251. The downstream fiber depositing station is located downstream from the carrier station.

The device 10 further comprises a downstream resin application station 1270 for applying a second layer of solid or liquid resin onto the second layer of fibers. The downstream resin application station 1270 may be positioned downstream from the carrier station and downstream of the downstream fiber depositing station 1260. Instead of a downstream resin application station 1270 or in addition to a downstream resin application station 1270, a downstream web forming device for applying a second layer of thread (42) or particles of a sticky material may be provided.

Figure 64:
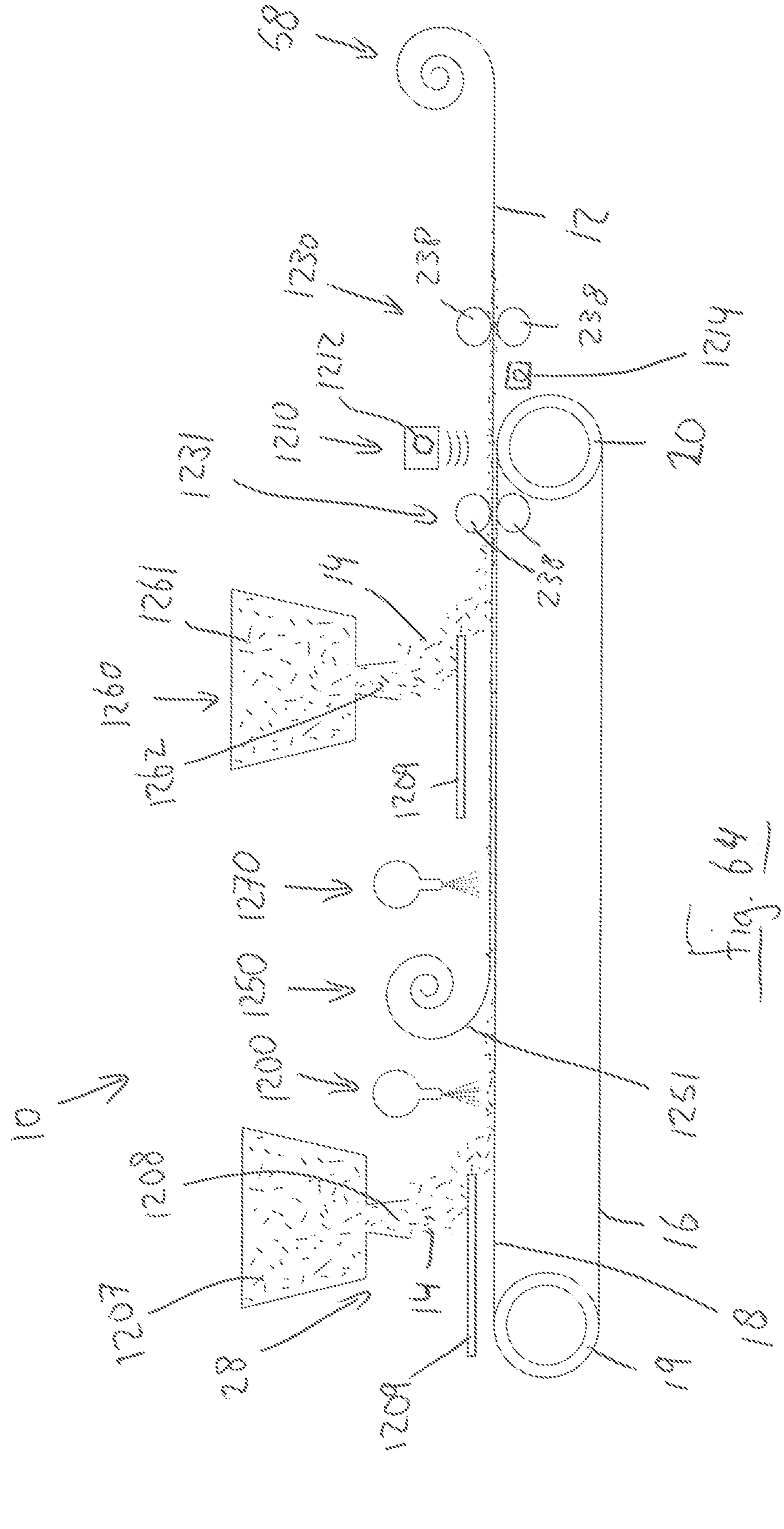
FIG. 64 shows a schematic view of yet another embodiment of a device for manufacturing a ribbon comprising bamboo fibers.

Turning to FIG. 64, the downstream resin application station 1270 (or the downstream web forming device) may also be located upstream of the downstream fiber depositing station 1260 and downstream from the carrier station 1250.

The fibers 14 from the downstream fiber depositing station 1260 are deposited on the resin which has been supplied by the downstream resin application station 1270. Subsequently, the fibers 14 which were deposited by the downstream fiber depositing station 1260 are pressed into the resin by a first compression device 1231. The first compression device may comprise two rollers 238 or tracks on either side of the conveyor belt 18 which are pressed against one another.

The curing station 1210 may be provided downstream from the first compression device. The curing station may comprise a second curing unit 1214 which is positioned below the ribbon 12, for instance beyond the downstream end of the conveyor 16. This may allow curing of the resin layer which was applied by the first resin application station 1200, in particular in case the carrier layer does not let sufficient UV-light through.

A second compression device 1230 is provided downstream from the curing station 1210. The second compression station further compresses the formed ribbon 12 and improves the contact between the fibers 14 and the resin on both sides of the carrier layer.

The resin may have a melting temperature which is lower than the melting temperature of the carrier material, in particular at least 20 degrees Celsius lower, more in particular at least 40 degrees lower than the melting temperature of the carrier material. This advantageously makes it possible to melt the resin layers without melting the carrier material. This allows a more effective production of products with the ribbon 12.

The carrier material may have a melting temperature of at least 200 degrees. The resin may have a melting temperature of less than 160 degrees, more in particular less than 105 degrees.

The carrier material may for instance be PA6.

Figure 65:
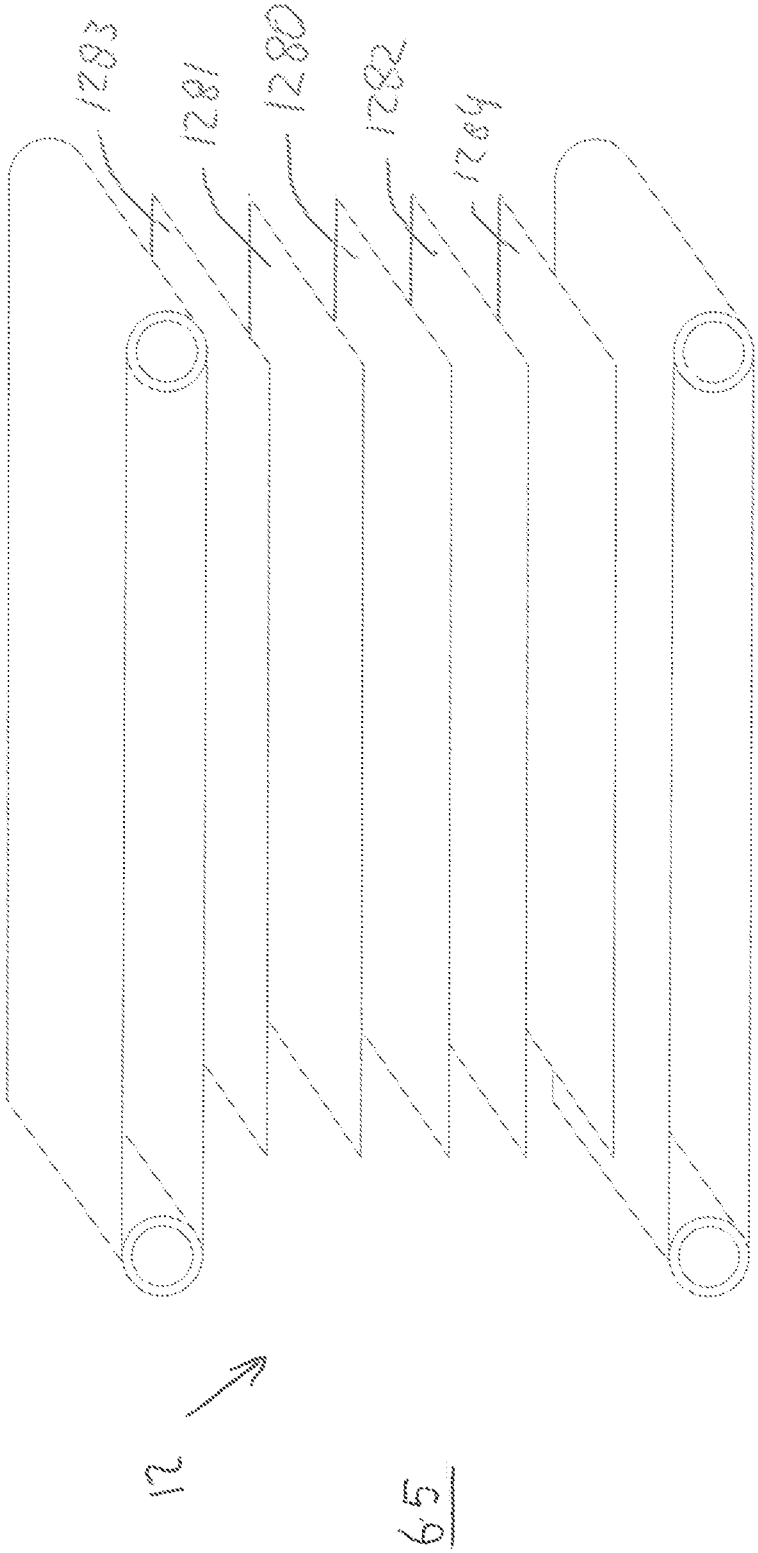
FIG. 65 shows a schematic view of the layers of the ribbon manufactured with the device of FIG. 64.

Turning to FIG. 65, the ribbon 12 formed with the device 10 according to FIG. 63 has a central layer 1280 of the carrier material 1251. A resin layer 1281 is provided on the upper side of the central layer 1280 and a resin layer 1282 is provided on the lower side of the central layer. An upper fiber layer 1283 is provided on the upper side of the upper resin layer 1281 and a lower fiber layer 1284 is provided on the lower side of the lower resin layer 1282. The respective fiber layers and the associated resin layers will be intermixed to a large extent.

Figure 66:
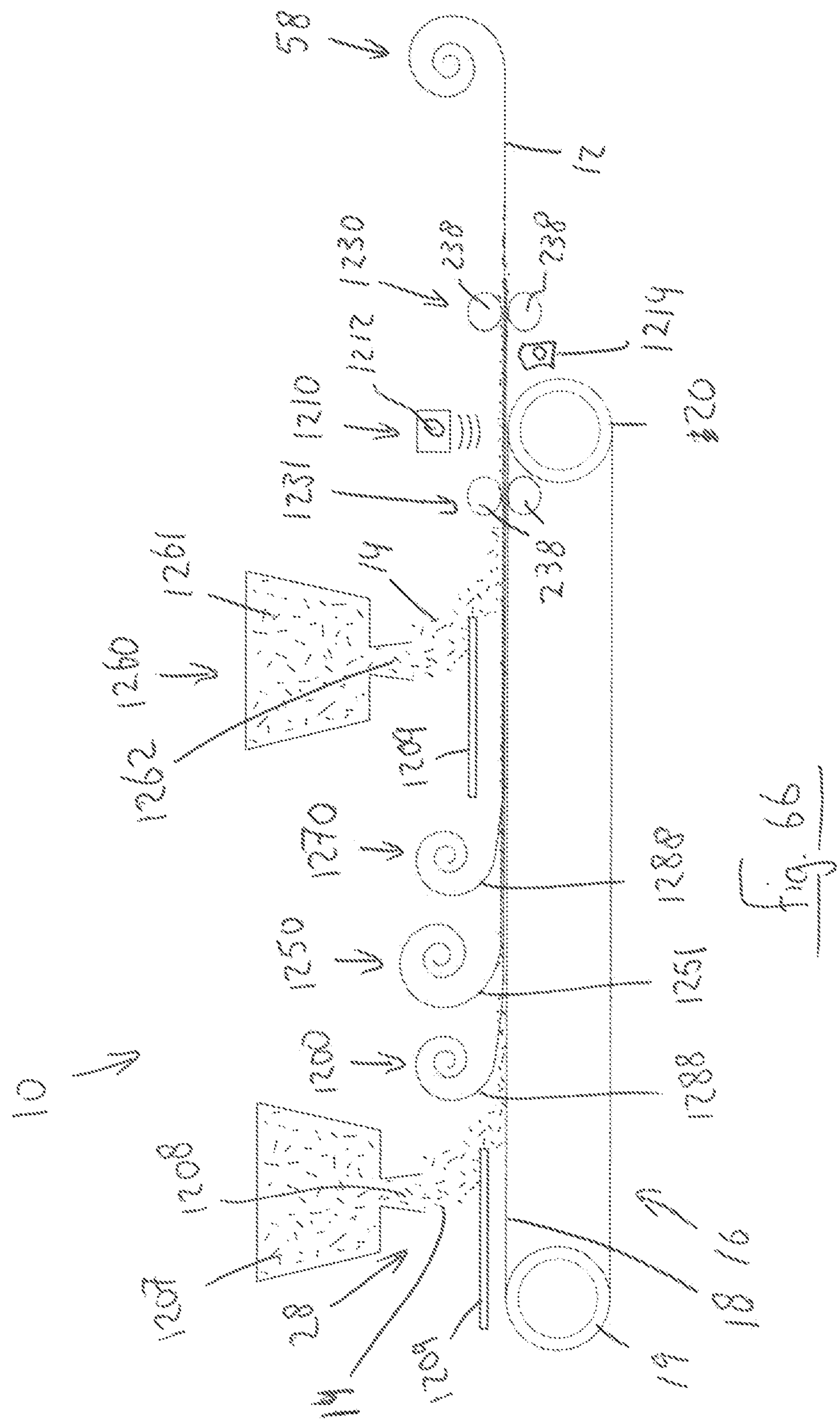
FIG. 66 shows a schematic view of yet another embodiment of a device for manufacturing a ribbon comprising bamboo fibers.

Turning to FIG. 66, in a further embodiment of the device 10 for producing a ribbon 12, the resin application station 1200 and the downstream resin application station 1270 are configured for providing the resin in the form of sheet material 1288, for instance by unspooling the sheet material 1288 from a spool 1289. This may be a practical embodiment in which the amount of resin can be controlled quite well. Also the distribution of the resin over the surface area on the conveyor belt 18 can be controlled quite well.

Operational Aspects of the Embodiments of FIGS. 61, 63, 64 and 66

In use in the embodiments of FIGS. 61, 63, 64 and 66 the resin may be applied onto the fibers in the form of powder or particles, in particular smaller than 1 cm, or in the form of a sheet material, and the powder or particles or sheet material is subsequently molten, wherein the molten resin flows between the fibers 14. The molten resin is subsequently hardened, in particular cured.

Alternatively, the resin may be applied onto the fibers in a liquid form and may be cured thereafter.

The resin which is used may be a curable polymer, in particular an oligomer, more in particular chosen from a group comprising: acrylated epoxy, acrylated polyester, acrylated urethane and/or acrylated silicones.

The carrier material may be a non-woven material.

The carrier material may be a flexible material.

Method of Forming Products from the Ribbon

With reference to FIGS. 9, 10, 11, 12 and 13, a method of manufacturing a fiber reinforced product 100 from the ribbon 12 may comprise forming the ribbon into pre-defined shape, in particular with a mandrel 101 or mould. Obviously, the ribbon may be cut into smaller pieces which are easier to handle. Mandrels or moulds for fiber reinforced products are obviously known. The ribbon may subsequently be impregnated with resin and the resin is then hardened, e.g. cured. This results in the product. Multiple layers of ribbon or pieces thereof or multiple layers of flakes may be used in the mould or on the mandrel.

One particular product 100 which may be manufactured with the ribbon is an elongate member, in particular a tubular member, i.e. a pole.

Figure 9:
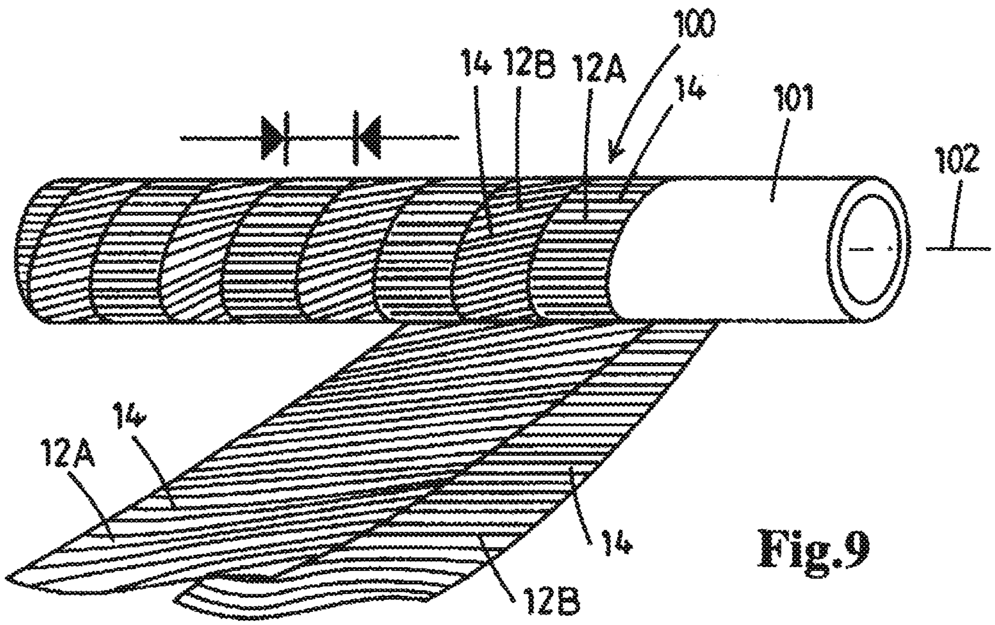
FIG. 9 shows an example of the manufacturing of a product with the ribbon according to the invention, the fibers having a fixed overlap and opposed directions.

With reference to FIG. 9, the pole may be manufactured by winding a ribbon 12 in a helical manner about a main axis 102 of a product to be formed. A mandrel 101 may be used as a core. In the embodiment of FIG. 9, two ribbons 12A, 12B are simultaneously wound around the core. The ribbons 12A, 12B have fibers 14 which may be unidirectional. The fibers of the first ribbon 12A have a different orientation than the fibers 14 of the second ribbon 12B. The fibers of ribbon 12B are aligned with the axis 102 of the mandrel. The fibers of the first ribbon 12A are not aligned with the axis 102 and are positioned in a helical manner about the mandrel.

For the second ribbon 12B the fibers are placed diagonally on the ribbon, i.e. at an angle to the main axis of the ribbon 12B. The second ribbon 12B is wound in a helical manner and if the pitch angle of the wound ribbon relative to the axis 102 is the same as the angle of the fibers 14 relative to the main direction of the ribbon, the fibers 14 are aligned with the main axis 102 of the elongate member, or at least may be oriented at an angle of less than 5 degrees relative to the main axis. This results in a very strong and stiff elongate member. The pitch determines the distance in overlap between the layers which are formed and is a factor which determines the strength of the product.

The fibers of the first ribbon 12A are wound in a helical manner around the core. This results in a high torsion stiffness. By combining two layers, the end product becomes strong and stiff.

The resin may be applied during the winding for instance in the "armpit" where the ribbon meets the product to be formed. However, other ways of applying the resin are also possible, e.g. by spraying the resin onto the ribbon or onto the product 100 during the formation thereof.

Figure 10:
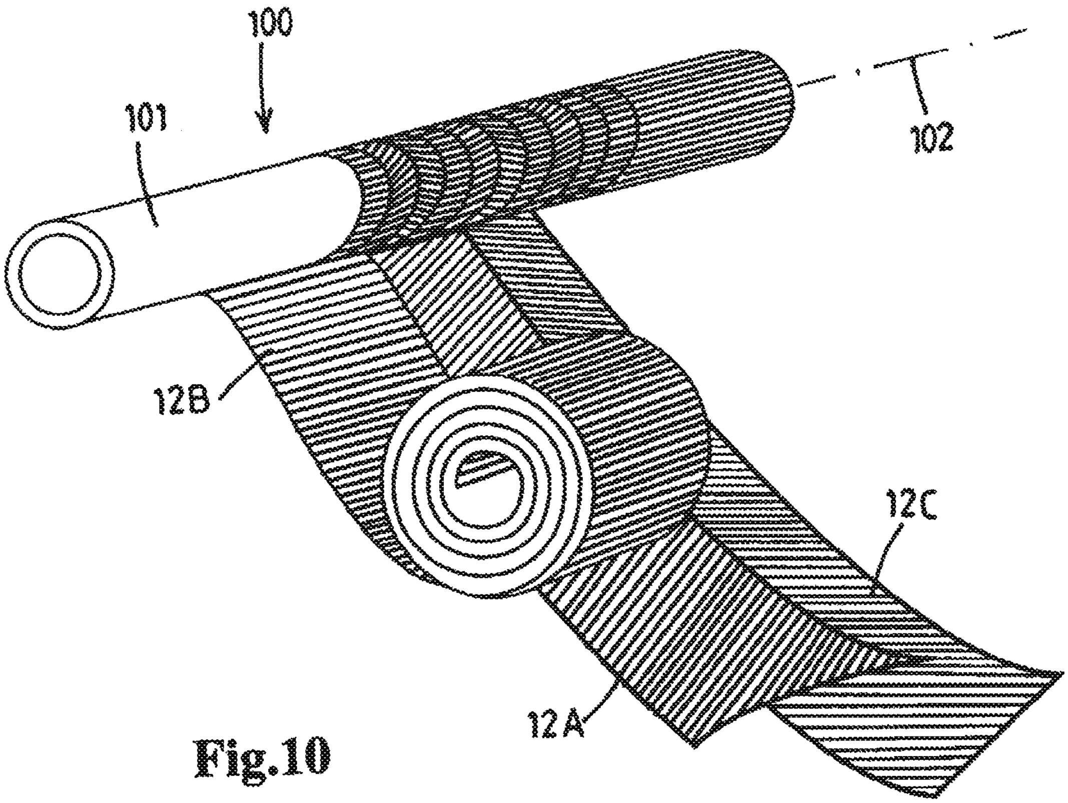

Turning to FIG. 10, in this embodiment the product 100 is created by winding three ribbons 12A, 12B, 12C around the mandrel 101 simultaneously. The second ribbon 12B has fibers 14 which are oriented at an angle to the main direction of the ribbon and is wound at a same pitch angle relative to the main axis 102 of the mandrel, resulting in fibers 14 which are aligned with the main axis 102.

The first ribbon 12A and third ribbon 12C have fibers which are oriented at opposed angles relative to the longitudinal direction of the ribbon. The fibers of the first and third ribbon may be wound in opposite helical directions onto the mandrel. This results in an even stronger end product, having a high torsion stiffness in both possible directions of torsional deformation and a high bending stiffness as a result of the fibers 14 which are aligned with the main axis.

Figure 11:
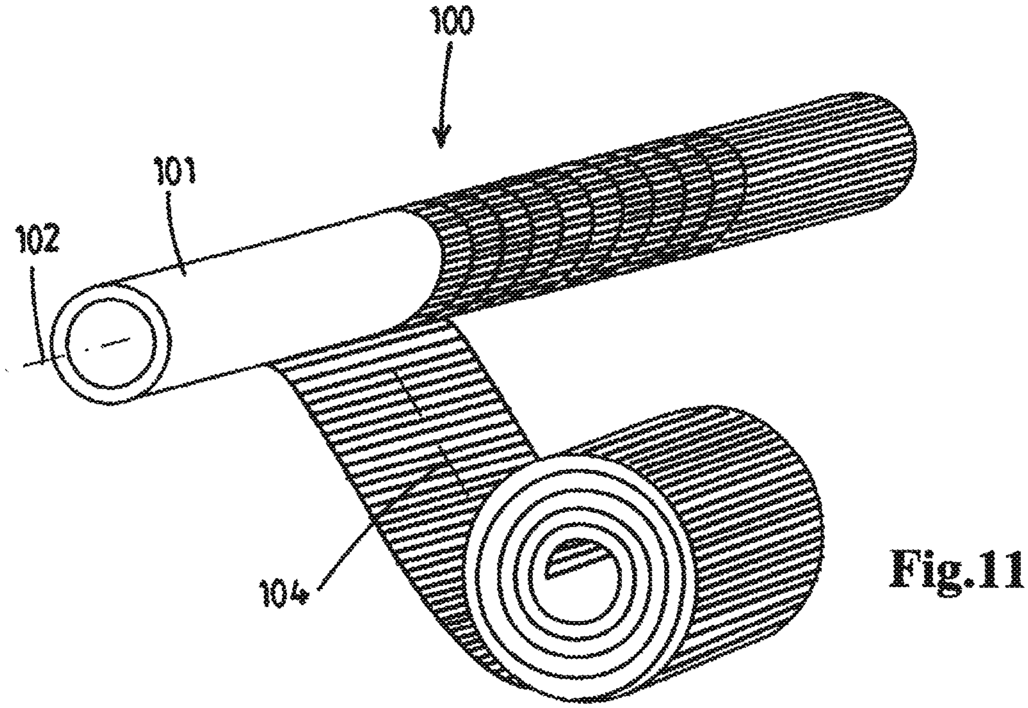
FIG. 11 shows an example of the manufacturing of yet another product with the ribbon according to the invention, the fibers being parallel.

Turning to FIG. 11, the product 100 is formed by winding a single ribbon 12 around the mandrel. The fibers 14 are oriented at an angle to the main direction 104 of the ribbon. This angle may for instance be 80 degrees, but a different angle is also possible. The ribbon 12 is wound at a same or similar pitch angle of about 80 degrees relative to the main axis 102 of the mandrel. As a result, the fibers 14 extend parallel to the main axis 102 in the end product.

Figure 12:
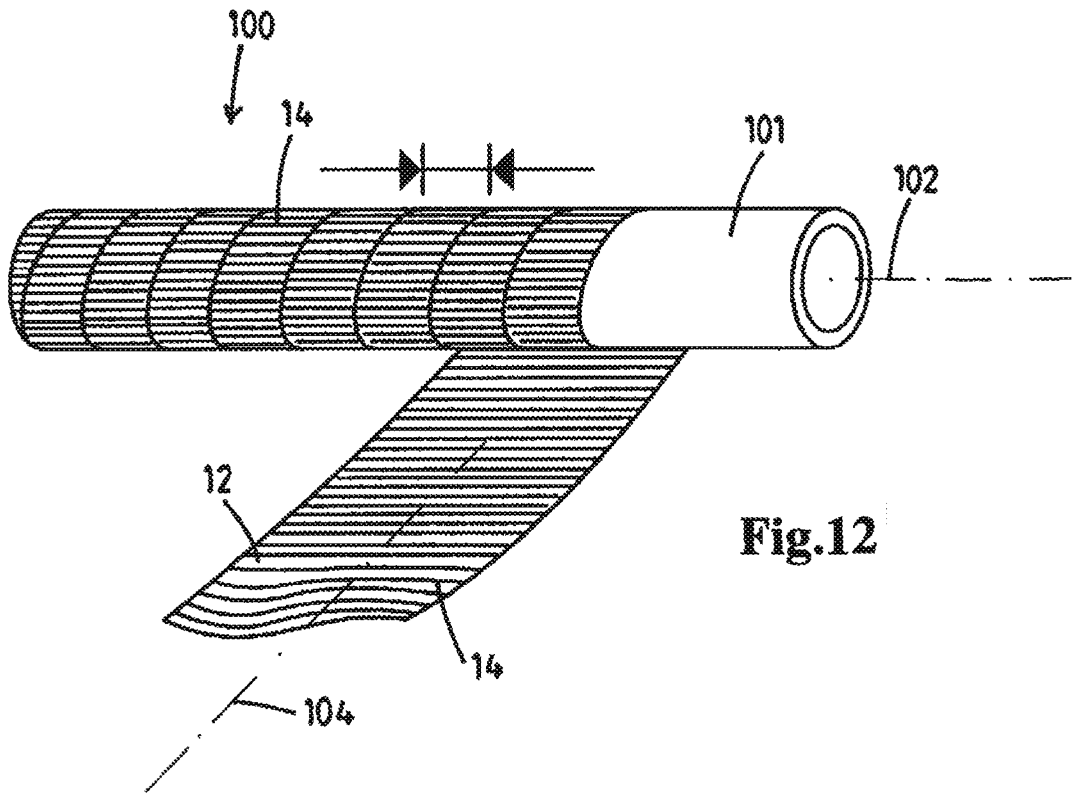
FIG. 12 shows an example of the manufacturing of a further product with the ribbon according to the invention, the fibers having a fixed overlap.

The product 100 of FIG. 12 is similar to the product of FIG. 11, with a difference that the pitch angle of the layers on the product relative to the main axis 102 is smaller, for instance 70 degrees, and the overlap between the layers on the mandrel is smaller. If the fibers are to extend parallel to the main axis 102 of the mandrel, the fibers should also be oriented at a smaller angle to the main direction 104 of the ribbon, for instance 70 degrees.

Figure 13:
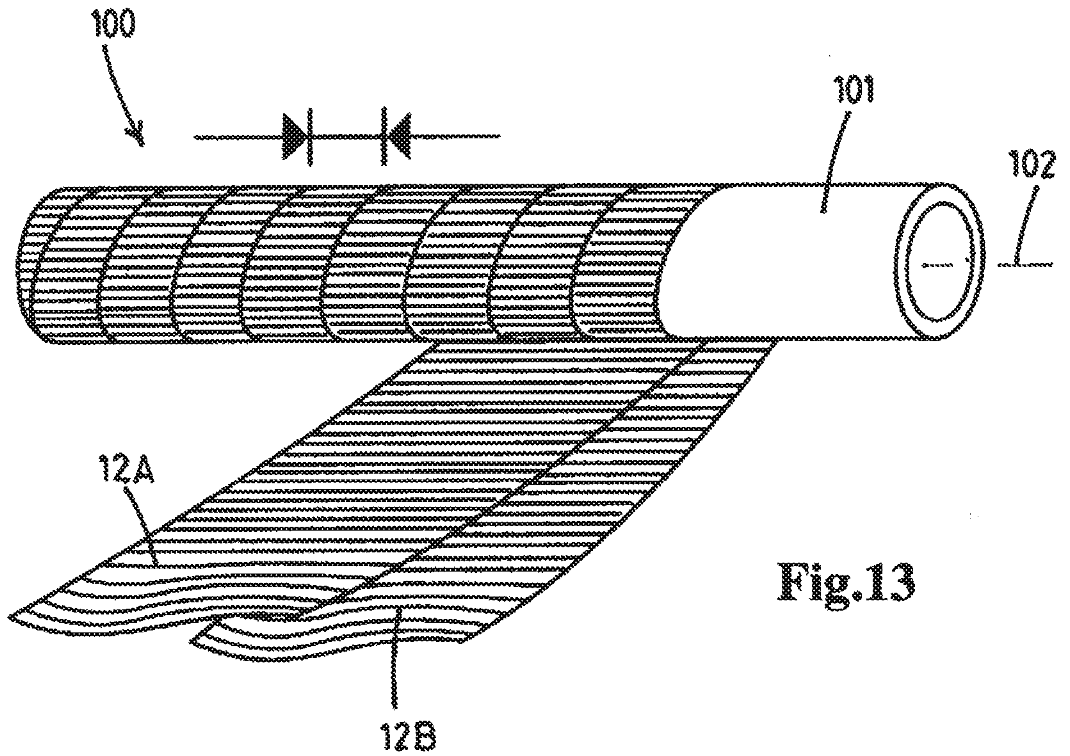
FIG. 13 shows an example of the manufacturing of yet a further product with multiple ribbons at the same time according to the invention, the fibers having a fixed overlap.

Turning to FIG. 13, a product 100 having only fibers 14 which are oriented parallel to the main axis 102 can also be made by winding multiple ribbons simultaneously.

The elongate member may also be coreless.

Such an elongate member 100 may be used in reinforcing bodies made of soil, earth or landfill, such as a levee, dyke, embankment or similar body. Currently such bodies are often reinforced with steel members. It was recognized that this is disadvantageous, because steel members are not a natural material. Moreover, sometimes further civil engineering projects need to be carried out on such land bodies. In such a case it may be required to remove part of the land body or to drill through the land body. If the land body is reinforced with steel members this may be very difficult and in case of drilling, the drill may become damaged.

It was recognized in the present invention that elongate bodies made from bamboo fiber are strong enough to strengthen the land body, but weak enough to be destroyed by an excavating machine or drilling machine. An ultrasonic or high frequency device may be used in the destruction or removal of the poles. Furthermore, bamboo fibers are a natural material and from the viewpoint of environmental friendly engineering elongate members of a natural material have a preference over steel.

The resin may be a natural (or bio-based) resin, resulting in a fully natural product. For instance, the resin may be made from bamboo leaves and branches. Other types of natural resin may be: furan and lignin resins, starch and starch caprolactone blends, polyesters such as polyalkenesuccinates, polyesteramides; polyhydroxy alkanoates such as polyvinyl butyrate and polyvinylvalerate; and poly a-hydroxy acids such as polylactic acid and polyglycolic acid. Of these some are biodegradable, including the starch polymers, polyhydroxyalkanoates and polyesteramides.

The ribbon 12 or flakes 50 formed with the present invention can also be used to make other kinds of composite products. For instance, parts of cars can be made, e.g. the chassis or body parts of cars. The present invention allows most parts of cars which are currently made from steel, aluminium or carbon to be made from natural fibers, in particular bamboo. Other kinds of composite products are also possible such as boats, airplanes or frames or other products for various purposes and basically any composite product which is currently made from carbon fibers. It is noted that the individual fibers 14 obtained with the present invention may also be processed in a different way into a composite product. Prior to the present invention it was very difficult to obtain suitable bamboo fibers to do this. However, with the present invention a multitude of new applications of bamboo fibers becomes possible. The present invention also enables a multitude of new applications of flax and hemp fibers in composite products.

Fiber Forming Device and Method

Figure 5:
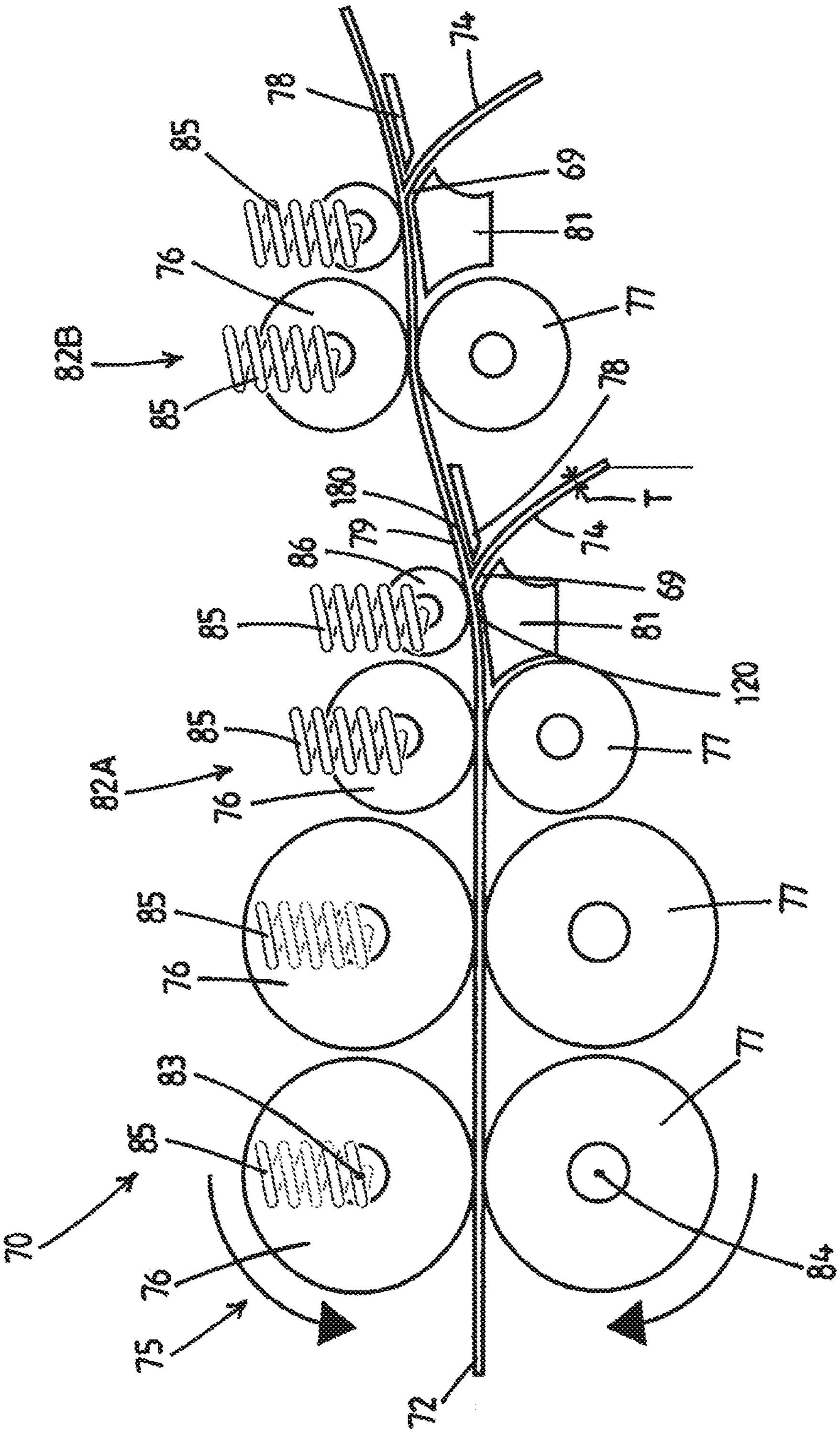
FIG. 5 shows a side view of a part of a bamboo part splitting device which is part of a fiber forming device according to the invention.
Figure 6A:
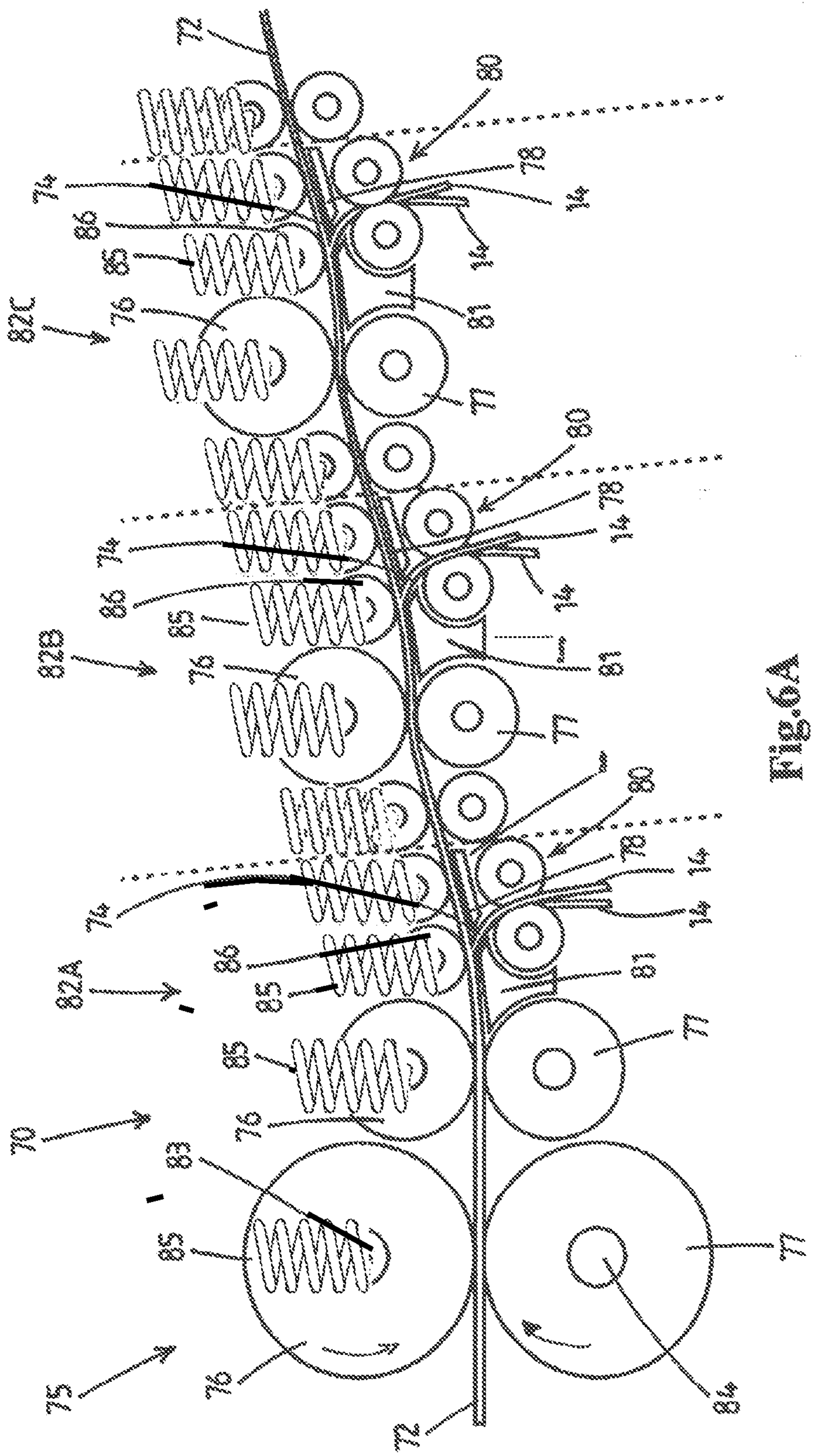
FIG. 6A shows a side view of a fiber forming device according to the invention.

Turning to FIGS. 5 and 6A, in a further aspect, the present invention relates to a fiber forming device 70 for splitting a bamboo part 72 into fibers. The fiber forming device 70 may be part of the ribbon forming device 10 and may be positioned upstream of the conveyor 16, but may also be used independently.

The fiber forming device 70 is configured for splitting bamboo parts 72 into flat pieces 74 and subsequently splits the flat pieces 74 into bamboo fibers 14, which may then be used in the ribbon forming device 10.

The flat piece 74 will typically be elongate and have a length of at least 0.3 mm to 700 mm, preferably 10 mm-500 mm. Multiple flat pieces 74 may be fed to the device consecutively.

The fiber forming device 70 comprises a bamboo part splitting device 75 configured for splitting the flat piece 74 of bamboo from the bamboo part 72. The bamboo part splitting device 75 comprises:

- at least a first rotary member 76 and a second rotary member 77 for guiding the bamboo part 72 between them,
- at least one splitting edge 78 positioned downstream from the first and second roller for splitting a flat piece of bamboo from the bamboo part, The bamboo part splitting device 75 may comprise multiple rotary elements in series. The rotary elements 66, 67 may be rollers but may also be rotary tracks.

The splitting edge 78 may be positioned below a trajectory 79 which is followed by the bamboo part, and in this configuration the splitting edge 78 splits the flat piece from a bottom side 180 of the bamboo part.

The splitting edge 78 is configured to "split" instead of to "cut", allowing the split to extend along the natural direction of the fibers. This is notably different from cutting in which the fibers may be damaged by the cutting action. The splitting takes place at a distance upstream of the splitting edge, for instance about 20-50 mm upstream of the splitting edge, but this difference may vary. To this end the splitting edge may be more blunt than a knife. In side view an angle of the splitting edge may be greater than 30 degrees.

The splitting edge 78 may be stationary during the splitting of each flat piece 74, and the position of the splitting edge may be adjustable between splitting operations for controlling a thickness of the flat piece of bamboo which is cut from the bamboo part.

The bamboo part splitting device 75 may comprise a ramp 81 positioned downstream from the first and second rotary member 76, 77 and upstream from the splitting edge 78. The ramp 81 has an upper surface 120 and is configured for bending the bamboo part at the splitting location, in particular in an upward direction. The upper surface of the ramp may extend at an angle of 5-10 degrees to the horizontal. The ramp defines the approach path of the bamboo part 72 and ensures a constant thickness of the flat piece 74. This improves the splitting because the flat piece tends to straighten by its own stiffness and tends to split from the bamboo part. A gap 69 is defined between a downstream end of the ramp 81 and the splitting edge 78. The flat piece travels through this gap, in particular in a downward direction. The splitting edge 78 itself may have an upper part which is configured to assist in the bending of the bamboo part 72. To this end, the upper part of the splitting edge may follow a curved path defined by the ramp.

An auxiliary rotary member 86 may be positioned vertically above the ramp and/or above the splitting edge 78 and may be biased by a spring element to push the bamboo part against the ramp and/or the splitting edge. This ensures that the bamboo part 72 is bent at the splitting location and prevents undesired movements of the bamboo part 74 and assists in obtaining the required thickness of the flat piece 74. The auxiliary rotary member 86 may be driven.

In particular, the bamboo part 74 may be maintained in a bent shape by the ramp and/or by the splitting edge and/or by the auxiliary rotary member 86 in a region upstream of the splitting location, at the splitting location itself and in a region downstream of the splitting location. This improves the splitting action.

The first and second rotary member 76, 77 and the splitting edge may form a modular assembly 82 and the bamboo part splitting device may comprise at least two of these modular assemblies 82A, 82B in series for successively cutting at least two flat pieces from the same bamboo part in a single run of the bamboo part through the bamboo part splitting device. The number of modular assemblies 82A, 82B, etc. may be 3, 4, 5 or a greater number.

The first rotary member 76 may be an upper rotary member located above the trajectory followed by the bamboo part, and the second rotary member 77 may be a lower rotary member positioned below the trajectory followed by the bamboo part. The first and second rotary members may have respective horizontal rotation axes 83, 84. The first and/or second rotary members 76, 77 are driven by a drive (not shown). The first and/or second rotary members may be biased by a spring element 85 in order to exert a pressure force on the bamboo element and to clamp the bamboo part between them. The spring elements 85 allow bamboo parts 72 of different thickness to be processed in the device. The spring elements further create sufficient friction so that the bamboo part is moved in spite of the counteracting force exerted on the bamboo part 72 by the splitting edge 78.

The first and/or second rotary members 76, 77 may be provide with knurling or a layer of friction material such as rubber.

The first and/or second rotary members 76, 77 may have a diameter of at least 30 mm.

In use, when the bamboo part 72 enters the device, it is pushed towards the first splitting edge 78 by a first pair of first and second rotary members 76, 77 which are located upstream of the splitting edge. When the leading part of the bamboo part has travelled past the first splitting edge 78 and reaches a second pair of first and second rotary members 76, 77, it is then gripped by this second pair of first and second rotary members 76, 77. From this point onward, the bamboo part 72 is pulled against the splitting edge, not pushed. To this end the second pair of driven first and second rotary members 76, 77 downstream of each splitting edge may rotate slightly faster than the first pair of driven first and second rotary members 76, 77 upstream of the splitting edge, and this increase in speed is continued in a downstream direction. In this way, it is ensured that the bamboo part 72 will be pulled, not pushed. The driven first pair of first and second rotary members 76, 77 have a coasting (or free-wheeling) mode which allows the first pair of driven first and second rotary members 76, 77 to rotate faster than the speed determined by the drive.

This configuration may be repeated for subsequent modular assemblies 82A, 82B. In this way the bamboo part will be pulled over each cutting edge as soon as it reaches the pair of driven first and second rotary members 76, 77 which is located downstream of the cutting edge 78 of the respective modular assembly. This improves the splitting in each modular assembly. The drives of the respective pairs of first and second rotary members 76, 77 may be synchronized to ensure this increasing speed. Alternatively, a single drive may drive multiple the pairs of driven first and second rotary members 76, 77 and a gear box may be provided for each pair, wherein the gear boxes have slightly increasing speeds in a downstream direction.

In another, simpler embodiment, the speed of the different pairs of driven first and second rotary members 76, 77 may be the same. Although this has a disadvantage that the pulling action is not ensured to the same degree, the drive system can be simpler.

The bamboo part splitting device 75 may be configured to split flat pieces 74 having a thickness (T) of less than 1 mm, in particular less than 0.5 mm, from the bamboo part. The thickness is determined by the geometry of the different part, in particular by the elevation of the splitting edge 78 above the upper surface 120 of the ramp at the downstream end of the ramp.

Figure 7:
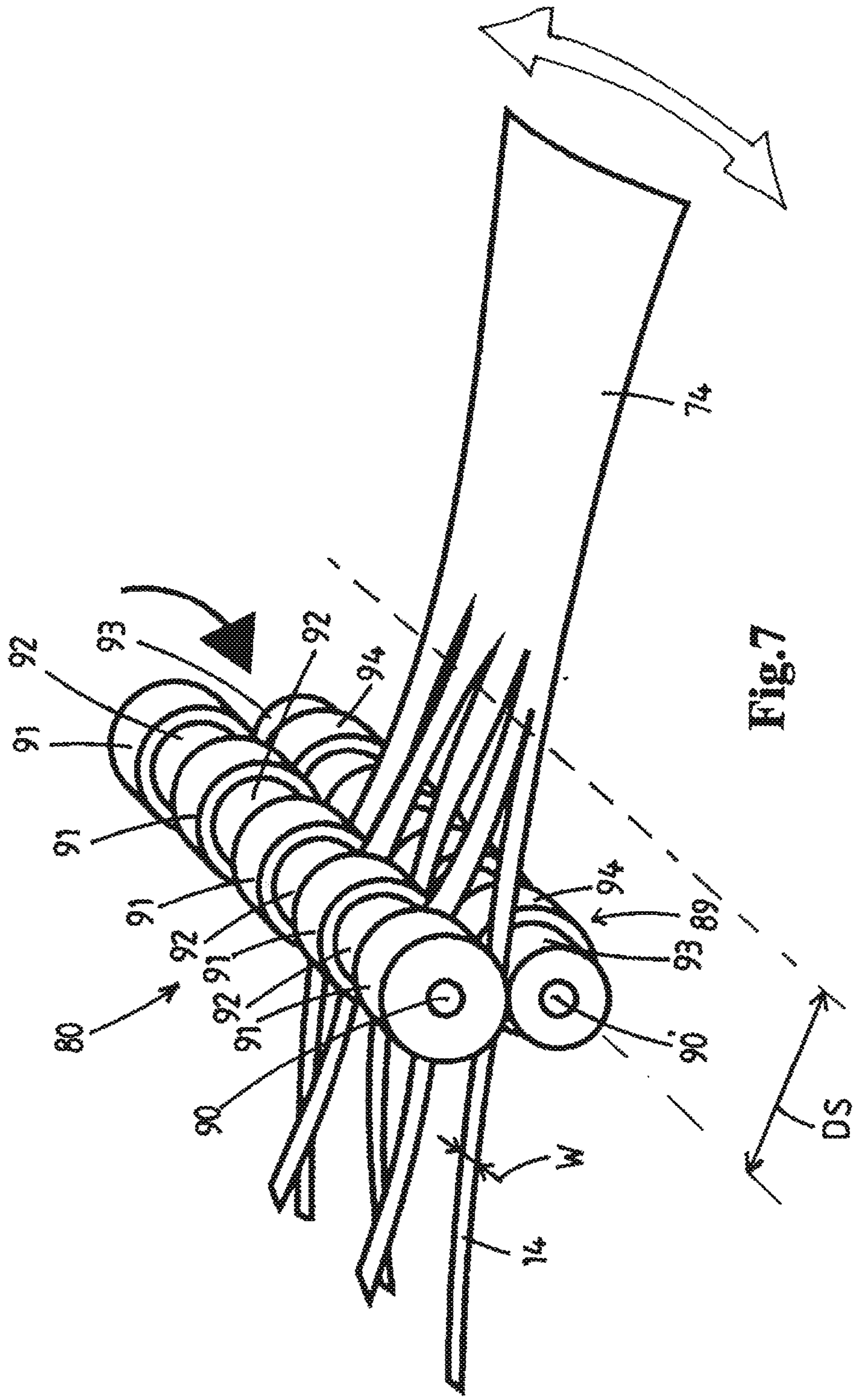
FIG. 7 shows an isometric view of a flat piece splitting device according to the invention.
Figure 8:
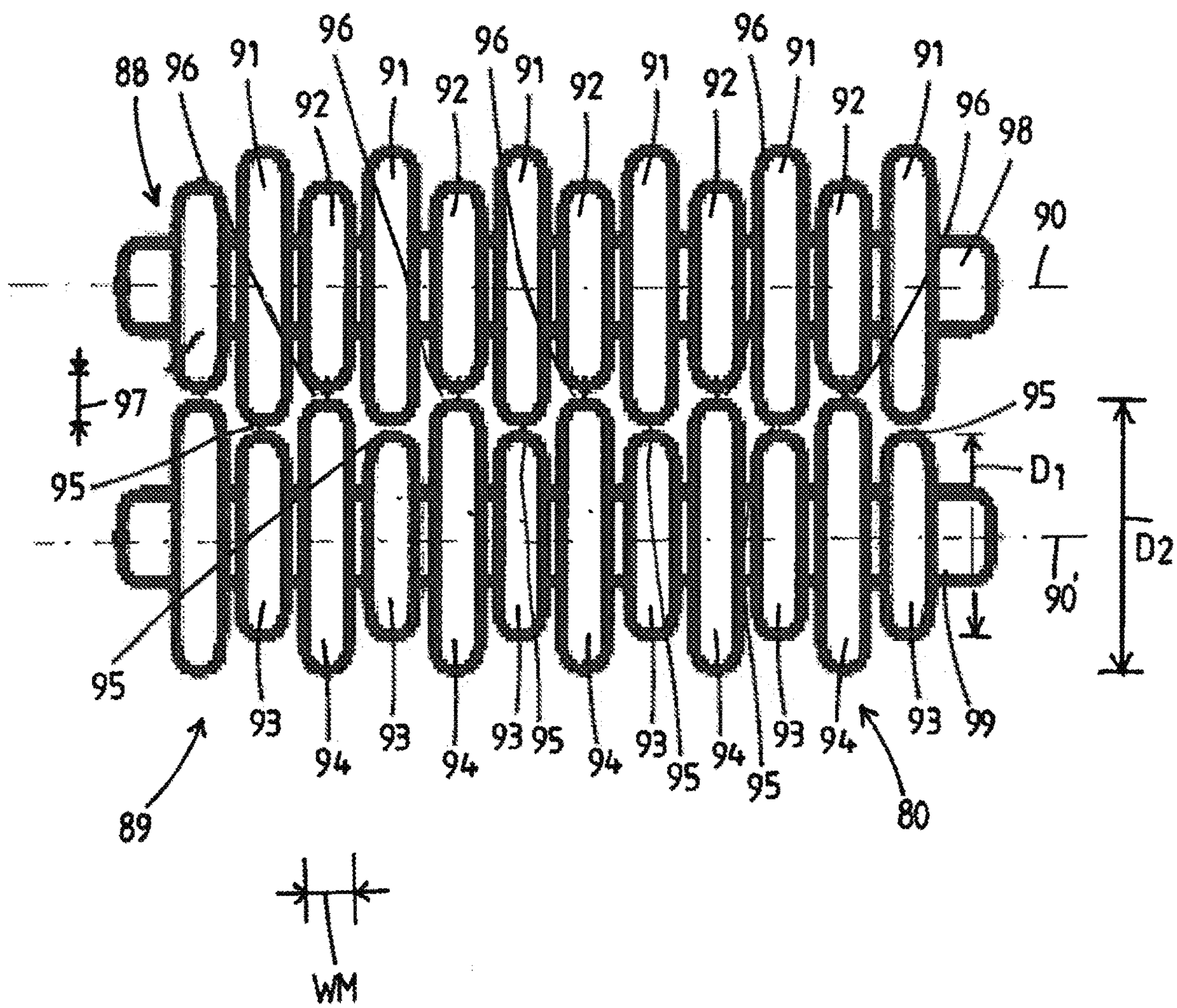
FIG. 8 shows a front view of the flat piece splitting device according to FIG. 7.

With reference to FIGS. 6A, 7 and 8, the fiber forming device 70 may further comprise a flat piece splitting device 80 for splitting each flat piece 74 into bamboo fibers 14. The flat piece splitting device 80 may form an integral part of the fiber forming device 70 (see FIG. 6A). In a variant, the flat piece splitting device 80 may be separate (see FIG. 7). It is noted that FIG. 7 shows the flat piece splitting device 80 as a separate device but is also intended to show the flat piece splitting device 80 which is integrated in fiber forming device 70 according to FIG. 6A. The flat piece splitting device may be positioned below the splitting edge 78 and below a trajectory followed by the flat piece 74.

The flat piece splitting device 80 is configured to split the flat pieces into fibers 14 having a width (W) of less than 2.5 mm, preferably less than 1 mm, more preferably between 0.3 and 0.5 mm.

The flat piece splitting device 80 for splitting a flat piece 74 of bamboo into a plurality of fibers 14 may comprise:

- a first rotary element 88 configured for rotation about a first axis 90, and
- a second rotary element 89 configured for rotation about a second axis 90'.

The first and second rotary members 88, 89 will typically be driven.

The first and second axis 90, 90' may be parallel. The rotary elements 88, 89 can be rollers as shown or can be tracks or a similar device. In case of tracks, each rotary element will typically have two rotation axes.

The first rotary element 88 comprises a plurality of first splitting members 91 having a first diameter (D1) and a plurality of second splitting members 92 having a second, different diameter (D2), wherein the first and second splitting members are alternately positioned along the first rotation axis 90. The second rotary element 89 comprises a plurality of third splitting members 93 having a third diameter (D3) and a plurality of fourth splitting members 94 having a fourth diameter (D4) which is different from the third diameter, wherein the third and fourth splitting members are alternately positioned along the second rotation axis 90', wherein the first splitting members 91 are positioned opposite the third splitting members 93 and the second splitting members 92 are positioned opposite the fourth splitting members 94. The circumferential surface of the first, second, third and fourth splitting members may be provided with knurling or friction material.

The first and second rotary members 88, 89 are configured to rotate in a direction in which the upstream side of the first and second rotary members 88, 89 moves toward one another. In this way the flat piece of bamboo 74 is guided into the flat piece splitting device 80.

A first series of passages 95 are defined between the first and third splitting members 91, 93 and a second series of passages 96 are defined between the second and fourth splitting members 92, 94, wherein the first series of passages 95 and the second series 96 are located at a passage distance 97 (see FIG. 8) from one another. The passage distance 97 should to be large enough to ensure that the splitting occurs well in advance (or at a sufficient distance Ds upstream) of the passages, and should be in particular at least 1 mm, preferably between 1 and 2 mm.

The first passages 95 may be positioned in a first straight row, and the second passages 96 may be positioned in a second straight row, the first and second row being positioned at the passage distance 97.

The first, second third and fourth splitting members 91, 92, 93, 94 may have a width Wm (see FIG. 8) of between 0.1 mm and 2 mm, in particular between 0.3 and 1.2 mm. It is noted that in the figures the widths of the first, second third and fourth splitting members 91, 92, 93, 94 have been exaggerated relative to the diameter, for clarity purposes.

The first, second third and fourth splitting members 91, 92, 93, 94 may have a disk shape. The first and fourth splitting members 91, 94 may have a diameter D1 and the second and third splitting members 92, 93 may have a diameter D2. A difference in diameter between D1 and D2 is preferably at least 1 mm. The difference in diameter between D1 and D2 defines the passage distance 97. Given the required difference in diameter, the diameters D1 and D2 may be between 10 mm and 200 mm, preferably 80-150 mm.

The first, second third and fourth splitting members 91, 92, 93, 94 may be mounted on respective axles 98, 99. The first, second third and fourth splitting members 91, 92, 93, 94 may be mounted with interspaces between them as is shown in FIG. 8. Alternatively the first, second third and fourth splitting members 91, 92, 93, 94 may be mounted without any interspaces, i.e. against one another.

The circumferential surfaces of the first, second third and fourth splitting members 91, 92, 93, 94 may be flat, rounded (convex) or concave.

With reference to FIG. 7, the fibers which exit the flat piece splitting device are substantially parallel (although not exactly parallel) and exit the flat piece splitting device as a group (or bundle) of aligned fibers which are arranged substantially parallel and substantially adjacent one another. The fibers have front ends and rear ends which are substantially aligned. The fibers may be ready for further processing. The fibers are in particular ready to be deposited onto the conveyor 16 of the ribbon forming device according to the present invention.

Creating the Flat Pieces of Bamboo

Figure 14:
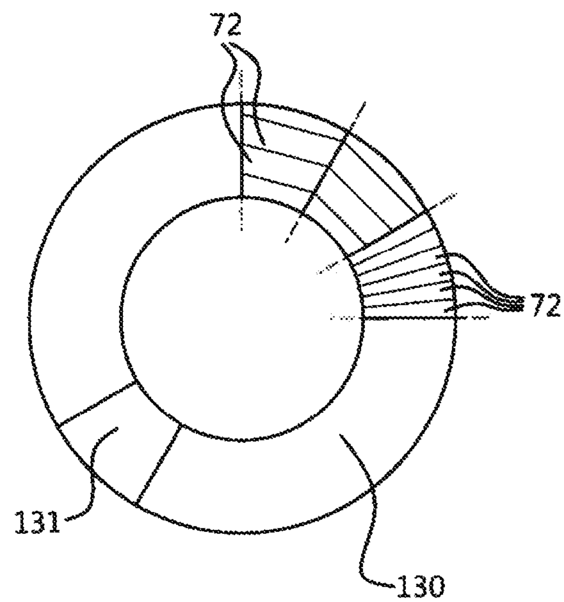
FIG. 14 shows a cross-sectional view of a bamboo segment which forms a base material for the present invention.

With reference to FIG. 14, bamboo segments 130 form the base material for the present invention. The fiber forming device may comprise an upstream module positioned upstream from the bamboo part splitting device. The upstream module is configured for creating the flat pieces 74 of bamboo which are fed to the bamboo part splitting device 75 from the tubular bamboo segment 130.

The upstream module may comprise a rolling mill for dividing the tubular bamboo segment in an axial direction thereof into multiple tube segments 131. The splitting device of the upstream module is configured to split each tube segment 131 into multiple flat pieces 72 of bamboo which can be fed to the bamboo part splitting device 75. Such an upstream module is known from the prior art and does not form part of the present invention by itself.

Further Embodiment of the Flat Piece Splitting Device

Figure 6B:
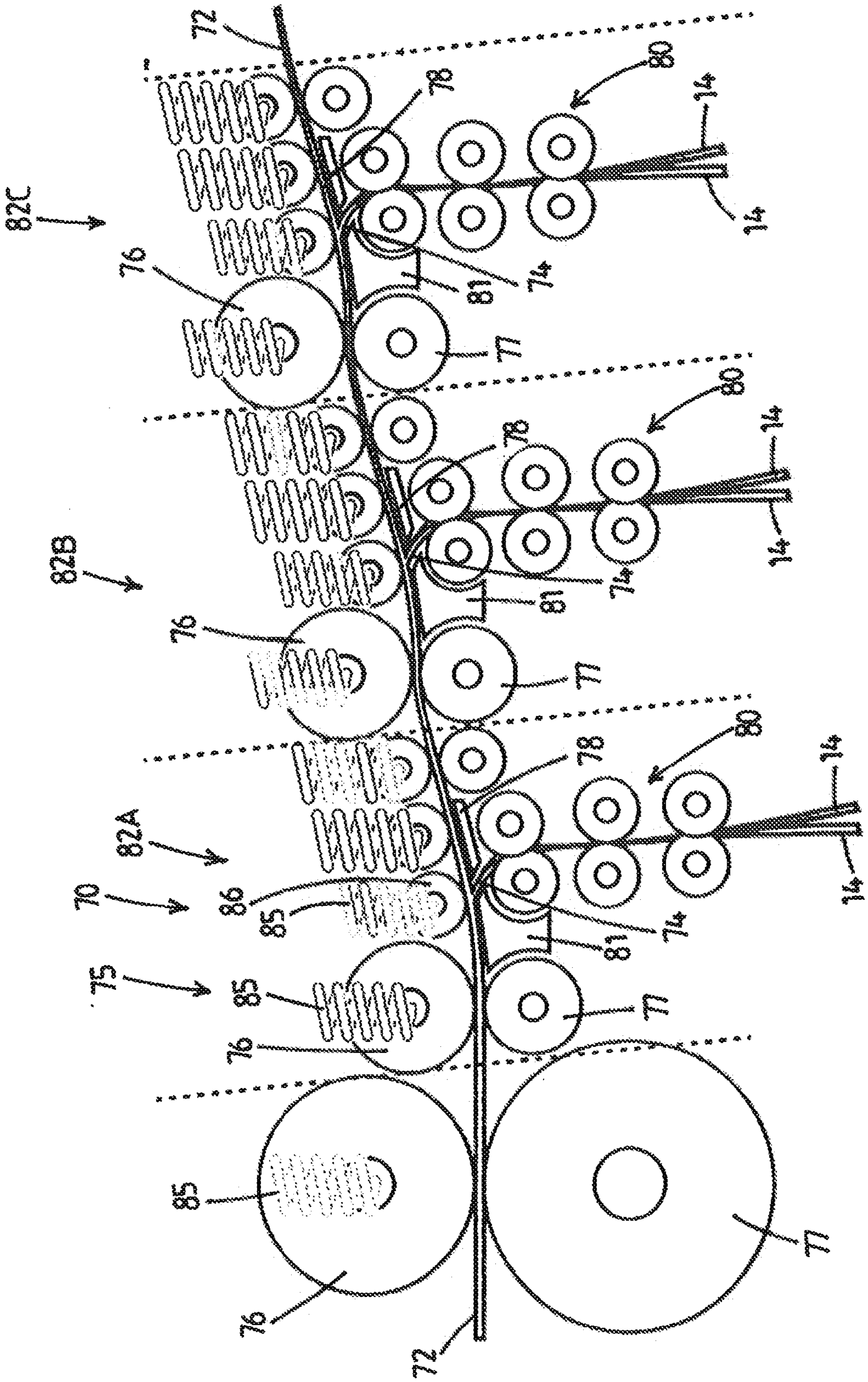
FIG. 6B shows a side view of another embodiment of a fiber forming device according to the invention.
Figure 15:
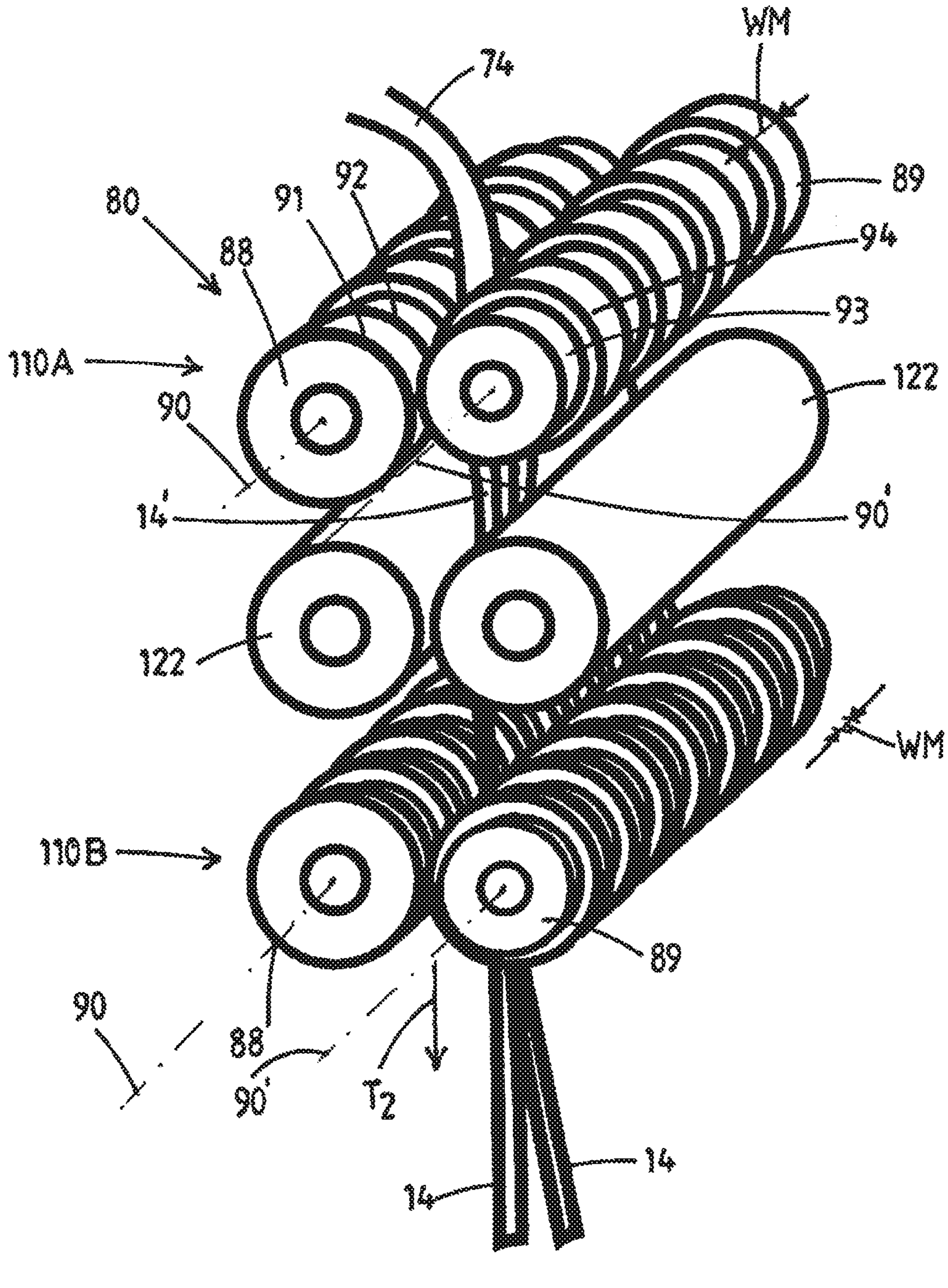
FIG. 15 shows an isometric view of another embodiment of a flat piece splitting device according to the invention.

With reference to FIGS. 6B and 15, in a further embodiment of the invention, the flat piece splitting device 80 may have a different configuration. Instead of a single pair 110 of a first rotary element 88 (configured for rotation about a first axis 90) and a second rotary element 89 (configured for rotation about a second axis 90'), more than one pair 110A, 110B is provided and arranged in sequence.

In the first pair 110A, the flat piece 74 of bamboo is split in relatively broad fibers 14'. In the second pair 110B, the relatively broad fibers 14' are further split into more narrow fibers 14.

The first, second, third and fourth splitting member 91, 92, 93, 94 of the first and second rotary elements 88, 89 of the first pair 110A are broader than the first, second, third and fourth splitting member 91, 92, 93, 94 of the first and second rotary elements 88, 89 of the second pair 1108. For instance the first, second, third and fourth splitting member 91, 92, 93, 94 of the first and second rotary elements 88, 89 of the first pair 110A may have a width Wm of between 1, 2 and 3 mm, whereas the first, second, third and fourth splitting member 91, 92, 93, 94 of the first and second rotary elements 88, 89 of the second pair 110B may have a width Wm between 0.1 mm and 2 mm, in particular between 0.3 and 1.2 mm. It was found this this multi-step arrangement results in a better reliability and a higher quality of the resulting fibers 14.

The multistep arrangement also allows the fibers 14' to diverge from one another in the axial direction of the first and second rotary elements 88, 89.

A pair of rollers 122 or guiding tracks or other type of guides may be provided between the first pair 110A and the second pair 110B, in order to guide the relatively broad fibers 14' between the first and second rotary elements 88, 89 of the second pair 110B. The rollers 122 may arrange the fibers in a wider arrangement, i.e. the rollers may increase the distances between the fibers. This improves the splitting action in the second pair 110B.

The rollers 122 may clamp the fibers with a clamping force. The rollers 122 may clamp the fibers and break the wood parts from the fibers. The wood parts let loose from the fibers. In an embodiment, the wood parts can be blown away or sucked away with a blowing device or suction device positioned at the rollers 122 or at a position downstream from the rollers 122. The fibers may also be combed in a further processing step to remove remaining pieces of wood, e.g. parenchyma.

The transport direction T2 through the flat piece splitting device 80 may have a downward component and may in particular be vertically downwards.

The multistep flat piece splitting device 80 may be integrated with the bamboo splitting device 75 into an integral fiber forming device 70 as shown in FIG. 6B or may be provided as a separate device.

Figure 6C:
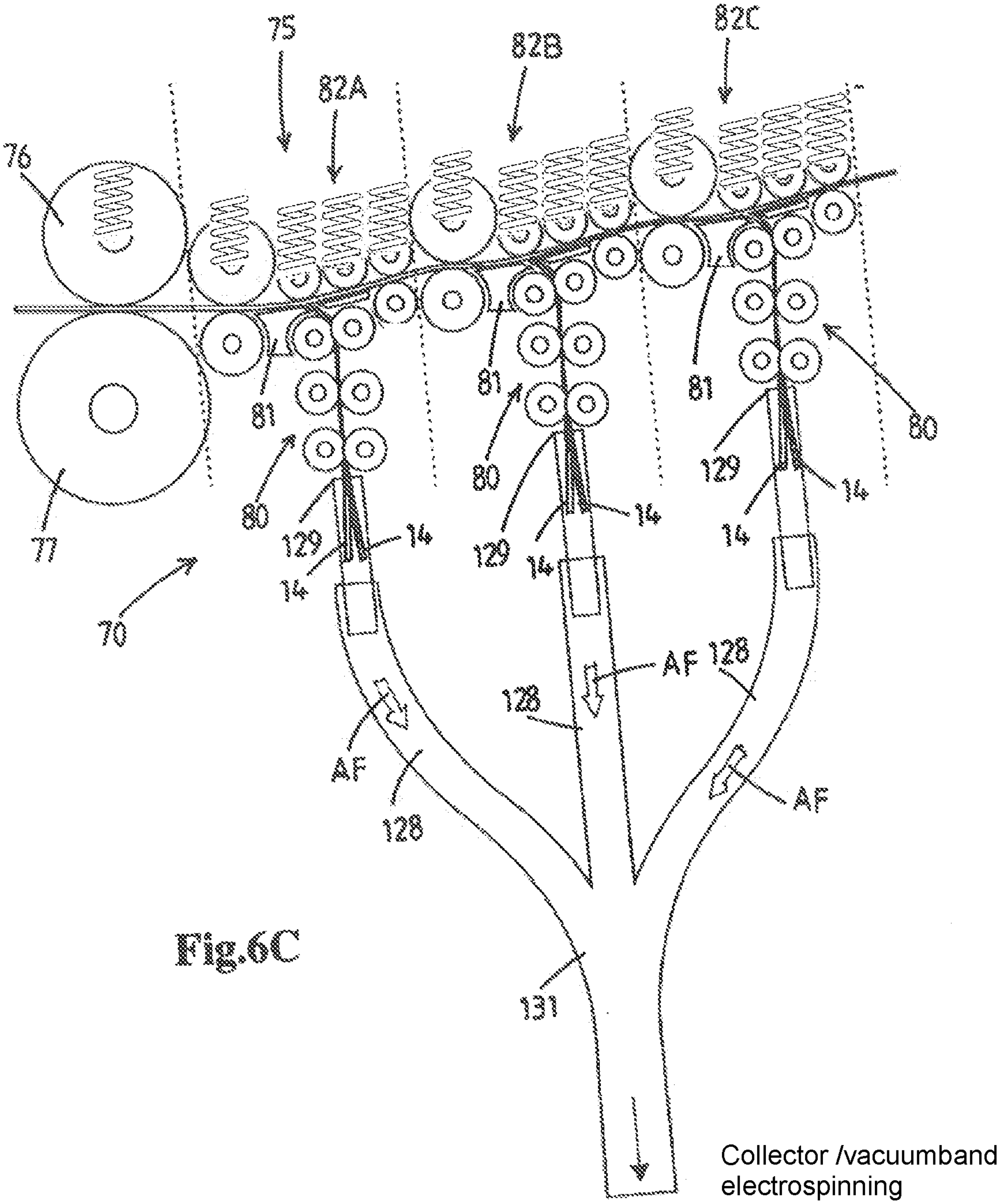
FIG. 6C shows a side view of yet another embodiment of a fiber forming device according to the invention.

With reference to FIG. 6C, another embodiment of the fiber forming device 70 is shown, in which collector devices 128, in particular collector chutes or channels, are provided. The chute may be formed by a pipe. An airflow device may be provided for creating an airflow Af in the collector device for transporting the fibers 14.

Each collector device has a collector entry 129 positioned at a downstream end of each flat piece splitting device 80. The fibers 14 which exit each flat piece splitting device 80 are collected by the collector device and transported further downstream. The collector devices 128 may work on gravity, possibly in combination with an airflow, but may also be a conveyor. The collector devices may merge at a merge point 131 from where the fibers are further conveyed to a storage location or to the ribbon forming device 10.

Alternatively, the merge location 131 may be left out and the collector device may directly be connected to the supply tubes 37 shown in FIG. 1A.

Method and Device of Cleaning Bamboo Fibers

The bamboo fibers 14 which are obtained with the fiber forming device 70 as described above may still have wood parts (parenchyma) attached to the fibers. For a high quality fiber, it is desirable to clean the fibers 14 and remove these wood parts. As a result, the parenchyma is removed and the fibers become thinner.

Therefore, in an embodiment, a separate processing step of cleaning the fibers may be desirable. This processing step may form part of the fiber forming device 70 and the method of using the fiber forming device 70, but may also be carried out separately prior to the forming of the ribbon or prior to other ways of processing the fibers.

Figure 19:
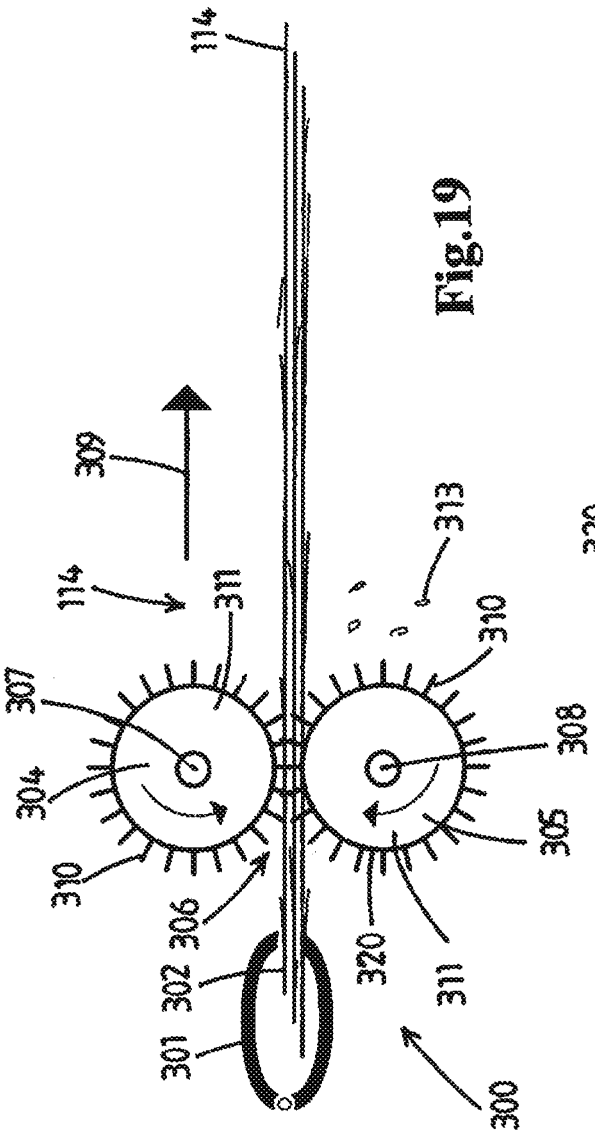
FIGS. 19 and 20 show a side view of an embodiment of a fiber cleaning device according to the invention.
Figure 20:
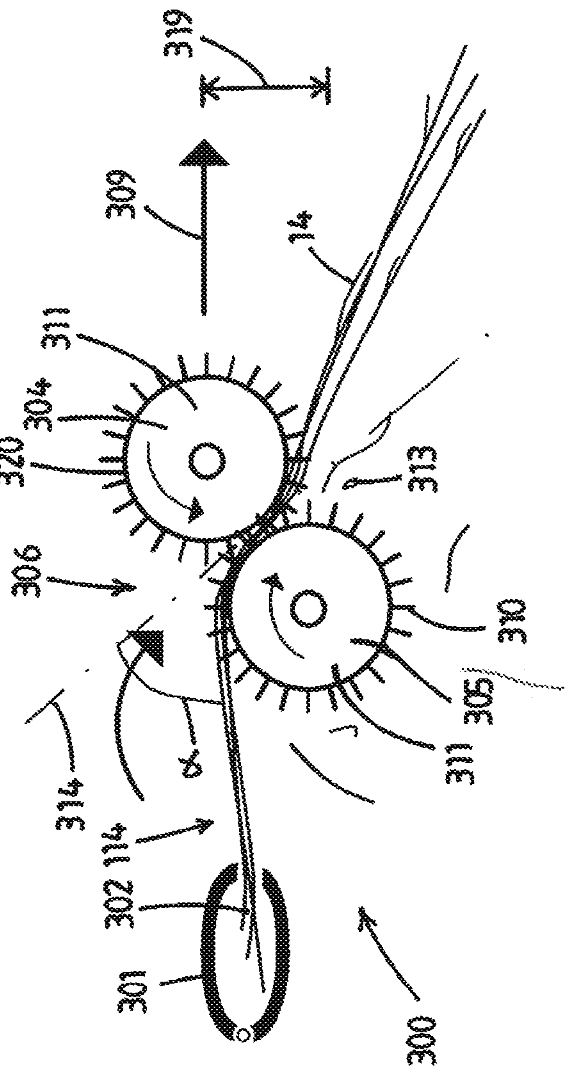

Turning to FIGS. 19 and 20 a cleaning device 300 for cleaning the fibers 14 may comprise a gripper 301 configured to hold at least one end 302 of the fibers 14. The fibers may be held individually. However, it may be preferable to hold a bundle 114 of fibers 14.

The cleaning device 300 may comprise a pair of rotary cleaning members 304, 305 which define a passageway 306 between them. The rotary cleaning members 304, 305 are driven in order to rotate about their respective axes 307, 308. The rotary cleaning members 304, 305 are further configured to move relative to the fibers 14 in a cleaning direction 309 during the cleaning action and during their rotation. The cleaning direction 309 is away from the ends 302 which are held. Either the rotary cleaning members can move or the gripper 301 may move, or both. The cleaning direction 309 may be horizontal or vertical or inclined.

The rotary cleaning members 304, 305 may comprise bristles 310 which extend outwardly from a core 311. The 311 cores define a circumferential surface 320 from which the bristles protrude. Alternatively, the rotary cleaning members 304, 305 may have a circumferential cleaning surface 312, which may be provided with knurling or a skid resistant surface layer, e.g. a surface layer of rubber or other suitable material.

During the movement in the cleaning direction relative to the fibers, the action of the bristles 310 removes wood pieces 313 which are attached to the fibers 14. The fibers 14 become clean and suitable for further processing.

Turning to FIG. 20, the direction 314 of the passageway 306, may be oriented at an angle α relative to a straight line between the passageway and the gripper 301. This can be done by positioning one of the rotary cleaning members forward relative to the other rotary cleaning member and by decreasing a vertical distance 319 between the axes 307, 308 to a distance which is less than the diameters of the cores 311. In this way the fibers 14 are bent during the cleaning action. This improves the loosening of the wood pieces 313 from the fibers.

Figure 21:
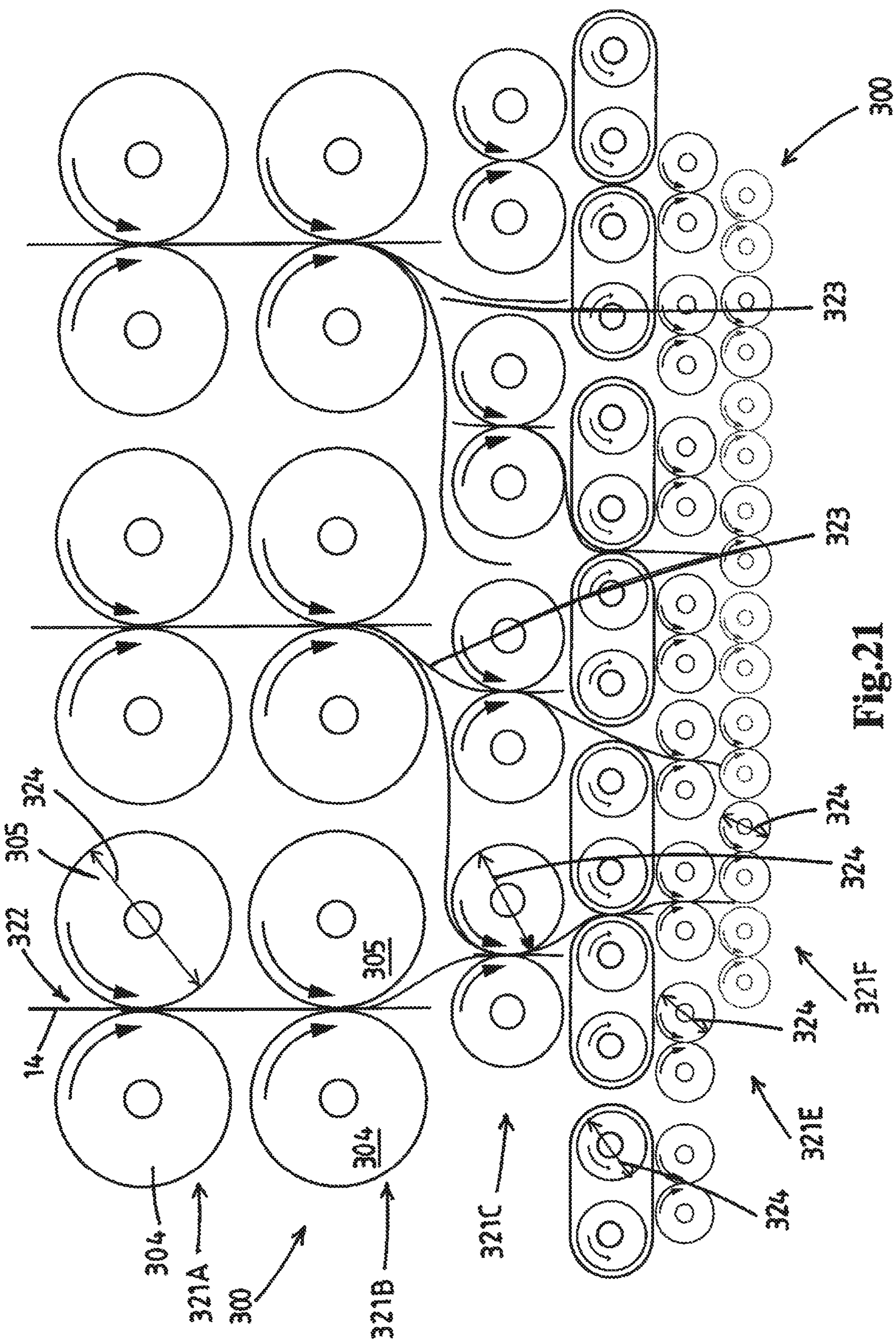
FIG. 21 shows a side view of another embodiment of a fiber cleaning device according to the invention.

Turning to FIG. 21, in order to improve the cleaning action of the cleaning device 300 and in order to increase the throughput, the cleaning device 300 may comprise multiple pairs 321 of rotary cleaning members 304, 305 which may be provided in series and/or in parallel. The cleaning action is improved by providing the pairs 321 in series, and the throughput is increase by providing the pairs 321 in parallel.

However, a bifurcated cleaning device may also be provided, comprising an entry 322 at one pair 321, and wherein one or more branch point 323 is/are provided downstream of said pair. A the branch points, a cleaning trajectory branches in two (and potentially more) separate downstream cleaning trajectories.

Furthermore, the diameters 324 of the rotary cleaning members 304, 305 may decrease in a downstream direction.

In this configuration, the fibers 14 travel through the cleaning device 300 and are not held by any gripper. The pairs 321 of rotary cleaning members 304, 305 perform both a cleaning action and a holding action. In particular the most upstream pair 321A may rotate at a relatively slow speed, and the subsequent downstream pairs 321B, 321C, etc, may rotate at increasing speeds to exert a cleaning action in the downstream direction. It will be clear that the speed in this context is the speed of the parts of the rotary cleaning members which engage the fibers. In case of rotary cleaning member without bristles, this may be the circumferential surfaces 320. In case of rotary cleaning members with bristles, this may be the speed of the part of the bristles which contact the fibers.

The cleaning action is caused by a frictional engagement of the fibers by the rotary cleaning members 304, 305, either by the bristles or by the circumferential surfaces, or both.

The trajectory defined by the pairs of rotary cleaning members 304, 305 and followed by the fibers is not straight but comprises curves. This improves the cleaning action, because the wood parts tend to come loose easier when the fibers are bent.

For the configuration of FIG. 21, it is also possible that the same angle α is applied.

Figure 22:
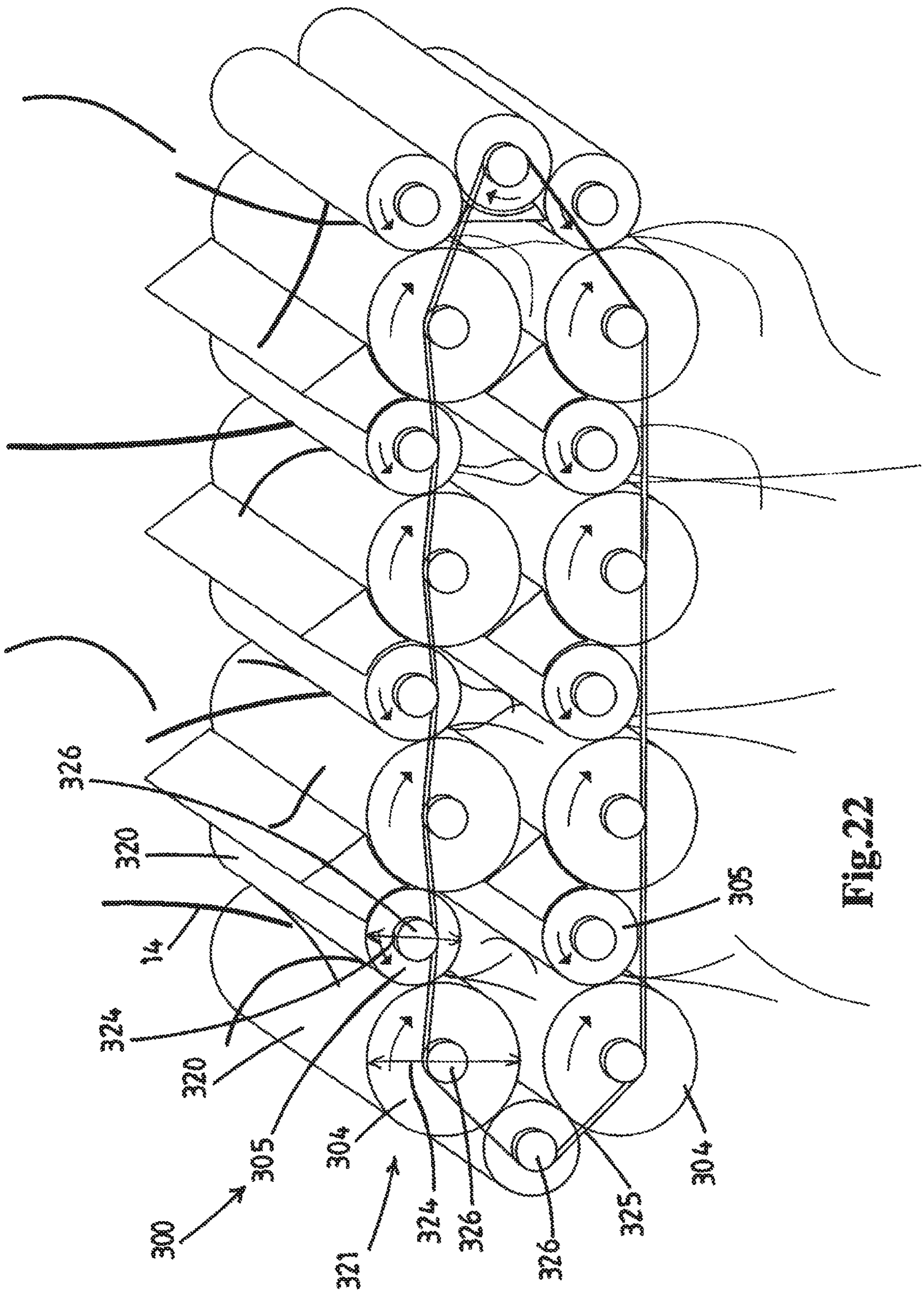
FIG. 22 shows an isometric view of yet another embodiment of a fiber cleaning device according to the invention.

Turning to FIG. 22, a further embodiment of a cleaning device 300 for bamboo fibers is disclosed, wherein the rotary cleaning members 304, 305 of a single pair 321A have different diameters. The rotary cleaning members 304, 305 of a single pair 321A have a same circumferential speed. This is caused by a common drive belt 325 which engages rotary driving members 326 on each rotary cleaning members 304, 305.

Preferably, the drive system which drives the rotary cleaning members 304, 305 is synchronized drive system for instance using a single motor and a gear box having a planetary gear system, a single drive belt or a similar centralized drive system. Obviously many variations for the drive system are possible.

As a result, the surfaces 320 of the two rotary cleaning members 304, 305 of a single pair 321A slip relative to one another. This causes frictional engagement of the fibers 14 and improves the cleaning action.

Figure 23:
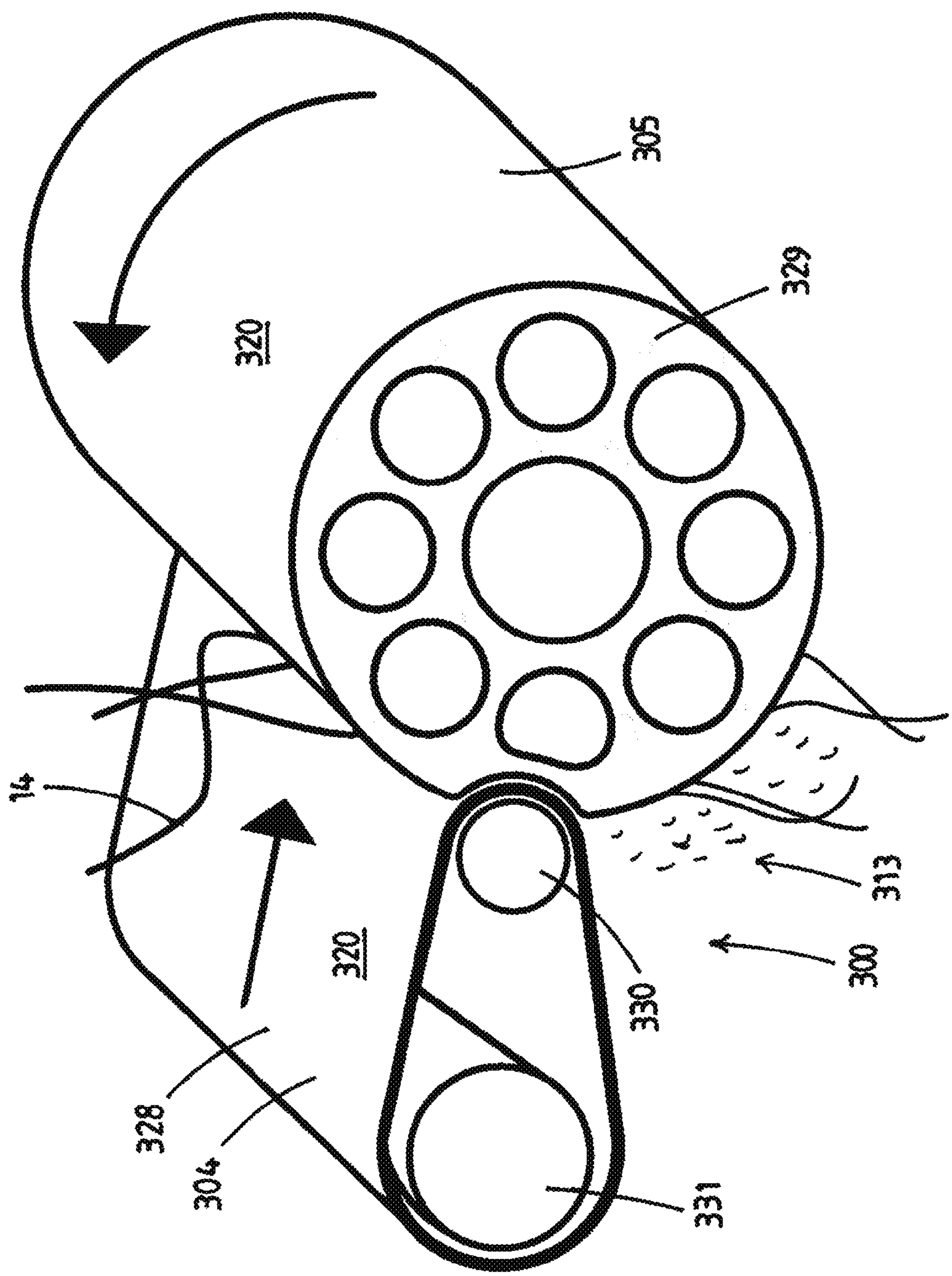
FIG. 23 shows an isometric view of a further embodiment of a fiber cleaning device according to the invention.

Turning to FIG. 23, another embodiment of a cleaning device 300 is shown. In this embodiment, one rotary cleaning member 304 comprises a driven belt 328 supported by a first and second roller 330, 331. The other rotary cleaning member 305 comprises a rotary flexible member 329, for instance made of rubber. The first rotary cleaning member 304 presses into the other rotary cleaning member 305 and forms an indentation therein. This creates a curved trajectory for the fibers 14. The circumferential speeds of the two rotary cleaning members 304, 305 may be the same or be different, in which case slip occurs.

As a result of the curved trajectory, the compressive force and optionally the slip, the wooden parts 313 will be removed from the bamboo fibers 14.

It is noted that the cleaning devices may be incorporated into the flat piece splitting device 80 of FIGS. 6B and 15 in the place where the rollers 122 are positioned or may be positioned downstream of the flat piece splitting device 80 according to any of the preceding embodiments, in order to clean the fibers in a further processing step.

Operation of Splitting a Bamboo Part into Fibers

In operation, the method of splitting a bamboo part into multiple fibers comprises:

inserting a bamboo part 72 into the fiber forming device 70, splitting a flat piece 74 from the bamboo part, splitting the flat piece into multiple fibers 14.

The splitting occurs along a direction of the fibers 14 of the bamboo part. This may occur both for the step of splitting a flat piece 74 from the bamboo part 72 as for the step of splitting the flat piece 74 into fibers 14.

The flat piece 74 which is split from the bamboo part has a thickness of between 0.1 and 1 mm, and the flat piece is split in fibers 14 having a width of between 0.1 and 1.2 mm.

During the splitting of the flat piece 74 into fibers 14, each fiber travels through a respective passage 95, 96, and the splitting occurs at a distance Ds upstream of the flat piece splitting device as a result of the passage distance 97 between the first series of passages 95 and the second series of passages 96.

The fibers 14 have a width of between 0.1 and 1 mm, a height of between 0.1 and 1 mm and a length of at least 0.5 mm, in particular between 0.5 and 600 mm.

Second Aspect of the Invention—Bamboo Thread

Figure 24:
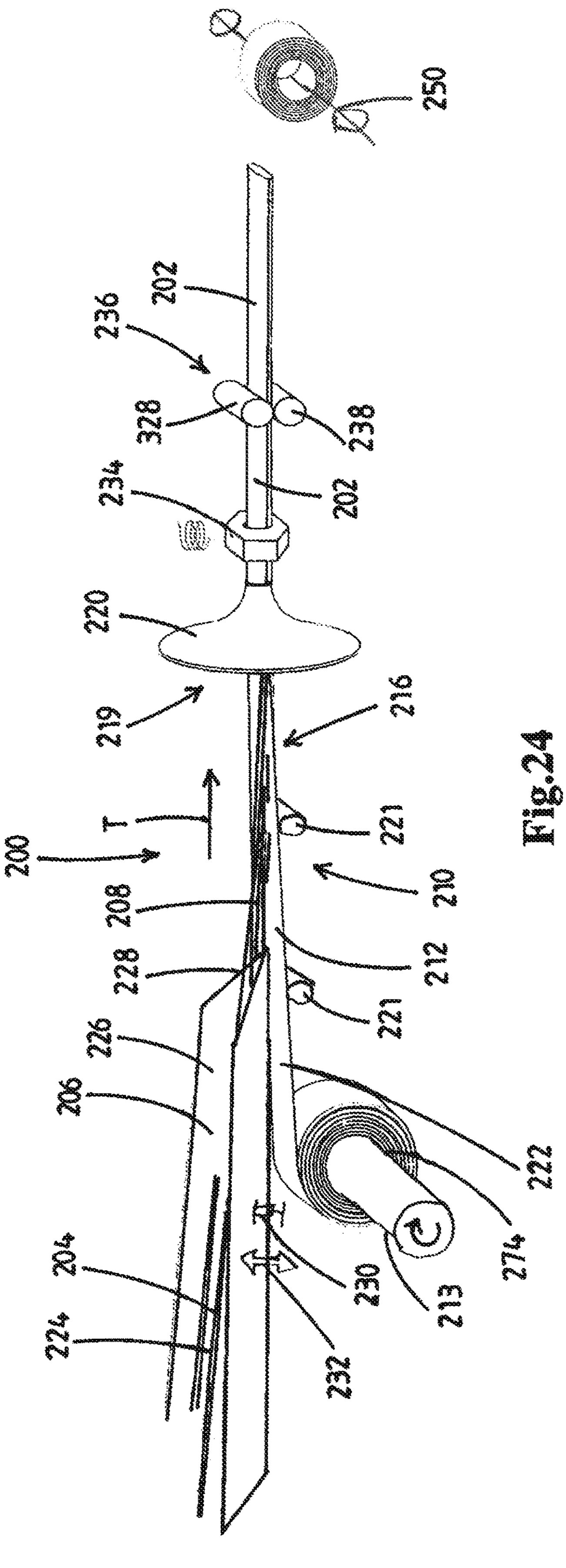
FIG. 24 shows a device according to a second aspect of the invention.

Turning to FIG. 24, a device 200 is shown for manufacturing a thread 202 comprising bamboo fibers 204. The device 200 comprises a strand forming device 206 for arranging the bamboo fibers into an elongate strand 208 of bamboo fibers.

The device 200 further comprises a web application device 210 configured for applying a web 212 on the strand 208.

The web application device 210 may be positioned downstream from the strand forming device when seen in the transport direction T. The web which 212 is applied on the strand by the web application device has an open structure and comprises multiple openings.

The web application device 210 comprises an unspooling device 213 for unspooling the web prior to engagement with the strand of bamboo fibers.

The device 200 is configured for moving the formed strand 208 continuously in the transport direction T. The device is configured to provide the strand with a cross-sectional area of 0.1-100 mm2, preferably 0.2-40 mm2, more preferably 0.5-20 mm2. The device is configured to provide between 5 and 500 bamboo fibers, in particular between 10 and 300 bamboo fibers in a cross-sectional area of the strand.

The web application device 210 is configured for applying the web onto the strand in an engagement area 216 during the moving of the strand in the transport direction T.

The web application device 210 may comprise a web guiding device 219 which moves the web in the transport direction and guides the web against the strand in the engagement area. The web guiding device 219 is configured to wrap the web around the strand during a movement of the strand in a longitudinal direction thereof. The web guiding device 219 may comprise one or more rollers 221. One or more of the rollers may be driven. Other types of guides however are conceivable as a skilled person will directly recognize. For instance, a plate-shaped guide having a curvature which increases in the transport direction may be used, for gradually folding the web 212 around the strand. Also, one or more U-shaped, segmented rollers may be used or rollers having a diabolo shape.

The web guiding device 219 may comprise a folding member 220 which is positioned at the engagement area 216 or downstream from the engagement area. The folding member 220 folds the at least one elongate strip of web material around the strand. The folding member 220 may extend partially or wholly around a main transport axis along which the strand is moved.

The web 212 is formed as at least one elongate strip 222 of web material, wherein the web guiding device 219 moves the at least one elongate strip of web material in the transport direction and guides the at least one elongate strip of web material web against the strand in the engagement area.

The strand forming device 206 is configured to move the formed strand continuously in a transport direction during the engagement of the web with the strand.

The strand forming device comprises a receiving area 224 for receiving the bamboo fibers 204 and a bamboo fibre guiding device 226 for guiding the bamboo fibers into a more compact configuration. The bamboo fibre guiding device 226 has an end 228. The bamboo fibre guiding device 226 has a V-shape but a U-shape, a generally concave shape or a tapered shape is also possible. The fibre guiding device can also be referred to as a "strand forming device".

The bamboo fibers 204 are moved aver the end 228 of the bamboo fibre guiding device. The web application device 210 applies the web in the engagement area 216 which is at least partially downstream of the end of the bamboo fibre guiding device. The bamboo fibers 204 may have the same dimensions or have different dimensions.

The bamboo fibre guiding device 226 may be a gutter or a tapered guide. The bamboo fibre guiding device 226 may be oriented downwards and may guide the bamboo fibers downward, in particular at an angle of 1-90 degrees to the horizontal, more in particular at an angle of 1-20 degrees.

The device 200 may comprise a vibrating device 230 for vibrating the bamboo fibre guiding device, in particular in a vertical and/or lateral direction 232. A different kind of vibration is also possible, for instance a circular vibration. Alternatively, the fibers may be positioned by a pick and place device, e.g. a manipulator arm which positions the fibers in the required position.

The bamboo fibers may be staggered in a random way. Alternatively, the bamboo fibers may be staggered according to a pattern, although this may be difficult.

In an alternative embodiment, the web is formed directly on the strand, for instance by electro-spinning. Other ways of forming the web directly on the strand that electro-spinning also possible.

The device 200 may comprise a heating device 234 which is positioned downstream from the engagement area 216, and in particular downstream from the folding member 220. The heating device is configured to at least partially melt the applied web, in particular the elongate strip 222 of web material, during the heating, thereby connecting the web to the strand.

The heating device 234 may be configured to at least partially melt the applied web at a temperature of between 60 and 180 degrees, preferably between 110 and 180 degrees Celsius, more preferably between 120 and 150 degrees Celsius. The heating device may comprise a coil through which an electric current is led, but other heating devices are conceivable, as the skilled person will understand.

Downstream from the heating device, the strand with the applied web has become the thread 202. If there is no heating device, the thread may be formed directly downstream from the folding member 220.

Preferably, more than 80 percent by weight, more preferably more than 90 percent by weight and even more preferably more than 99 percent by weight of the fibers are bamboo fibers. In particular, 100 percent of the fibers are bamboo fibers.

The device 200 may further comprise a compression device 236 which is positioned downstream of the engagement area. If a heating device is present the compression device may be positioned downstream of the heating device. The compression device compresses the thread 202 and ensures that the web is firmly attached to the fibers in the strand.

The compression device may also be present if no heating device is present, for instance if the web 212 is sticky or strong enough by itself to hold the strand together without being heated.

The compression device 236 may be configured to flatten the thread, and to this end comprises in particular at least one pair of rollers 238 which are pressed against one another and wherein the thread 202 is conveyed between the rollers.

The device 200 may comprise a spooling device 250 for winding the formed thread 202 onto itself or onto on a spool.

The elongate strip 222 of web material may have previously been manufactured with a web forming device 40 as disclosed further below in connection with FIGS. 56A, 56B and 56C.

The device 200 may comprise a fiber forming device 70 as disclosed herein for splitting bamboo parts into individual bamboo fibers 204, the splitting device being positioned upstream of the strand forming device. The splitting device may be configured for splitting the bamboo parts into bamboo fibers having a cross-sectional area (A) and a length (L), wherein the cross-sectional area of each bamboo fiber is between 0.005 and 0.1 mm2, more in particular between 0.01 and 0.03 mm2.

In an embodiment, the length of the bamboo fibers may be between 2 and 50 cm, in particular between 4 and 30 cm, more in particular between 7 and 25 cm.

Figure 25:
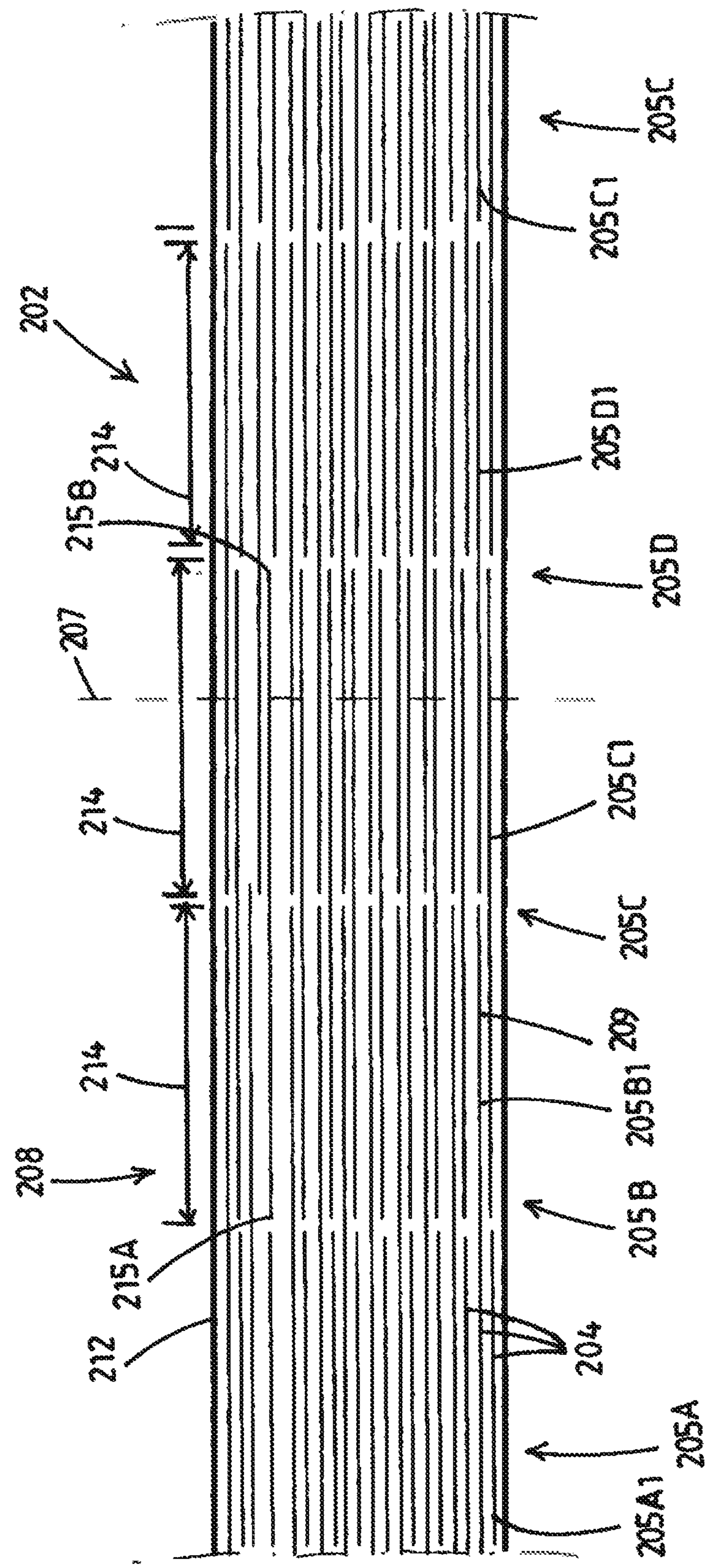
FIG. 25 shows an embodiment of the arrangement of bamboo fibers in a thread.

Turning to FIG. 25 the thread 202 may comprise a plurality of bamboo fibers 204. The bamboo fibers are grouped in groups 205A, 205B, 205C, 205D, etc., into an elongate strand 208 of bamboo fibers 204. A challenge when making the thread is to prevent weak spots from occurring in the thread.

The bamboo fibers have a cross-sectional area (A) and a length (L). The strand comprises multiple bamboo fibers 204. The bamboo fibers 204 in one group e.g. group 205B, are staggered in the longitudinal direction of the strand relative to the bamboo fibers of a next group, e.g. 205C, defining overlap areas 214. Each cross-section 207 of the thread comprises multiple bamboo fibers.

The average length of the total overlap area 214 for each fibre in the thread may be similar to the average length of the fibers, or at least 90 percent of the average length of the fibers. This will occur when a bamboo fiber 204 lies against one or more adjacent bamboo fibers over at least 90 percent of its length. This is advantageous because it results in a strong thread.

In the shown embodiment, the fibers are staggered according to a predefined pattern. In the shown pattern the fibers are grouped into groups of fibers, wherein the groups are staggered in the longitudinal direction of the strand, but the fibres 204 within a same group have a same position in the longitudinal direction of the strand relative to the other fibers in the same group.

The end portion 209 of each fiber 204 of a group lies against one or more, preferably more, end portions of fibers of a next group. FIG. 25 shows the strand 208 in 2D, but obviously when the strand 208 is regarded in 3D, each end portion 209 of a bamboo fiber 204 may be surrounded by a plurality of end portions 209 of fibers 205 which are staggered relative to the bamboo fiber in question, thereby forming multiple overlap areas 214 at a single end portion 209 of a single fiber.

In this embodiment, the overlap areas 214 in a cross section 207 are not staggered relative to the other overlap areas in the same cross-section. In this embodiment, the fibers in the group have a same length and the fibers in the strand 208 may also have a same length. The fibers of one group may also have a different length than the fibers of another group. The fibres of one group, e.g. 205B may lie in an end-to end relationship with the fibres of the second next group, i.e. group 2050.

Figure 26:
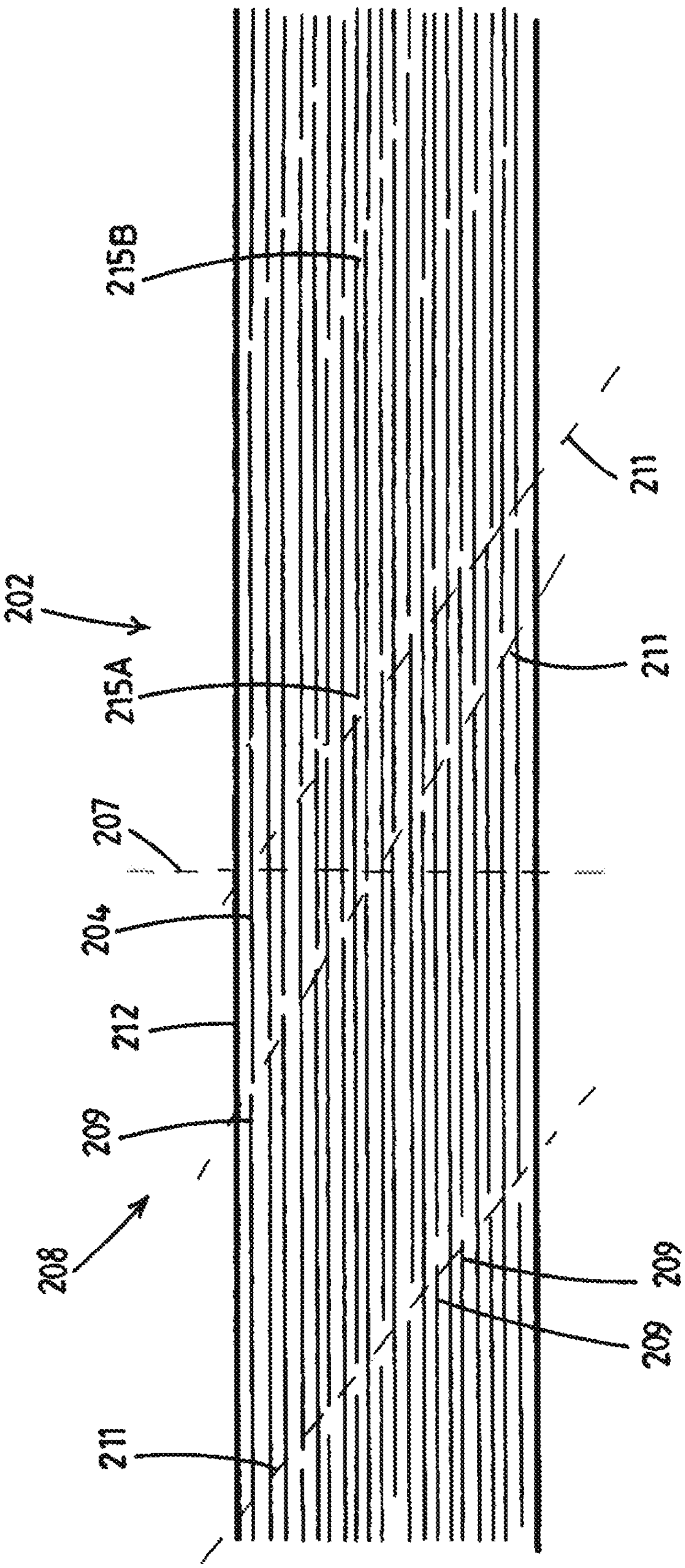
FIG. 26 shows a diagrammatic view of the arrangement of bamboo fibers in a thread according to the second aspect of the invention.

Turning to FIG. 26, different from the embodiment of FIG. 25, the fibers 204 are not grouped in groups in which the fibres within a same group have a same position in the longitudinal direction of the strand. Rather, in the embodiment of FIG. 26, the fibers may be staggered individually relative to one another. This results in a configuration in which all the fibers in any cross section are staggered relative to all other fibres in the cross section, or at least a large percentage (e.g. at least 80 percent, preferably at least 90 percent) of the fibers in a cross-section 207 is staggered relative to the other fibers 204 in a same cross section 207.

The embodiment of FIG. 26 may have less potential weak spots than the embodiment of FIG. 25.

In this embodiment, the overlap areas 214, i.e. at least 80 percent, preferably at least 90 percent which are present in a cross section 207 are also staggered relative to one another. Obviously, there may be a practical limit. Statistically, given the large number of bamboo fibers which are used in practice some bamboo fibers may have a same length and may be arranged in a same longitudinal position and may even lie adjacent to one another somewhere in the strand even without this being intentional. Therefore, some overlap areas may coincide in the longitudinal direction.

In this embodiment the fibers may have a same length or have different lengths. The step of making the fibers by splitting bamboo parts may result in fibers 204 having different lengths. It could result in significant waste material if all these fibers would need to be cut to the same length, and this would also require an extra processing step. Therefore, the embodiment of FIG. 26 may result in less waste than the embodiment of FIG. 25, because all the fibers obtained in the fiber forming step or at least a large portion of the obtained fibers may be used.

This may be done without any loss of strength in the thread relative to the embodiment of FIG. 25. The resulting thread may be even stronger, because the fibers are not grouped into groups in which fibers from the same group have a same position in the longitudinal direction.

In the embodiment of FIG. 26, a pattern in the fibers is still visible, because the end portions 209 of the fibers are staggered in a more or less ordened or organized way, shifting over a similar distance in the longitudinal direction, as indicated by the dashed lines 211. Different patterns are obviously possible. The dashed line 211 may for instance have an arrow shape, wherein the point of the arrow coincides with a main longitudinal axis of the thread.

Figure 27:
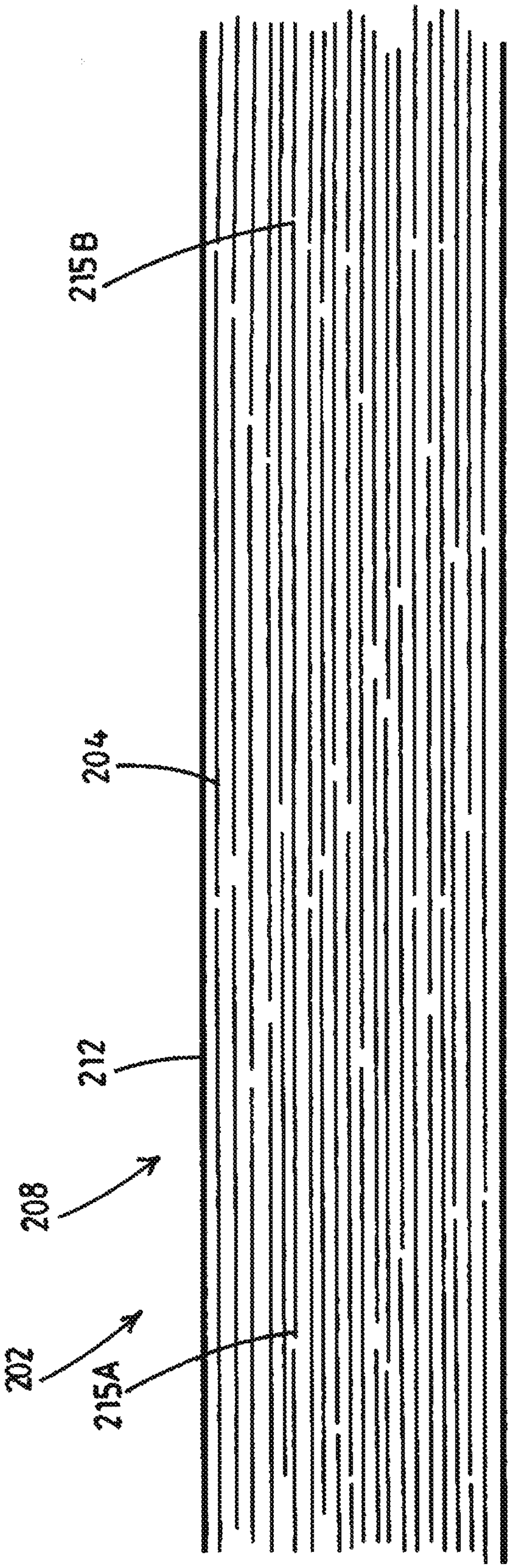
FIG. 27 shows a diagrammatic view of another arrangement of bamboo fibers in a thread according to the second aspect of the invention.

Turning to FIG. 27, in another embodiment the fibers are arranged in the strand without any order, i.e. in a or more or less random configuration. This is currently the preferred option. The fibers may have different lengths. This embodiment has an advantage that the chance that a weak spot will occur as a result of a coincidence of many end portions of fibers being located in a same longitudinal location in the strand in combination with relatively short areas of overlap may further decrease. This embodiment also has an advantage that the fibers can be formed into a strand more easily, because a specific configuration is not required. In case of plural longitudinal threads next to each other, weak spots will be evenly distributed. The fibers can for instance simply be deposited into the gutter. Naturally, the rate at which the fibers are deposited and the rate at which they are conveyed may be controlled to create a strand of a required thickness.

The thread comprises a web 212 which extends around the strand, wherein the web has an open structure and comprises multiple openings.

The bamboo fibers 204 in the thread may not be braided but may extend substantially parallel (i.e. unidirectional) to one another. Obviously the bamboo fibers need not be exactly parallel for the strand to have sufficiently high strength. The skilled person will understand that the invention also works with braided bamboo fibers, although braiding the bamboo fibers requires an extra step which may be quite difficult, in particular for relatively short bamboo fibers. It may also be possible to provide a (small) portion of the bamboo fibers in braided form, e.g. 10 percent, and to not braid the rest of the fibers.

In an embodiment, the fibers may have an average length L, and the lengths of the fibers may vary according to a distribution pattern, the distribution pattern having a standard deviation a of less than 0.5 L, in particular less than 0.3*L.

A cross-sectional area of the thread 202 may comprise between 5 and 500 bamboo fibers, in particular between 10 and 300 bamboo fibers.

The cross-sectional area of each bamboo fiber 294 may be between 0.005 and 0.1 mm2, more in particular between 0.01 and 0.03 mm2.

The individual bamboo fibers may have a width of 50-400 μm, in particular 100-200 μm, more in particular about 150 μm.

The length of the bamboo fibers may be between 4 and 50 cm, in particular between 4 and 30 cm, more in particular between 7 and 25 cm.

The thread 202 may have a cross-sectional area of 0.1-100 mm2, preferably 0.2-40 mm2, more preferably 0.5-20 mm2, and in particular between 1 and 5 mm2.

The thread may have a diameter 266 of 1-5 mm.

Figure 28:
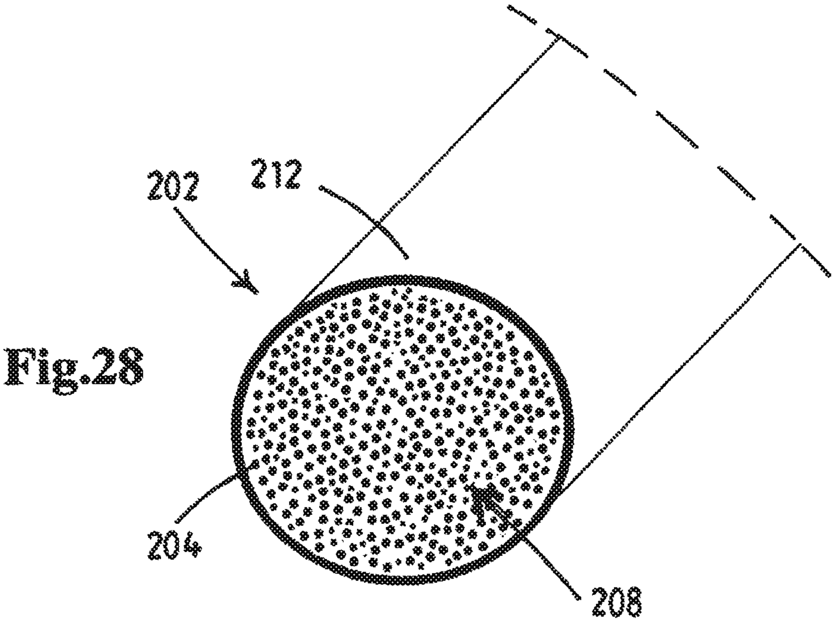
FIGS. 28, 29 and 30 show cross-sections of a bamboo thread according to the second aspect of the invention.
Figure 29:
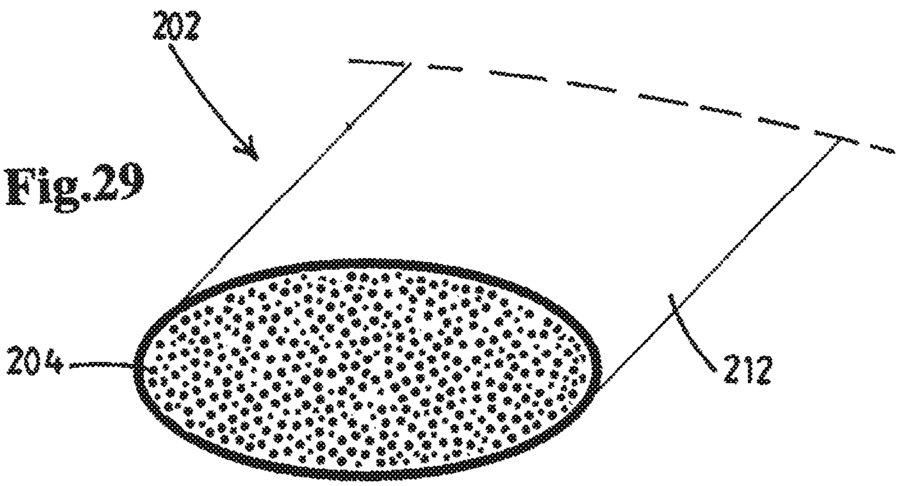
Figure 30:
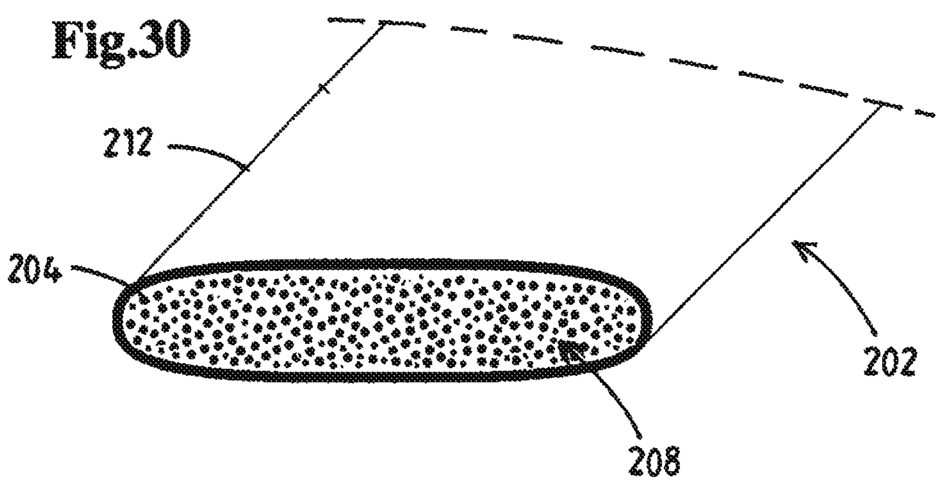
Figure 31:
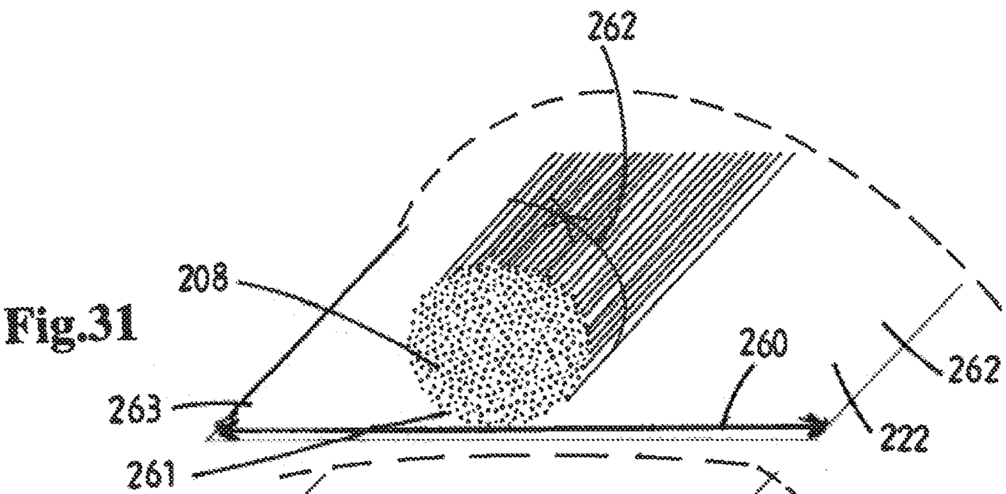
FIGS. 31 through 35 show an embodiment of applying a web onto a strand of bamboo fibers.
Figure 32:
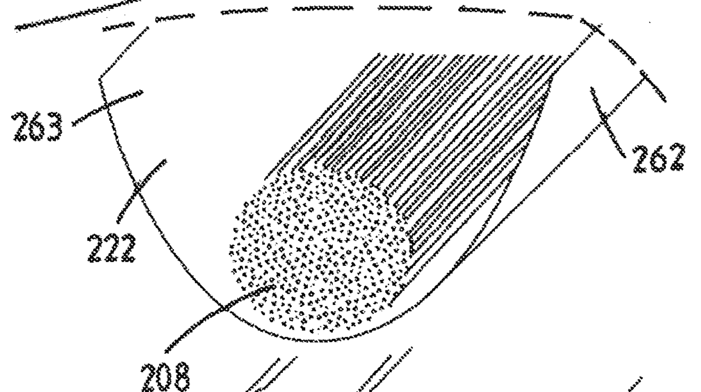
Figure 33:
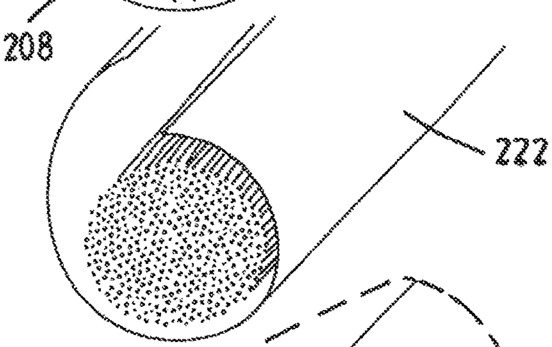
Figure 34:
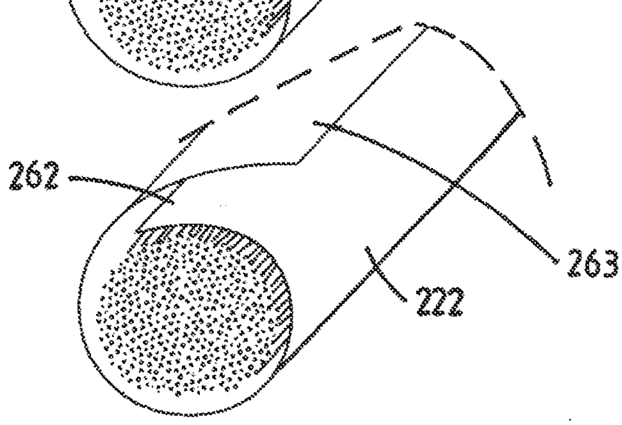
Figure 35:
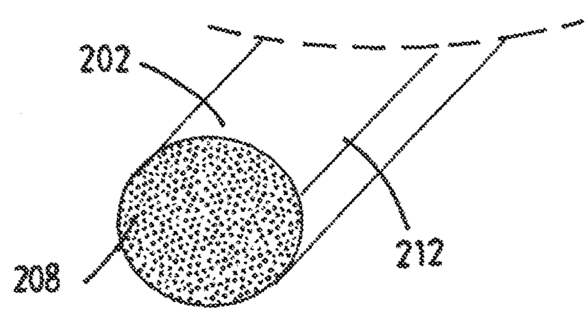
Figure 36:
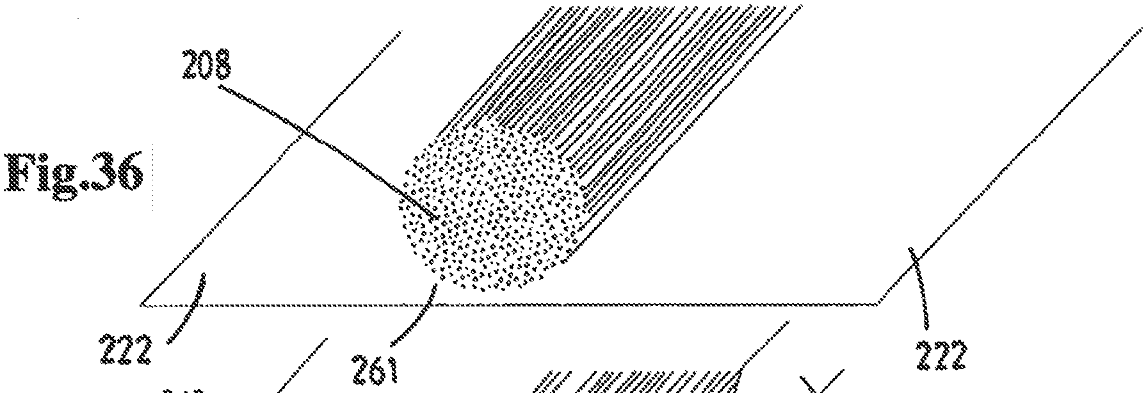
FIGS. 36 through 40 show a further embodiment of applying a web onto a strand of bamboo fibers.
Figure 37:
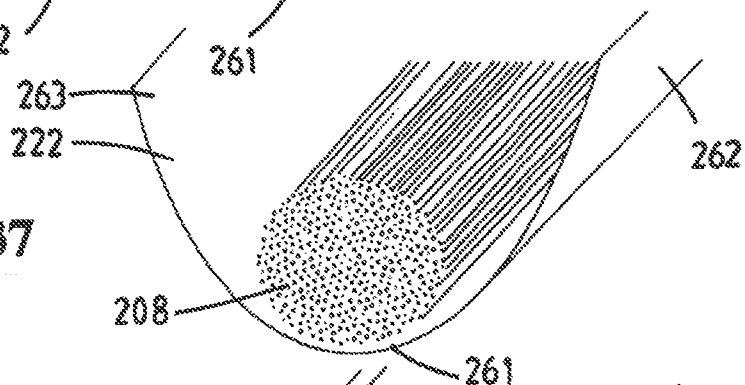
Figure 38:
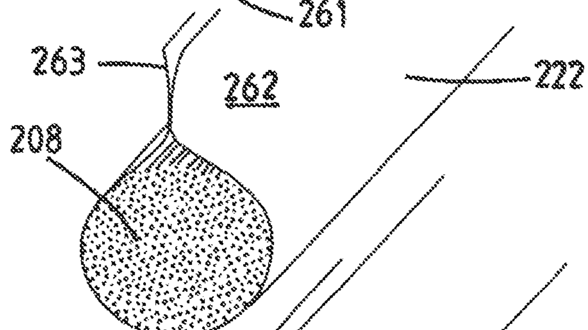

Turning to FIGS. 28, 29 and 30, the thread 202 may have a circular cross-section (FIG. 28), an oval cross-section (FIG. 29) or a flat cross section (FIG. 30). Obviously other cross sectional shapes are also possible.

The formed thread 204 may have a cross-sectional area of 0.1-100 mm2, preferably 0.2-40 mm2, more preferably 0.5-20 mm2. The cross-sectional area of the strand may comprise between 10 and 500 bamboo fibers.

Turning to FIGS. 31-35, in an embodiment, a single elongate strip 222 of web material may be wrapped around the strand 208.

A width 260 of the elongate strip 222 may be greater than a circumference 262 of the strand 208. During the wrapping of the web around the strand a central portion 261 of the elongate strip contacts the strand.

Figure 53:
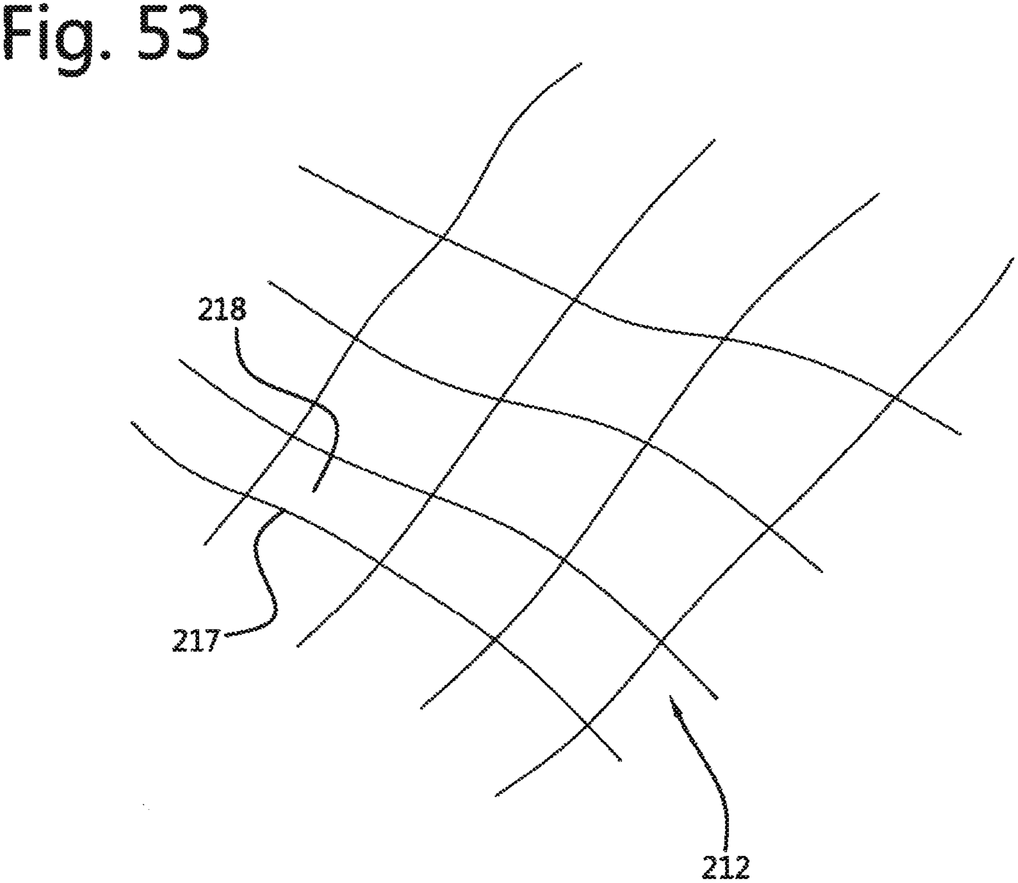
FIG. 53 shows a diagrammatic close-up view of the web.

Turning to FIG. 53, the web 212 is shown in detail. The web may comprise multiple fine threads 217 which are created with electro-spinning. The fine threads may have a diameter of less than 50 μm, in particular less than 30 μm. The web 212 may be more than 90 percent open, in particular more than 94% open, i.e. the openings 218 form more than 90 percent, in particular more than 94 percent of the surface of the web 212. This allows resin to easily enter the strand 208 which is enveloped by the web 212 and also allows the resin to enter the spaces between the bamboo fibers, for interconnecting the bamboo fibers.

Figure 55:
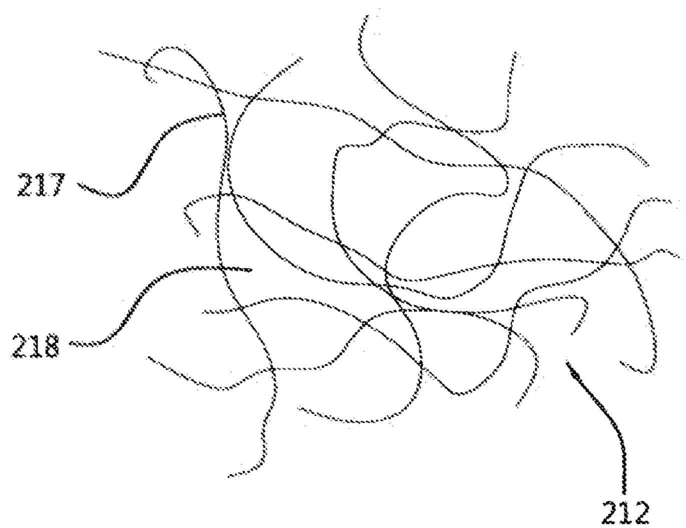
FIG. 55 shows a diagrammatic close-up view of the web.

FIG. 53 shows the web with square openings, but with electro-spinning the threads may be deposited in a curly way, resulting in an irregular pattern. This is shown in FIG. 55. In both these embodiment, the web is a non-woven. However, it is also possible to provide a woven web around the strand, wherein the woven web has sufficiently large openings. Such a web may be of very fine woven thread which is woven with a very open structure.

Figure 54:
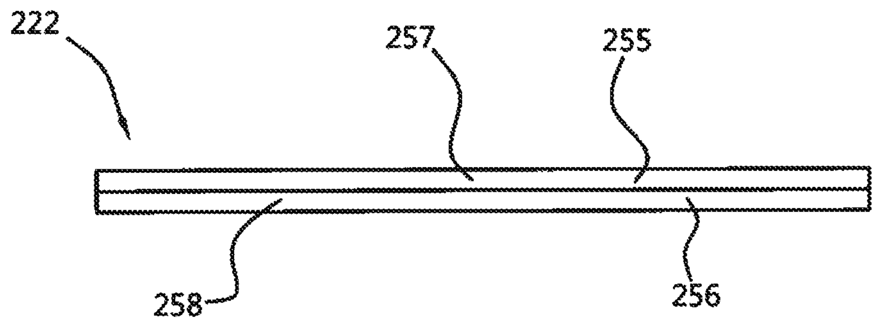
FIG. 54 shows a diagrammatic cross-sectional view of a web having two layers.

Turning to FIG. 54, in an embodiment, the elongate strip 222 of web material comprises at least a first material 255 having a first melting temperature and a second material 256 having a second melting temperature, wherein the first melting temperature is lower than the second material melting temperature, and wherein the heating is performed at or above the first melting temperature but below the second melting temperature, wherein the first material melts but the second material does not melt, and wherein the first material connects the second material to the strand of bamboo fibers.

The first melting temperature may be between 60 and 180 degrees Celsius preferably between 110 and 180 degrees Celsius, more preferably between 120 and 150 degrees Celsius and the second melting temperature may be between 130 and 250 degrees, preferably between 160 and 200 degrees Celsius.

The elongate strip 222 of web material may comprise a first layer 257 and a second layer 258, the first layer comprising the first material and the second layer comprising the second material. Obviously, comprising means in this context that the elongate strip 222 may also comprise more than two layers 257, 258. Each layer 257, 258 may have a regular pattern as shown in FIG. 53 but also an irregular pattern as shown in FIG. 55.

The first and second layer may be connected to one another prior to being applied onto the strand, but may also not be connected to one another, but still from an elongate strip. It is also possible that the first and second layer are applied separately on the stand, for instance consecutively as separate elongate strips 222, each elongate strip having a single layer wherein the elongates strips are applied consecutively. Obviously, more than two elongate strips may be applied consecutively on the strand. Also multiple elongate strips may be applied consecutively, each elongate strip having multiple layers.

The first layer 257 may form an inner layer which engages the strand and the second layer 258 may form an outer layer around the strand, at least prior to melting of the first layer. This improves the connection between the second layer and the strand, because the first layer forms an adhesive, connecting the second layer to the strand.

Figure 56A:
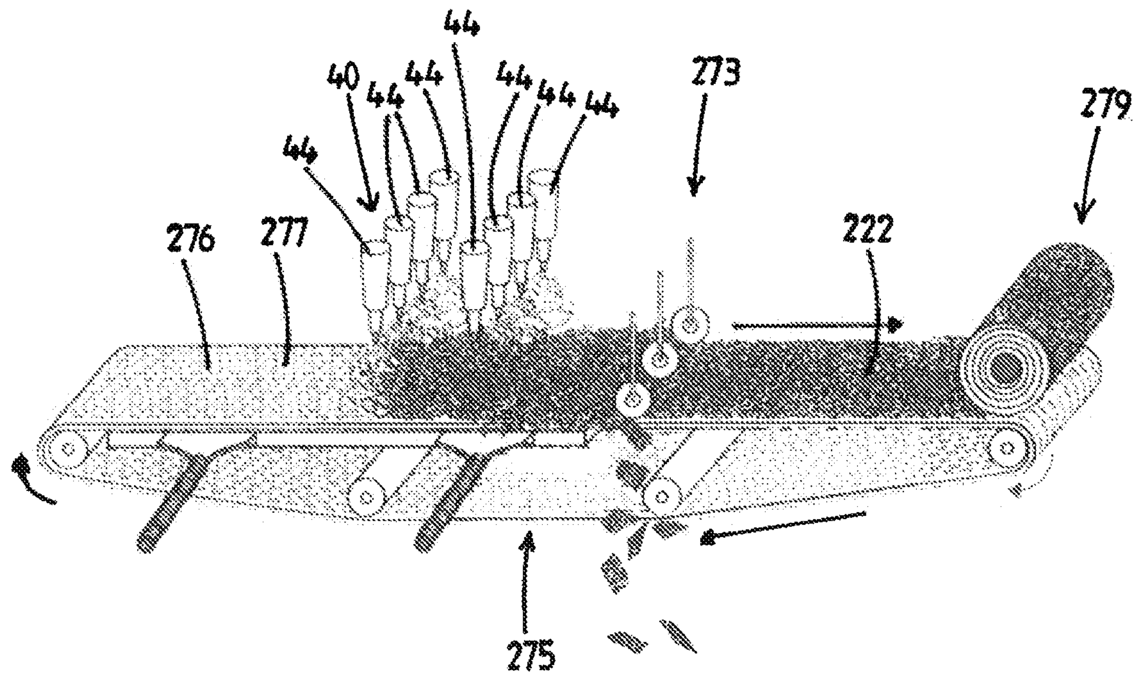
FIGS. 56A and 56B show diagrammatic views of a device for making an elongate strip of web material.
Figure 56B:
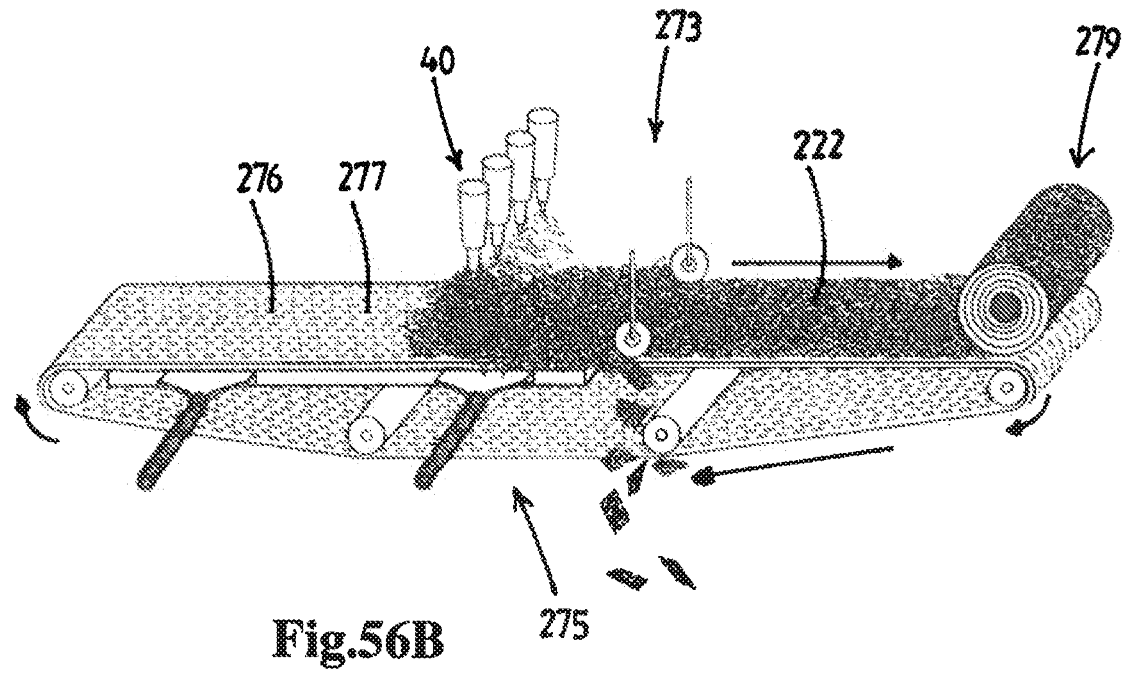
Figure 56C:
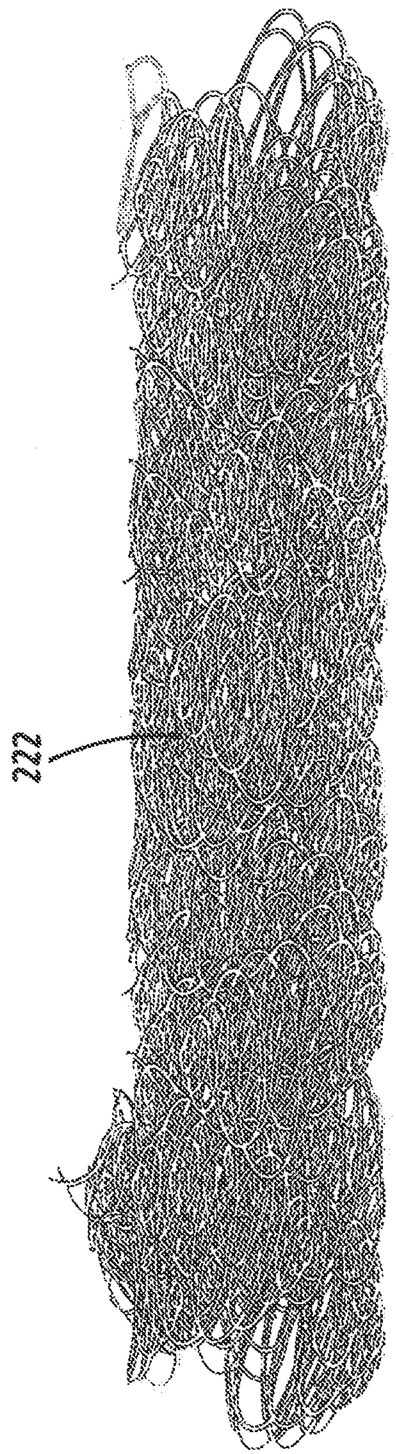
FIG. 56C shows an elongate strip of web material

Turning to FIGS. 56A and 56B, the elongate strip 222 of web material may have previously been manufactured with strip forming device 273 comprising a web forming device 40 which may in particular be an electrospinning device. To this end, the device 200 may comprise the strip forming device 273, wherein the strip forming device 273 is arranged separately from the strand forming device and the web application device and is configured to form the elongate strip 222 prior to the wrapping step.

The strip forming device 273 comprises a belt conveyor 275 having a belt 276 which forms a moving depositing surface 277. The web forming device 40 may comprise one or multiple thread forming elements 44 arranged above the belt conveyor 275. The elongate strip 222 is formed on the belt 276. FIG. 56C shows the elongate strip 222.

When the elongate strip has hardened to a sufficient degree it is taken from the belt or guided away from the belt and spooled onto a spool 274 or onto itself with a spooling device 279. This may be continuous process.

The spool 274 with the elongate strip 222 can then be used in the device 200 shown in FIG. 24. Instead of electrospinning, extrusion with extrusion nozzles 44 or spraying with spraying nozzles 44, similar to the embodiments of FIGS. 1C and 1D is also possible.

Turning to FIGS. 36-40, in an embodiment, a single elongate strip 222 of web material may be wrapped around the strand 208 in a different way.

Figure 39:
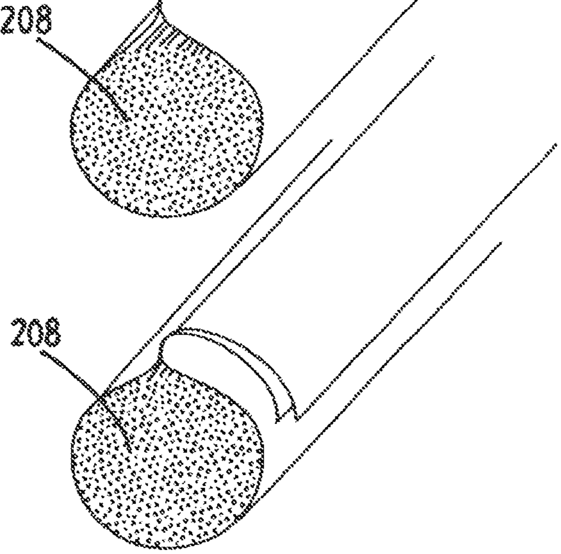
Figure 40:
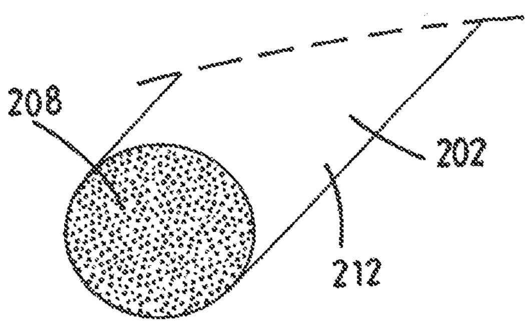
Figure 41:
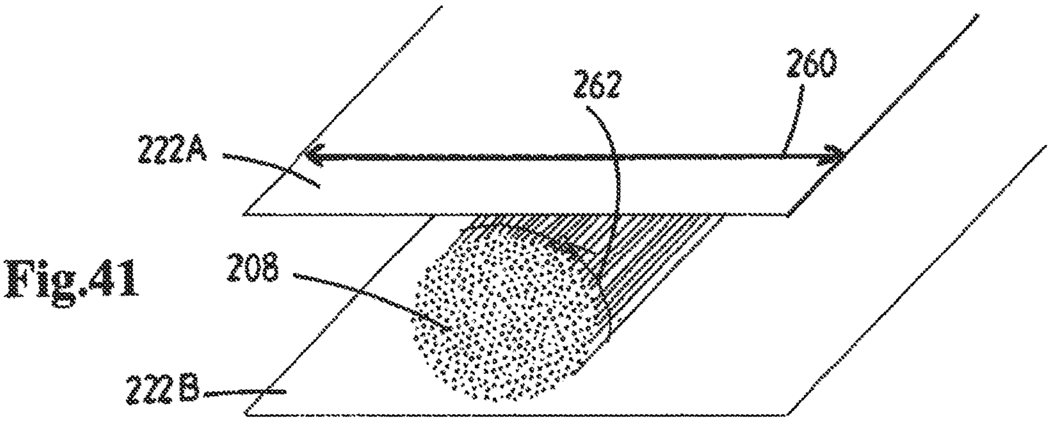
FIGS. 41 through 45 show another embodiment of applying a web onto a strand of bamboo fibers.
Figure 42:
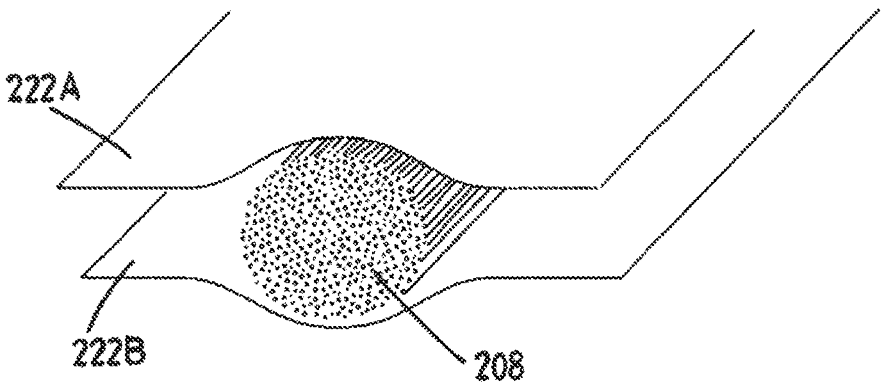
Figure 43:
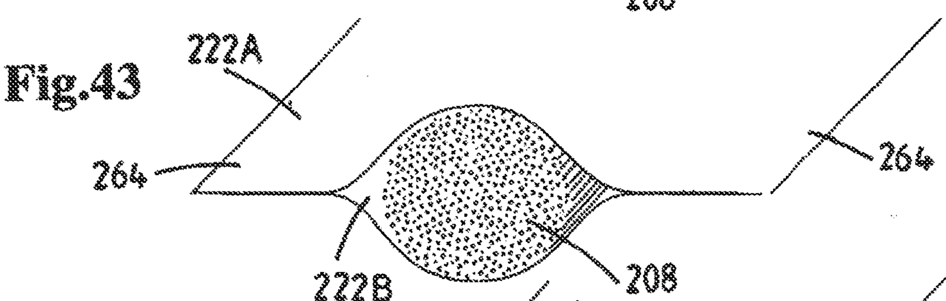
Figure 44:
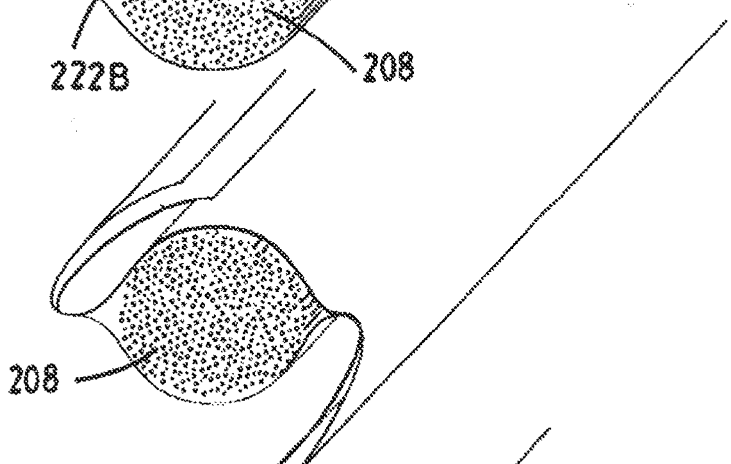
Figure 45:
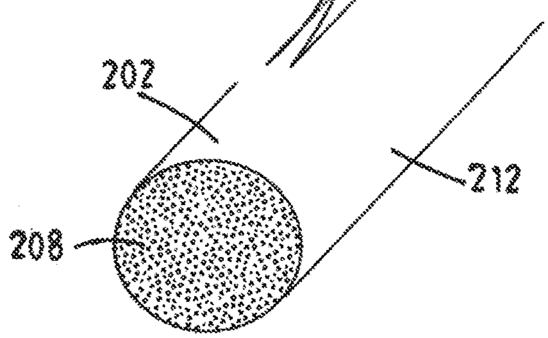

A right side 262 and a left side 263 of the elongate strip of the web contact one another and are subsequently folded onto the strand, see FIG. 39.

Turning to FIGS. 41-45, the device 200 may be configured to press multiple, i.e. at least two, elongate strips 222A, 222B of web material against the strand at the engagement area and to fold the at least to elongate strips around the strand of bamboo fibers.

The multiple strips 222A, 222B may be pressed against different sides of the strand 208 and may be connected to one another via overlap portions 264. The overlap portions may be folded against the strand see FIG. 44.

In this embodiment, the width 260 of the elongate strips may be greater than half of the circumference 262 of the strand 208, wherein two overlap portions are formed and wherein the overlap portions are folded against the strand.

Figure 46A:
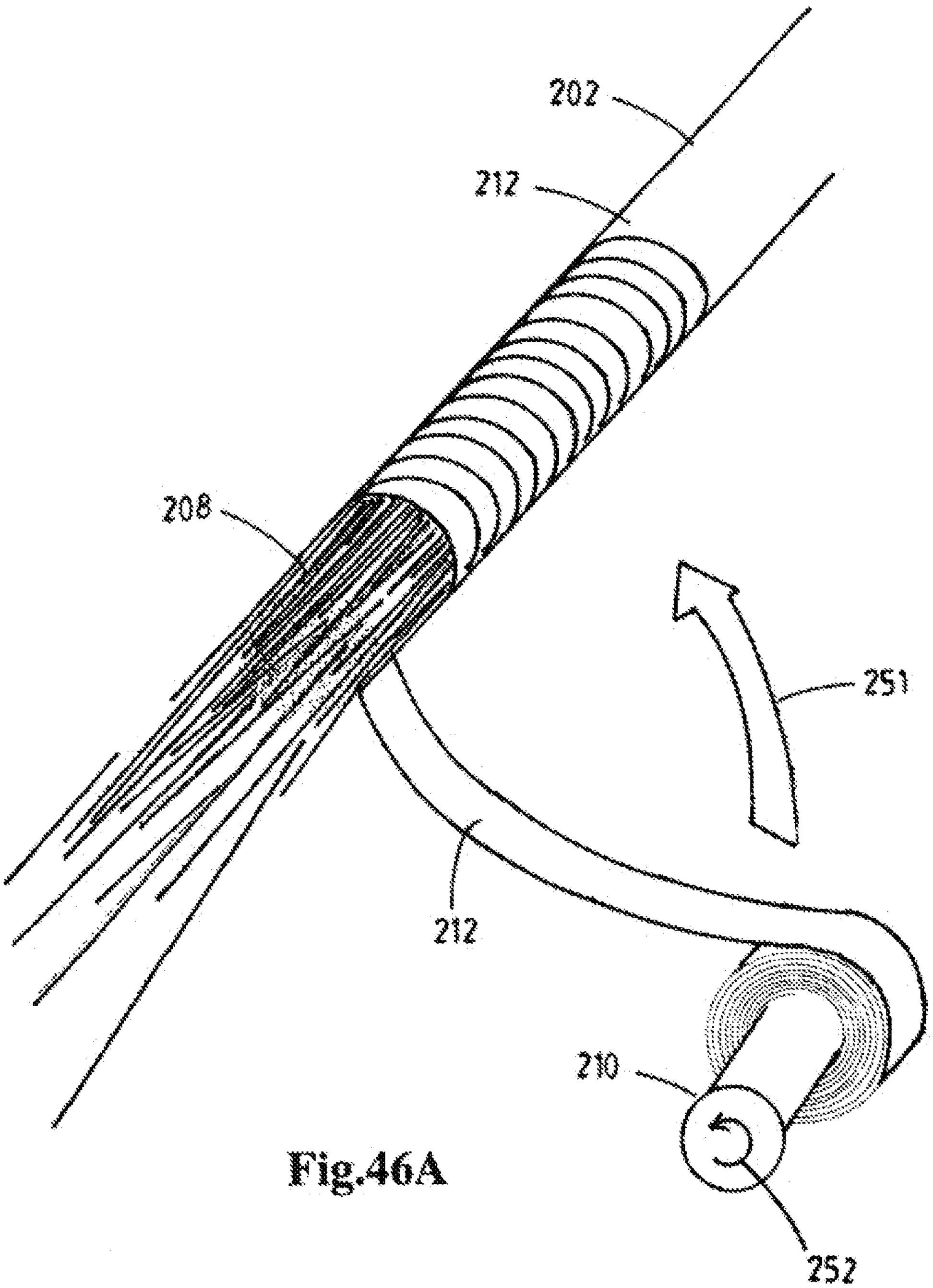
FIG. 46A shows another embodiment of applying a web onto a strand of bamboo fibers.

Turning to FIG. 46A, the web application device 210 may be configured to wind at least one elongate strip 222 around the strand 208 in a helical manner as indicated by the arrows 251, 252. The strand 208 may be moved in the transport direction T during the winding.

The elongate strip 222 may be wound around the strand at the engagement area 216, in particular downstream from the end 228 of the fibre guiding device and upstream from the heating device 234. A folding member 220 may not be necessary for this embodiment.

Figure 46B:
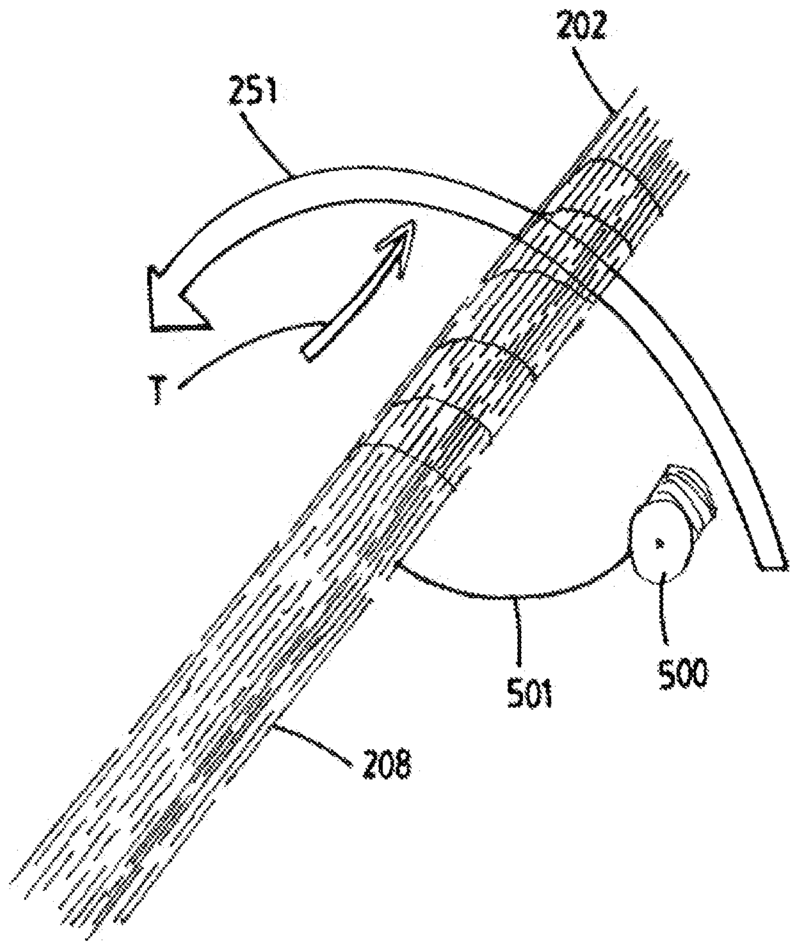
FIG. 46B shows an embodiment in which a thread is wound around the strand.

Turning to FIG. 46B in a similar way a binding thread 501 may be wound around the strand in a helical manner with a winding device 500. The strand 208 may be moved in the transport direction T during the winding. The binding thread 501 may result in a thread 202 which is less strong, and some of the ends of the fibers may stick out of the thread or even become separated from the thread, but in some application this may not be a problem, for instance if the thread is impregnated in a bath directly after the winding step, or if a lower quality of thread is acceptable or even desired. In other applications the thread 202 with binding thread 501 may also be suitable.

The binding thread 501 may be wound around the strand 208 at the engagement area 216, in particular downstream from the end 228 of the fibre guiding device and upstream from the heating device 234. A folding member 220 may not be necessary for this embodiment.

Figure 47A:
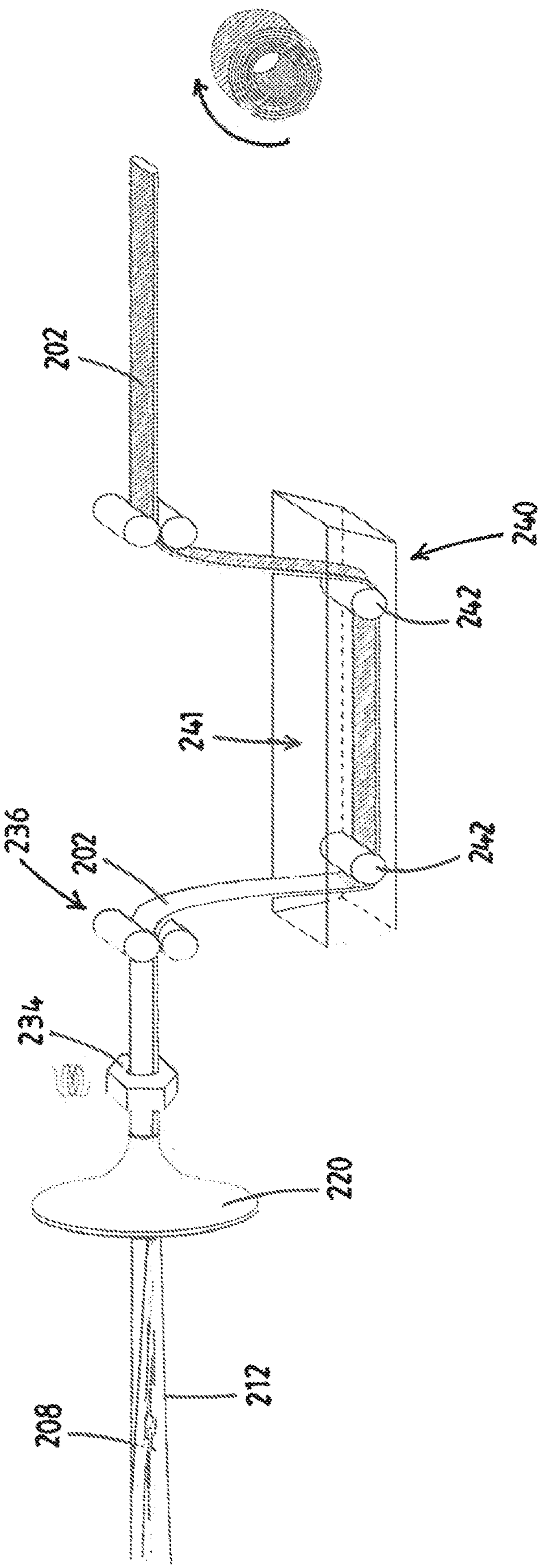
FIG. 47A shows another embodiment of a device according to the second aspect of the invention.

Turning to FIG. 47A, the device 200 may comprise a bath 240 which is positioned downstream of the engagement area 216, in particular downstream of the heating device 234, and in particular downstream of the compression device 236. The bath holds a liquefied material 241. The device comprises one or more guides 242 to guide the strand with the applied web through the bath in order to impregnate the strand and the applied web with the liquefied material in the bath.

The liquefied material may comprise a thermoplastic material which is heated in order to become liquid or a thermosetting material. The thermoplastic material may be chosen from a group comprising: polyethylene, polypropylene, PA6, PA12 and biobased thermoplastics like Solany, PLA, lignine, pectine, cellulose, polylactocapron etc. However, the skilled person will understand that other materials are possible.

In case of a thermosetting material, the impregnated thread 202 should be stored at a low temperature to prevent the thermosetting material from setting prior to use.

Figure 47B:
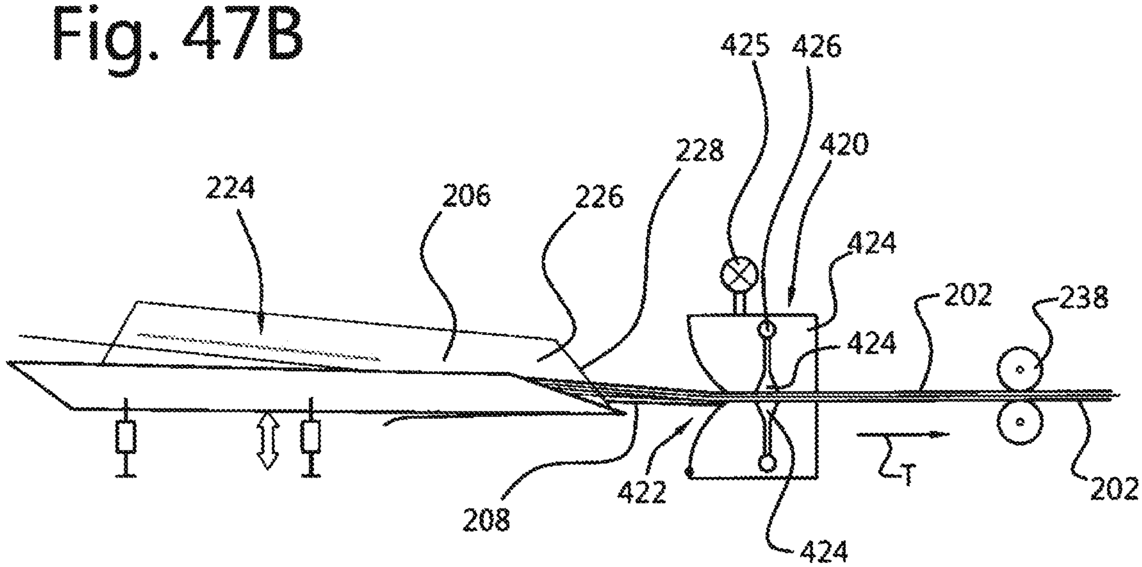
FIG. 47B shows another embodiment of a device according to the second aspect of the invention.

Turning to FIG. 47B, in another embodiment, a coating and/or impregnating material may be applied onto and possibly into the strand in a coating/impregnating device 420. The coating/impregnating device 420 may be positioned directly downstream from the strand forming device 206. The strand may be guided through a narrow opening 422 of a coating die 424. The coating die may apply the coating material or impregnating material onto the strand via internal nozzles 424 inside the die which are in fluid communication with a source 425 of coating material via a channel 426. The coating or impregnating material may enter the spaces between the individual fibers 204.

When the coating or impregnating material hardens, the strand with the hardened coating applied onto it and applied in the spaces between the bamboo fibers becomes the thread 202. The coating or impregnating material may for instance be a thermoplast material or a thermoset material or a different suitable coating or impregnating material. In this case, the coating/impregnating device 420 may replace both the web application device 210 and the bath 240 as discussed above. The overall production method may be simpler.

Applying a coating may have a disadvantage that the thread 202 is less permeable than in case a web or binding thread is applied to the thread. This would make the thread 202 less suitable for several applications further downstream for instance an infusion process in a vacuum bag. For this reason this currently is not the preferred method for most applications. However, this embodiment may for instance be suitable to provide impregnated thread 202 for pre-preg applications, see FIG. 50 and the description associated with FIG. 50 below.

In an alternative embodiment, the coating/impregnating device 420 may be combined with the web application device and be positioned downstream from the web application device. Alternatively or additionally, the coating/impregnating device 420 may be combined with the winding device 500 for winding a binding thread 501 around the strand 208.

In this embodiment, the web 212 and/or the binding thread 501 is first applied onto the strand 208, and the coating/impregnating device 420 subsequently coats/impregnates the strand with the web 212 applied to it and/or binding thread 501 wound around the strand.

Figure 58:
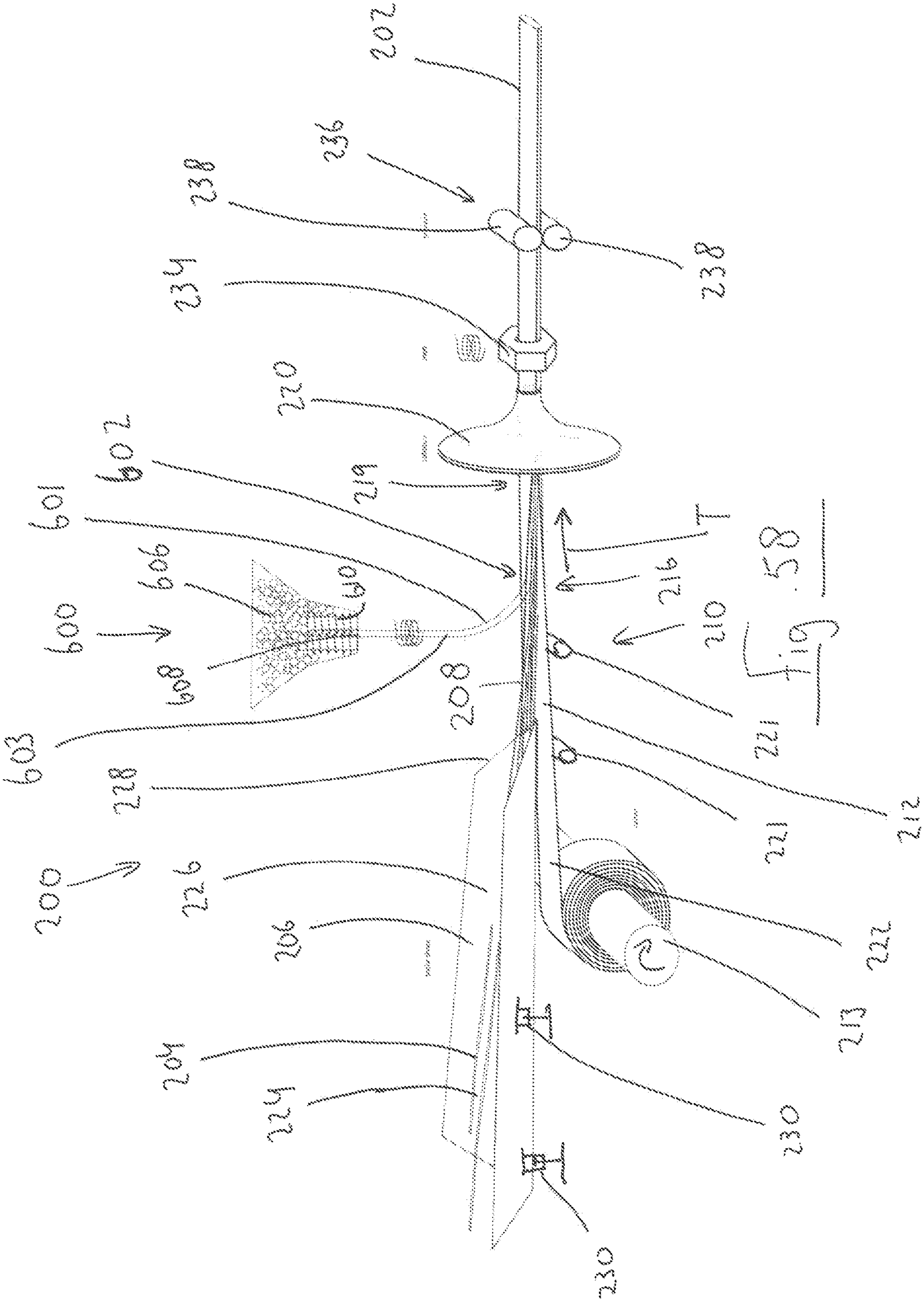
FIG. 58 shows a schematic view of another embodiment of a device for manufacturing a thread comprising bamboo fibers.

Turning to FIG. 58, another embodiment of a device 200 for making a thread 202 comprising bamboo fibers 204 is shown. This embodiment is quite similar to the embodiment shown in FIG. 24, but comprises a resin supply device 600 which supplies resin 601 to the formed strand at a resin supply location 602. In the embodiment of FIG. 58, the resin supply location 602 is positioned upstream of the heating device 234.

The resin supply location 602 is also positioned upstream of the folding member 220. However, it is conceivable that the resin supply device 600 is integrated with the folding member 220. In an alternative embodiment, the resin supply device 600 may be integrated with the heating device.

The resin supply location 602 can be upstream from engagement area 216 where the web material 222 contacts the strand 208, at engagement area 216 where the web material 222 contacts the strand 208, or just downstream from the engagement area 216 where the web material 222 contacts the strand 208.

The supplied resin 601 can be supplied in the form of a molten, softened or solid thread 603. The resin supply device 600 may comprise a hopper 606 filled with resin and a nozzle 608 out of which the resin flows. The hopper may comprise a heating element 610, for instance at the nozzle, for liquefying or softening the resin. The resin heating device 610 may comprise an electric coil.

The resin supply device 600 may be configured to supply the resin onto the strand from above.

The resin supply location 602 may be located downstream from the end 228 of the bamboo fibre guiding device 226. This will prevent the bamboo fiber guiding device 226 from becoming sticky as a result of remnants of resin. However, the resin supply device may be positioned upstream of the end 228 of the bamboo fiber guiding device 226 if provisions are made to mitigate a risk that due to stickiness of bamboo fiber guiding device 226, the bamboo fibers are hindered. For instance if the bamboo fiber guiding device 226 is oriented at a very steep angle, stickiness may not become an issue. Also, the thread 603 of resin may be laid on top of the strand so that the thread 603 does not contact the bamboo fiber guiding device 226.

However, preferably the resin supply location 602 is just downstream from the engagement area 216 where the web contacts the strand and just upstream from the folding member 220 where the web is folded around the strand 208.

The resin supply device 600 supplies resin 601 to the formed strand 208 of bamboo fibers prior to the forming of a thread 202 from the strand 208. The resin can be a thermoplastic or thermosetting material as is known in the prior art. In an embodiment, the thermoplastic material is chosen from a group comprising: polyethylene and polypropylene, PA6, PA12 and bio-based thermoplastics, e.g. Solany, PLA, lignine, pectine, cellulose, polylactocapron. These materials were found to be very suitable in further processing steps of manufacturing composite products. Examples of thermosetting materials may be polyester, vinylester, epoxy. The skilled person will understand that many other materials may be used.

The supplied resin is subsequently enveloped by the web 212 and ends up between the bamboo fibers 204 and within the web 212 which is folded around the strand 208.

During the heating by the heating device 234, the supplied resin is liquefied or at least softened, and flows between the individual bamboo fibers 204. The supplied resin becomes mixed with the individual bamboo fibers 204. This mixing may be further enhanced by the compression device 236 which may be positioned downstream from the heating device 234.

The resulting thread 202 comprises a strand 208 of bamboo fibers 204 mixed with resin 601 and the web 212 folded around it.

Instead of the web 212 or in addition to the web 212, a binding thread 501 may be wound around the strand or a coating may be applied onto the strand.

This thread 202 can be applied in subsequent processing steps for forming products quite easy. Because the thread 202 already comprises resin, a step of adding extra resin can be left out or becomes less critical for achieving desired strengths and stiffness. For instance, this thread 202 can be used in a filament winding without adding extra resin or with less resin during the filament winding process. This embodiment can also be seen as an alternative to the embodiment shown in FIG. 47A, which comprises a bath 240 downstream of the heating device 234, It is possible to combine these variants, i.e. to incorporate both a resin supply device 600 and a bath 240.

Figure 59:
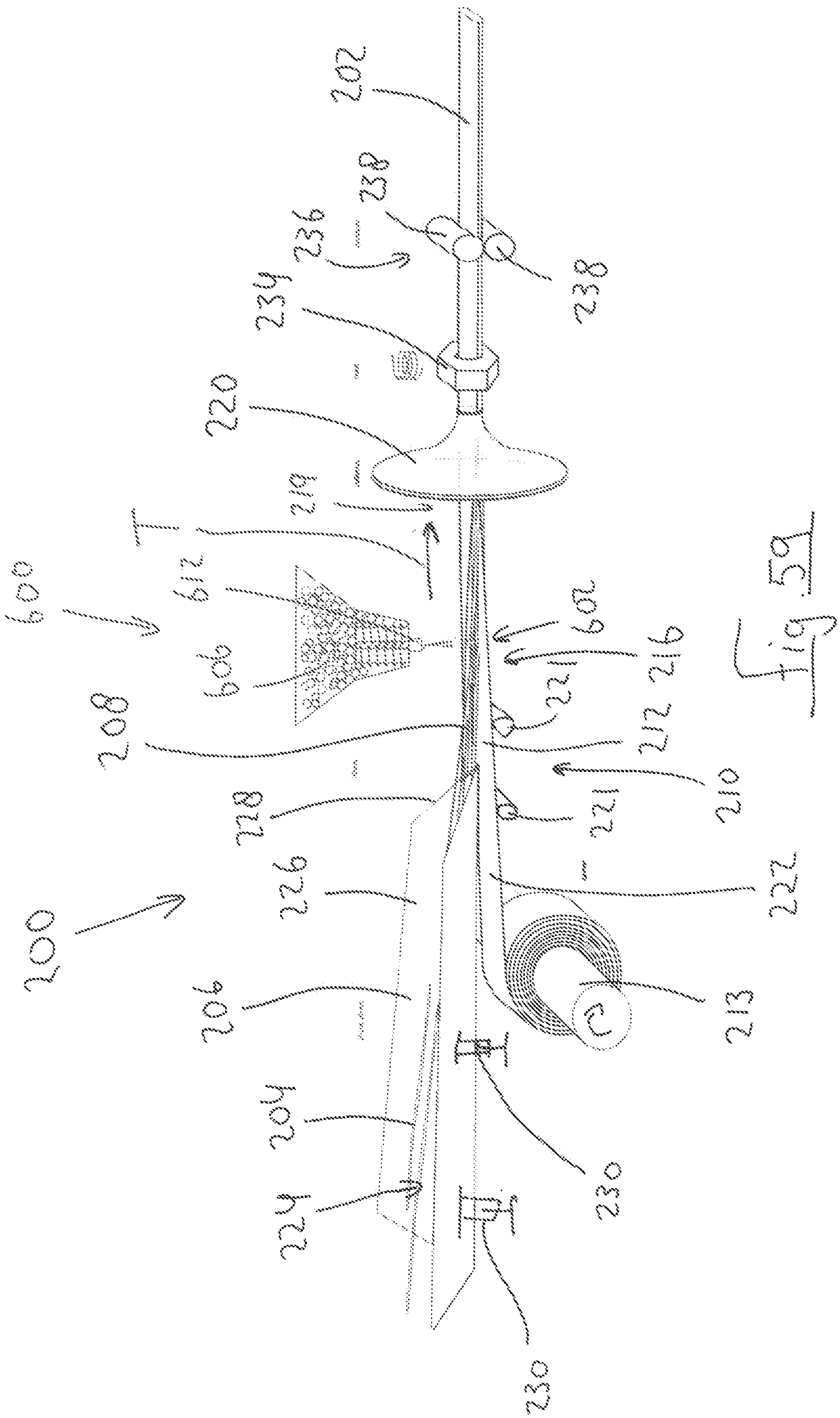
FIG. 59 shows a schematic view of yet another embodiment of a device for manufacturing a thread comprising bamboo fibers.

Turning to FIG. 59, another embodiment of the device 200 for making a thread comprising bamboo fibers is shown which is quite similar to the embodiment of FIG. 58. However, instead of applying the resin as a thread 603, the resin 601 is sprayed onto the bamboo fibers 204 upstream of the heating device 234, and in particular upstream of the folding member 220. To this end, the resin supply device comprises a spray nozzle 612.

Similar to the embodiment of FIG. 58, the resin supply location 602 can be just downstream from the engagement area 216. In particular resin supply location 602 can be just downstream from the engagement area 216 at a location where the web 212 is still relatively flat and extends substantially horizontally on either side of the strand 208. In this embodiment, any sprayed resin which is sprayed to the left and right of the strand 208 is deposited on the web 212, which is subsequently folded around the strand by the folding member.

In a further alternative variant, fibers of resin may be applied onto the receiving area 224 together with the bamboo fibers 204. The bamboo fibers and resin fibers together form a strand around which the web 212 is folded. This variant may also be combined with the variant of FIG. 46A or FIG. 46B, i.e. bamboo fibers and resin fibers are combined into a strand 208 and a web 212 or binding thread 501 is subsequently wound around the strand.

Figure 60:
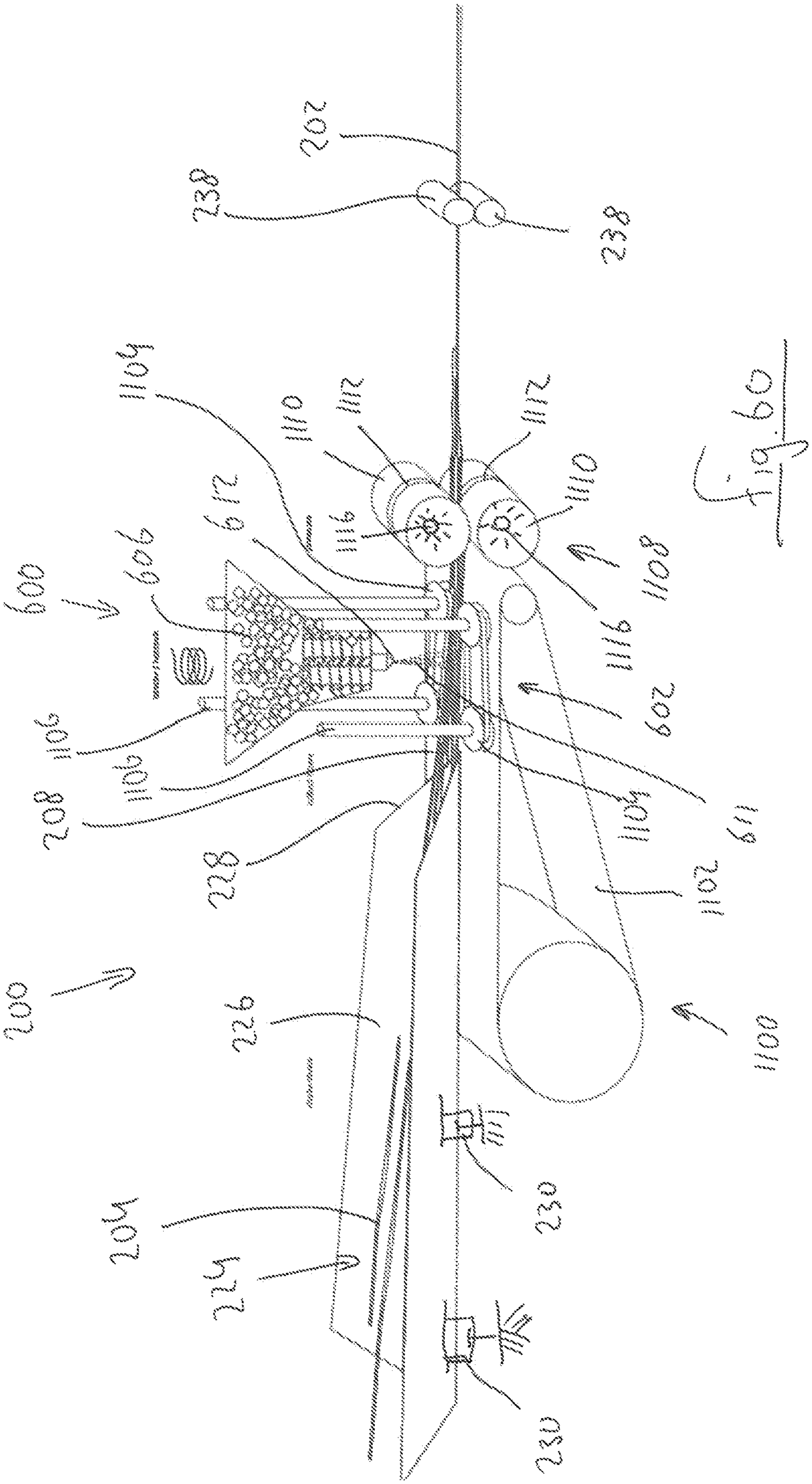
FIG. 60 shows a schematic view of yet another embodiment of a device for manufacturing a thread comprising bamboo fibers.

Turning to FIG. 60, another embodiment of a device 200 for manufacturing a thread from bamboo fibers is shown. The embodiment is configured to make a thread without a web material. The strand 208 leaves the strand forming device 206 and is sprayed from above while temporarily being supported by a conveyor 1100, in particular comprising a conveyor belt 1102. It is noted that in the embodiment of FIG. 60, the conveyor is positioned downstream from the strand forming device. However, in a further variant the conveyor 1100 can also perform the function of a strand forming device, which makes it possible to leave out the gutter.

Horizontal guides 1104 may be positioned above the conveyor for further guiding the strand 208 and urging the fibers of the strand into a more compact formation. The horizontal guides 1104 may be driven rollers, or tracks, or non-driven rollers or tracks. Each horizontal guide 1104 may comprise an axle 1106 which extends upwards. The axle 1106 allows rotation of the horizontal guide while ensuring that the horizontal guide maintains a small distance to the conveyor underneath the horizontal guide.

A resin supply device 600 supplies resin 601 to the formed strand 208 above the conveyor 100. The resin supply device can be configured to spray the resin 601 in small particles 612 or can be configured to provide resin in the form of a thread 603. The resin can be any thermoplastic or thermosetting resin.

Downstream from the resin supply device 600, a curing and compressing device 1108 is provided. The curing and compressing device 1108 comprises two rollers 1110. Each roller comprises a groove 1112. The grooves 1112 are positioned opposite to one another and together define a passage for the strand 208 with the added resin.

Inside at least one roller and preferably inside both rollers, a UV-lamp 1116 is arranged. The wall which defines the groove 1112 is transparent to UV-light. The strand 208 with the added resin travels through the curing and compressing device 1108 and during the passage, the resin 602 is cured with the UV-light. Curing with UV light has a number of advantages. It is quite fast and allows good control of the process, in particular control of a degree of the openness (or closedness) of the formed thread.

It is noted that instead of rollers 1110, tracks with UV-lamps inside them are also possible. Also, multiple rollers 1110 may be provided, wherein the strand is cured and compressed sequentially multiple times. For instance three or four pairs of rollers 1110 or tracks may be provided. Each roller may have a groove and/or a UV-lamp inside them.

Downstream from the curing and compressing device 1108, further rollers 238 may be provided to flatten the formed thread 202, in particular to an oval or flat shape. These rollers may be provided with UV-lamps as well.

The thread may be formed with a wide range of fibers in a cross section for instance 5-20 fibers. However, it is also possible to produce thicker thread having more fibers in a cross-section.

Method of Producing a Thread Comprising Bamboo Fibers

In operation, the method comprises:

arranging the bamboo fibers 204 into an elongate strand 208 of bamboo fibers, wherein the strand comprises multiple bamboo fibers, wherein the bamboo fibers are staggered in the longitudinal direction of the strand, wherein the bamboo fibers define overlap areas 214, and wherein the overlap areas are staggered, and providing a web 212 around the strand 208, wherein the web has an open structure and comprises multiple openings.

The thread 202 may be formed as an endless thread in a continuous process. Alternatively, the process may be a start-stop process with a takt time and a takt distance, wherein each time the strand 208 is moved forward over a distance and then stopped. The web 212 may be applied during the stop time or during the moving time.

The bamboo fibers may be deposited on a bamboo fibre guiding device 226 and form a strand on the bamboo fibre guiding device 226

The bamboo fibre guiding device 226 has an end 228, and the bamboo fibers are moved over the end, wherein the web 212 engages the strand at an engagement area 216 downstream of the end.

The web 212 may be formed as at least one elongate strip 222 of web material which engages the strand at the engagement area 216.

The strand 208 may be moved continuously in a transport direction T during the engagement of the web 212 with the strand.

A folding member 220 may be positioned at the engagement area 216 or downstream from the engagement area 216. The folding member folds the web around the strand. The folding member 220 extends partially or wholly around a main transport axis along which the strand is moved.

The web 212 may be at least partially melted with the heating device 234 which is positioned downstream from the engagement area, and in particular downstream of the folding member during the heating, thereby connecting the web to the strand. However, other types of connection of the web to the strand 208 are conceivable such as with an adhesive application device.

If a compression device 236 is positioned downstream of the heating device, the compression device compresses the thread and reinforces the connection between the web 212 and the strand 208.

The compression device 236 may flatten the thread, and to this end may comprise in particular at least one pair of rollers 238 which are pressed against one another. The thread is conveyed between the rollers.

The cross-sectional area of each bamboo fiber 204 may be between 0.005 and 0.1 mm2, more in particular between 0.01 and 0.03 mm2. The length of the bamboo fibers may be between 2 and 50 cm, in particular between 4 and 30 cm, more in particular between 7 and 25 cm.

The bamboo fibers 204 have a substantially square, rectangular, round or flat cross sectional shape. This may be the result of splitting a bamboo part with the fiber forming device 70. After the splitting, the bamboo fibers may be cleaned with a cleaning device, for instance with a cleaning device 300 as disclosed herein. The cleaning device performs a "combing" action on the fibers in order to remove non-fibrous bamboo material, in particular parenchyma.

Figure 57:
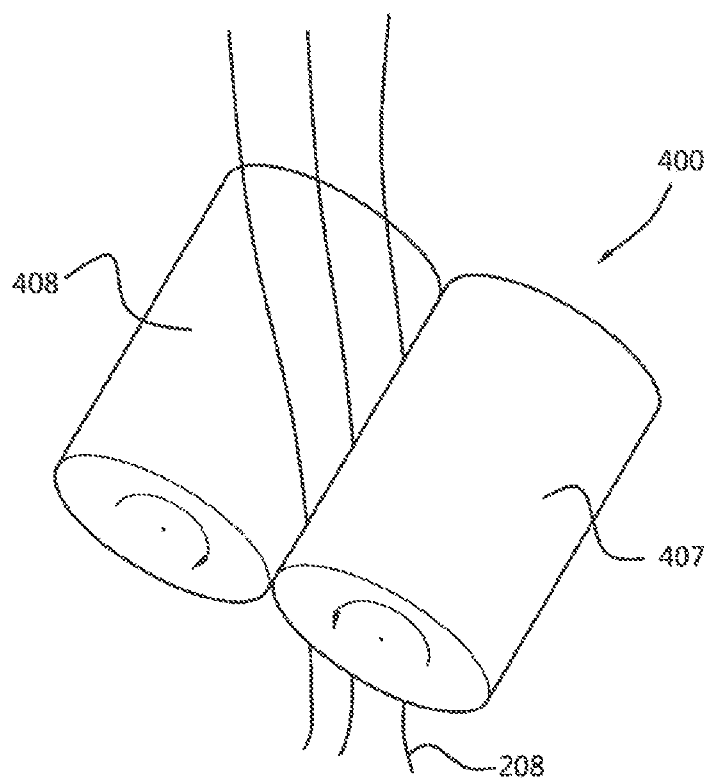
FIG. 57 shows a schematic view of a flattening device.

Turning to FIG. 57, prior to the cleaning with the cleaning device 300, the bamboo fibers 204 may be flattened with a flattening device 400. The flattening device may comprise two rollers 407, 408 at least one of which is driven. The rollers 407, 408 are pressed against one another. The fibers 204 are guided between the rollers and flattened by the rollers. The flattening results in relatively flat fibers 204, i.e. fibers having a width which is greater than 3 times the height, possible greater than 5 times the height. The flattening step also opens the bamboo fibers, making it easier to subsequently clean the bamboo fibers and to remove the parenchyma.

It is also possible to only clean the fibres, i.e. without flattening or to only flatten the fibres, i.e. without cleaning.

The individual bamboo fibers may have a width of 50-400 μm, in particular 100-200 μm, more in particular about 150 μm.

The web 212 may have been previously manufactured with electro-spinning. This may have taken place prior to the wrapping step and in a separate process. Alternatively, the web is made directly onto the strand 208, for instance with electrospinning. The web may also be made by spraying adhesive onto the strand 208 with a spraying device.

The web 212 may be connected to the bamboo fibers 204 via a molten material.

The web material has an open structure and comprises multiple openings. The web material may be provided as an elongate strip 222 of web material. The elongate strip 222 of web material may comprise at least a first material having a first melting temperature and a second material having a second melting temperature, wherein the first melting temperature is lower than the second material melting temperature. These may for instance be different thermoplastic materials.

The first melting temperature is between 60 and 180 degrees, preferably between 110 and 180 degrees Celsius, preferably between 120 and 150 degrees Celsius and the second melting temperature is between 130 and 250 degrees, preferably between 160 and 200 degrees Celsius.

The elongate strip 222 of web material may comprise a first layer and a second layer, the first layer comprising the first material and the second layer comprising the second material. Alternatively, the two materials may be mixed or otherwise provided together.

The heating device 234 melts the first material but not the second material. The second material maintains its web configuration. The first (melted) material connects the second material to the strand 208.

Returning to FIG. 47, the thread 202 is impregnated with a thermoplastic material or a thermosetting material. The thread may be impregnated with a thermoplastic material which liquefies at a temperature greater than 100 degrees Celsius, in particular greater than 140 degrees Celsius. The thermoplastic material may be chosen from a group comprising: polyethylene, polypropylene, PA6, PA12 and biobased thermoplastics like Solany, PLA, lignine, pectine, cellulose, polylactocapron etc. The skilled person will understand that other thermoplastic materials may also be used and that even other materials than thermoplastic or thermosetting materials may be used.

Figure 48:
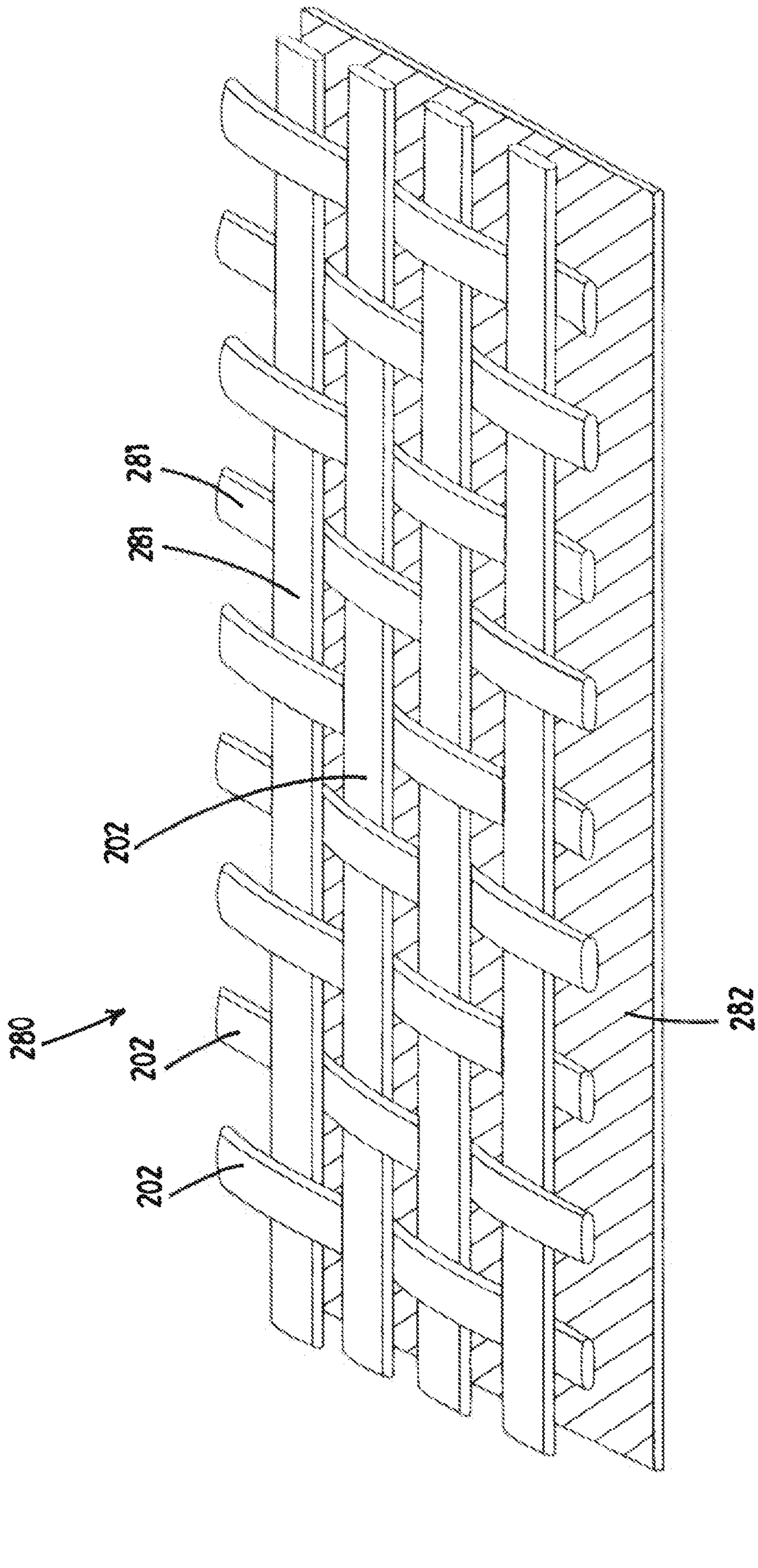
FIG. 48 shows an embodiment of a flat piece according to the second aspect of the invention.

Turning to FIG. 48, multiple sections 281 of thread 202 of bamboo fiber may be formed into a flat piece 280 comprising multiple thread sections 281, wherein the threads are connected to one another.

The thread section 281 may be woven and may extend in different directions. The distance between thread sections extending in one direction may be between 0 and 50 mm.

Additionally the thread section 281 may be connected to one another with a foil 282 or other connecting member, such as a thread of a different material. The foil 282 may be a foil of a thermoplastic material. When the flat piece is used for making a composite product, the thermoplastic material may be heated, forming molten material which impregnates the thread sections. The foil may also be a thermosetting material. In that case the flat piece should be stored at a low temperature to prevent the thermosetting material from setting prior to usage.

Figure 49:
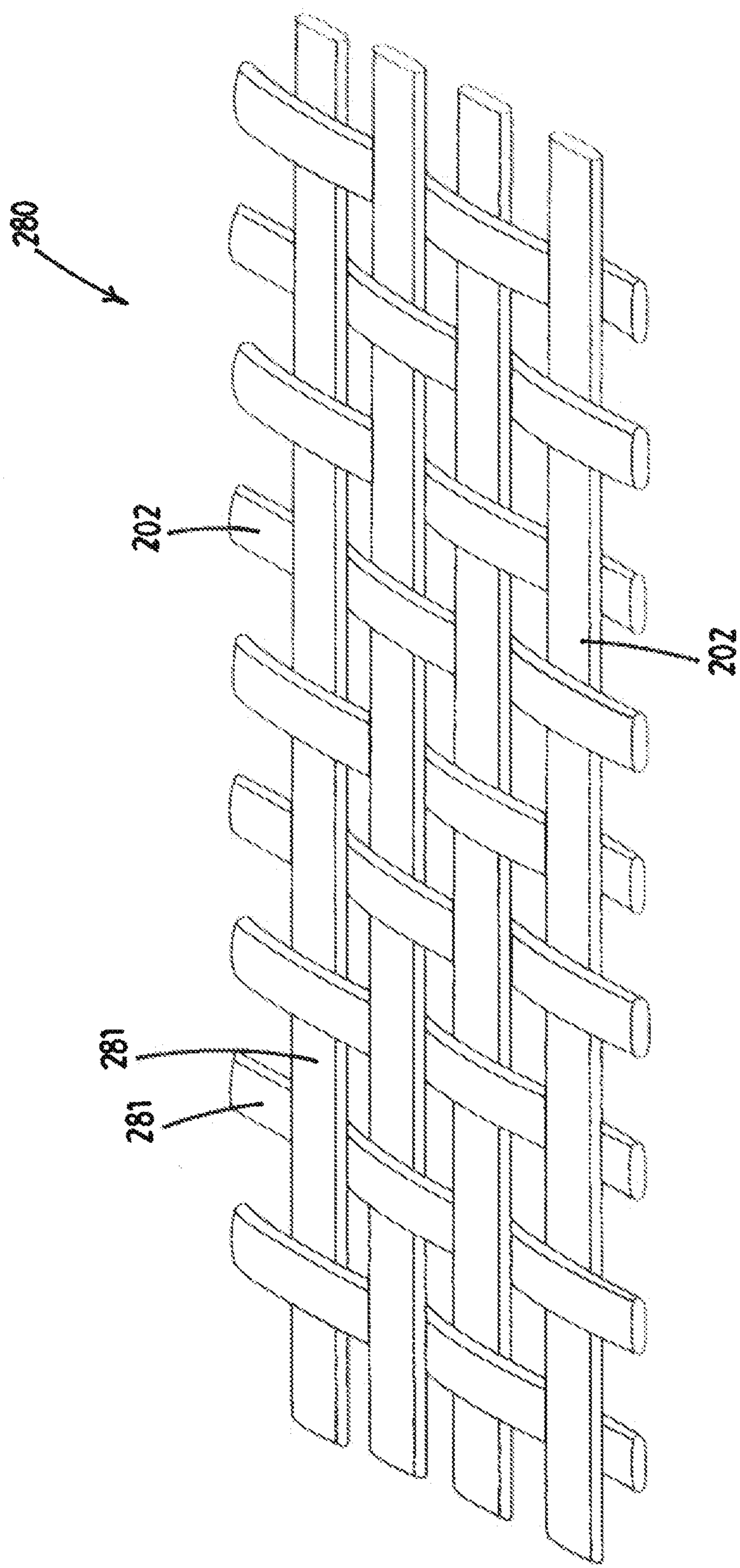
FIG. 49 shows another embodiment of a flat piece according to the second aspect of the invention.

Turning to FIG. 49, the thread sections 281 may also just be woven without being guided through a bath 240 or otherwise impregnated. (preform). The distance between thread sections extending in one direction may be between 0 and 50 mm. The flat piece 280 may be supported by a carrier material for further handling. The flat piece 280 may be applied in several layers when making a composite product.

Figure 50:
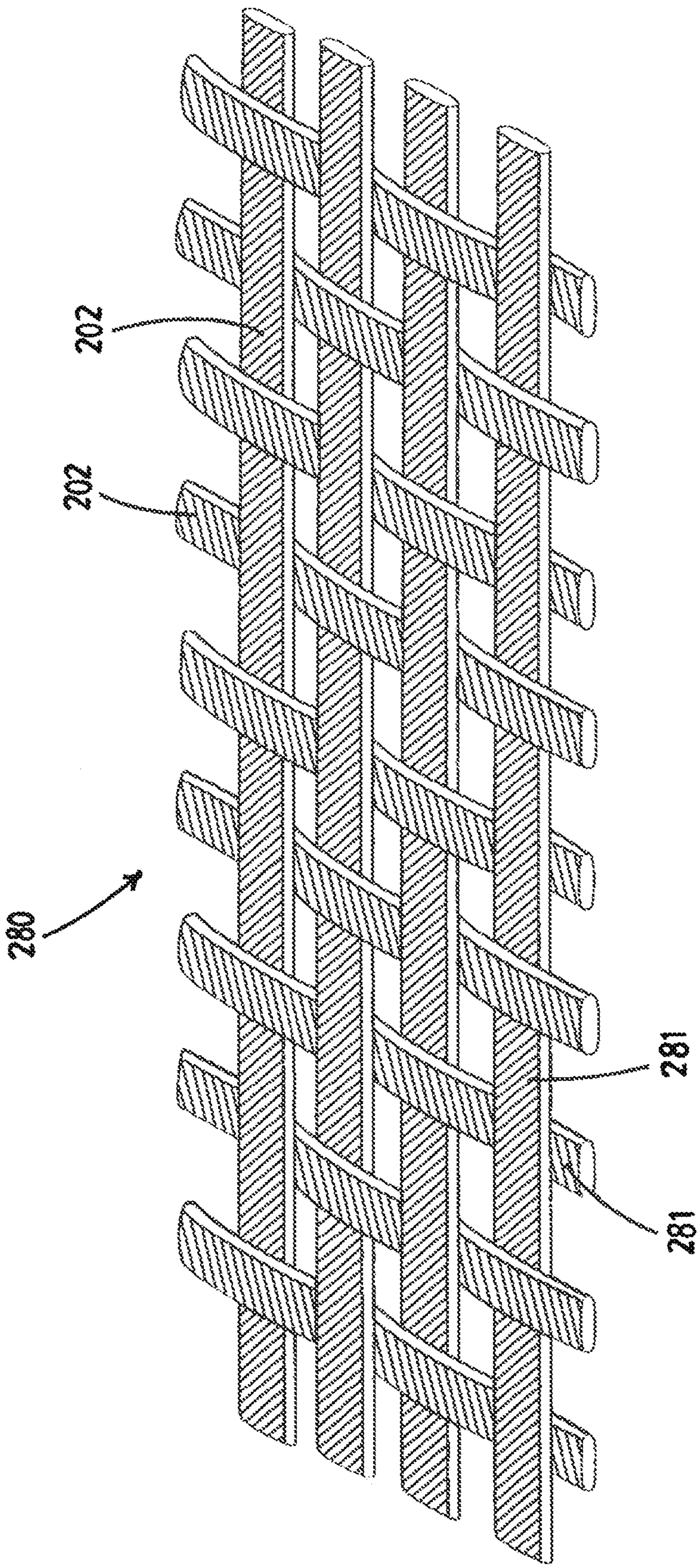
FIG. 50 shows a further embodiment of a flat piece according to the second aspect of the invention.

Turning to FIG. 50, the thread sections 281 may be impregnated. The threads may have been impregnated with a hot melt material (for instance in the bath 240 or in the coating/impregnating device 420 as described above) or a different material, i.e. prior to cutting the thread 202 in sections. The flat piece forms a pre-preg piece from which a composite product can be made directly. The distance between thread sections extending in one direction may be between 0 and 50 mm.

Figure 51:
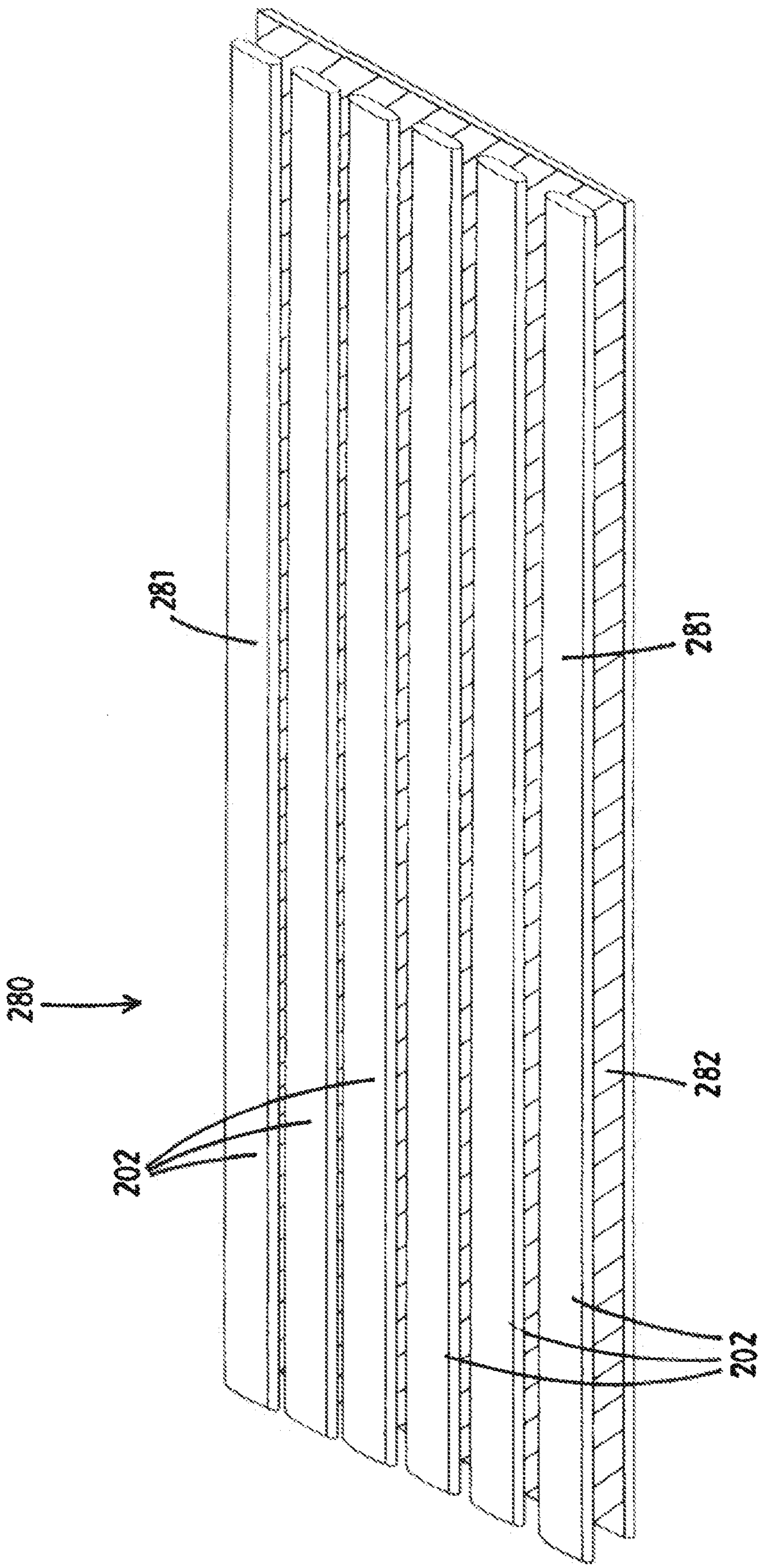
FIG. 51 shows an embodiment of a flat piece piece according to the second aspect of the invention.

Turning to FIG. 51, the threads may extend unidirectional and may in that case be connected to one another with a foil (282) or other connecting member. The distance between the thread sections may be between 0 and 50 mm.

Figure 52:
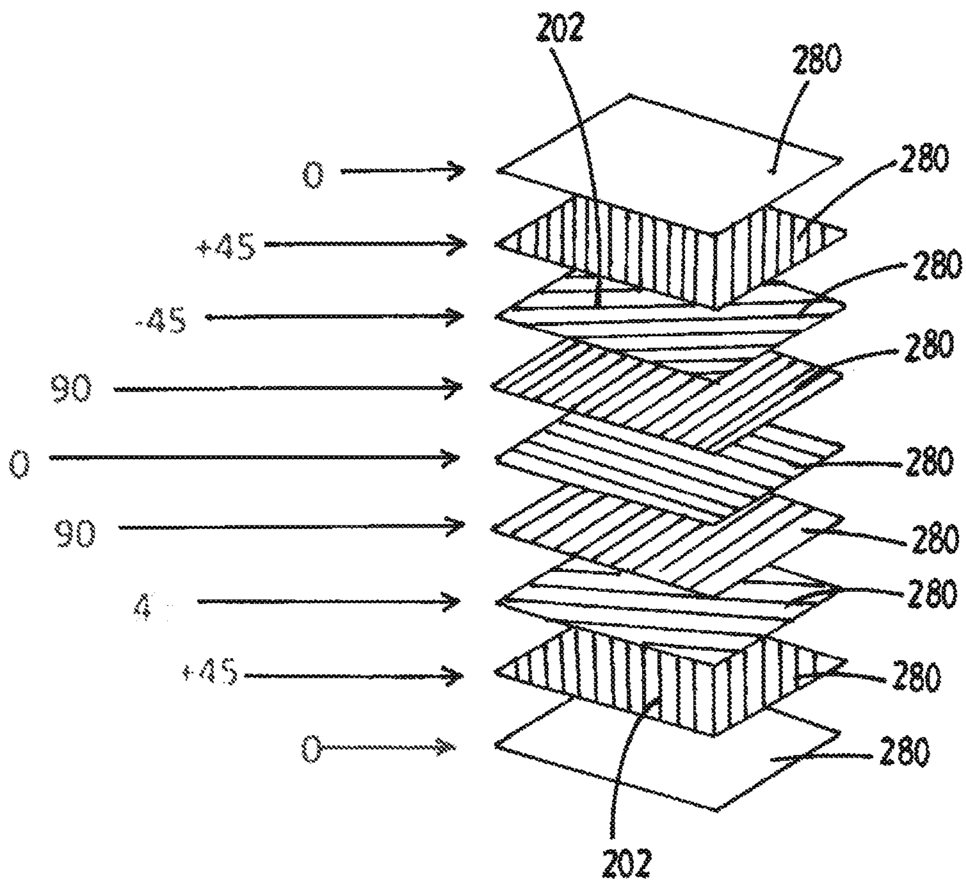
FIG. 52 shows how to stack flat pieces comprising multiple thread sections.

Turning to FIG. 52, multiple flat pieces 280 may be stacked onto one another during the making of a composite product, as is known from for instance carbon products. The flat pieces may comprise unidirectional thread sections 202 or multi-directional thread sections 202, and may be woven or not. Also, flat pieces 280 having unidirectional thread sections 202 may be combined with flat pieces 280 having multi-directional thread sections 202. Basically, an endless number of combinations is possible.

A method of manufacturing a composite product from the thread 202 according to the invention comprises:

forming a shape with the thread 202, with multiple sections of thread or with one or more flat pieces (280), in particular with a mandrel or mould, and letting the shape harden.

The thread sections in the different pieces may be oriented at different angles in order to increase the strength and/or stiffness of the end product in different directions, as is known for composite products.

The method may comprise impregnating the thread 202 with resin, wherein the resin enters the thread via the openings in the web, and wherein the resin enters spaces between the individual bamboo fibers, and letting the resin harden, wherein the resin binds the individual fibers together and binds the thread sections together.

The method may comprise heating of the shape.

In an embodiment the elongate strip of web material comprises:

a first substance which melts when heated at a first temperature, a second substance which melts when heated at a second temperature, wherein the second temperature is higher than the first temperature After the shape has been formed, the shape is heated to the second temperature, thereby melting the second substance, wherein subsequently the temperature is lowered again, thereby hardening the second substance, wherein the hardened second substance interconnects the multiple sections of thread in the shape and forms the rigid product.

In an embodiment of the method a flat piece 280 (a mat) is woven from multiple sections of thread, and wherein the shape is formed with one or more flat pieces 208. Multiple flat pieces may be laid on top of each other to create a required thickness, resulting in a required strength and stiffness.

A foil 282 may be attached to at least one side of thread sections. The foil may comprise a thermoplastic or thermosetting material which hardens after heating.

The product may basically be any product, for instance an airplane part (e.g. part of a wing or fuselage), a car part (the body, a part of the body, the chassis or any other part) a ship part (the hull, mast or any other part). The product may be a sports article such as a tennis racket or basically any product which is currently manufactured from carbon or a different composite material.

The product may be a high quality product having a high strength and stiffness or a mass produced product having lower requirements for strength and stiffness.

All the embodiments disclosed herein are not based on pulp, i.e. are "pulpless", and are based on using a dry method. Both the ribbon and the thread are made without an intermediate step in which the bamboo fibers are immersed and transformed to pulp.

The terms "a" or "an", as used herein, are defined as one or more than one. The term plurality, as used herein, is defined as two or more than two. The term another, as used herein, is defined as at least a second or more. The terms including and/or having, as used herein, are defined as comprising i.e., open language, not excluding other elements or steps.

Any reference signs in the claims should not be construed as limiting the scope of the claims or the invention. It will be recognized that a specific embodiment as claimed may not achieve all of the stated objects.

The mere fact that certain measures are recited in mutually different dependent claims does not indicate that a combination of these measures cannot be used to advantage.

White lines between text paragraphs in the text above indicate that the technical features presented in the paragraph may be considered independent from technical features discussed in a preceding paragraph or in a subsequent paragraph.

The invention claimed is:

1. A method of manufacturing a thread comprising bamboo fibers, the method comprising:

supplying bamboo parts to a bamboo part splitting device, and splitting flat pieces from the bamboo parts with a bamboo part splitting device comprising:

at least a first rotary member and a second rotary member for guiding the bamboo parts between them, and at least one splitting edge positioned downstream from the first and second rotary member for splitting the flat pieces of bamboo from the bamboo parts, wherein the flat pieces have a thickness (T) of less than 2.5 mm;

splitting the flat pieces with a flat piece splitting device comprising:

a first rotary element configured for rotation about a first axis, and a second rotary element configured for rotation about a second axis, the first and second axes being parallel, wherein the flat pieces are split from the bamboo parts by the bamboo part splitting device in a first direction and are subsequently split into elongate bamboo fibers by the flat piece splitting device in a second direction which is orthogonal to the first direction;

flattening the bamboo fibers with a flattening device comprising two rollers, at least one of which is driven, wherein the bamboo fibers are guided between the rollers and flattened by the rollers, and wherein the flattening contributes to opening and separating the split bamboo fibers;

cleaning the bamboo fibers with a cleaning device, wherein the cleaning is performed after the flattening, wherein the cleaning comprises removing parenchyma which is attached to the bamboo fibers, and wherein the cleaning comprises combing the bamboo fibers and/or frictionally engaging the bamboo fibers with rotary cleaning members having a circumferential surface;

wherein the splitting, flattening and cleaning results in elongate bamboo fibers having a width (W) of less than 2.5 mm and a cross-sectional area of between 0.005 and 0.1 $mm^2$, the method further comprising:

arranging the bamboo fibers into an elongate strand of bamboo fibers, wherein the formed strand has a cross-sectional area of 0.1-100 $mm^2$, and wherein each cross section of the strand comprises multiple bamboo fibers, wherein in each cross section of the strand a plurality of bamboo fibers are staggered in a longitudinal direction of the strand relative to a plurality of other bamboo fibers in said cross section, and wherein at least 30 percent of the bamboo fibers are not braided or twisted; and interconnecting the bamboo fibers into a thread by:

providing a web around the strand, wherein the web has an open structure and comprises multiple openings, and/or applying a coating or resin onto the bamboo fibers, and/or winding a binding thread around the strand, and wherein the thread is formed as an endless thread in a continuous process.

2. The method according to claim 1, wherein the strand is moved continuously in a transport direction during the winding of the binding thread around the strand.

3. The method according to claim 1, wherein a length of the bamboo fibers is between 2 and 50 cm.

4. The method according to claim 1, wherein the cross sectional area of the strand comprises between 10 and 500 bamboo fibers.

5. The method according to claim 1, wherein the binding thread is wound around the strand in a helical manner.

6. The method according to claim 1, further comprising supplying resin in the strand, thereby forming a thread comprising resin.

* * * * *